United States Patent
Murase et al.

(10) Patent No.: US 6,728,746 B1
(45) Date of Patent: *Apr. 27, 2004

(54) COMPUTER SYSTEM COMPRISING A PLURALITY OF MACHINES CONNECTED TO A SHARED MEMORY, AND CONTROL METHOD FOR A COMPUTER SYSTEM COMPRISING A PLURALITY OF MACHINES CONNECTED TO A SHARED MEMORY

(75) Inventors: Hitoshi Murase, Shizuoka (JP); Sunao Takahira, Shizuoka (JP); Toshinori Hiraishi, Shizuoka (JP); Masaru Saito, Kawasaki (JP); Kenichiro Shimogawa, Kawasaki (JP); Katsunori Hiraoka, Shizuoka (JP); Koshi Horizaki, Shizuoka (JP); Kenichi Tsukamoto, Shizuoka (JP); Yumi Ochiai, Shizuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/573,529

(22) Filed: Dec. 15, 1995

(30) Foreign Application Priority Data

Feb. 14, 1995 (JP) ............................................. 7-025458
Oct. 6, 1995 (JP) ............................................. 7-260543

(51) Int. Cl.$^7$ ................................................. G06F 17/00
(52) U.S. Cl. ......................................................... 709/1
(58) Field of Search ................................. 395/406, 670, 395/674, 182.08, 182.09; 709/1, 312, 104, 102; 714/2, 3, 10, 11

(56) References Cited

U.S. PATENT DOCUMENTS

| | | | | |
|---|---|---|---|---|
| 4,272,819 A | * | 6/1981 | Katsumata et al. | 364/200 |
| 4,524,415 A | * | 6/1985 | Mills, Jr. et al. | 364/200 |
| 4,674,038 A | * | 6/1987 | Brelsford et al. | 364/200 |
| 4,713,806 A | * | 12/1987 | Oberlander et al. | 370/58 |
| 4,811,276 A | * | 3/1989 | Suga | 364/900 |
| 4,860,190 A | * | 8/1989 | Kaneda et al. | 364/200 |
| 4,975,836 A | * | 12/1990 | Hirosawa et al. | 364/200 |
| 5,201,049 A | * | 4/1993 | Shorter | 395/650 |
| 5,307,495 A | * | 4/1994 | Seino et al. | 395/650 |
| 5,339,417 A | * | 8/1994 | Connell et al. | 395/650 |
| 5,361,375 A | * | 11/1994 | Ogi | 395/800 |
| 5,381,535 A | * | 1/1995 | Gum et al. | 395/375 |
| 5,408,617 A | * | 4/1995 | Yoshida | 395/325 |
| 5,414,856 A | * | 5/1995 | Yokota | 395/725 |
| 5,428,781 A | * | 6/1995 | Duault et al. | 395/650 |
| 5,437,033 A | * | 7/1995 | Inoue et al. | 395/700 |
| 5,452,462 A | * | 9/1995 | Matsuura et al. | 395/650 |
| 5,488,716 A | * | 1/1996 | Schneider et al. | 395/182.08 |

FOREIGN PATENT DOCUMENTS

| | | |
|---|---|---|
| JP | 2-210542 | 8/1990 |
| JP | 3-062235 | 3/1991 |
| JP | 4-060750 | 2/1992 |
| JP | 5-324362 | 12/1993 |

* cited by examiner

*Primary Examiner*—Sue Lao
(74) *Attorney, Agent, or Firm*—Staas & Halsey LLP

(57) ABSTRACT

A computer system includes at least one real machine provided with a machine controller and/or a plurality of virtual machines provided with a machine controller and an operating system for a virtual machine, the real machine and the plurality of virtual machines are connected to a shared memory.

30 Claims, 54 Drawing Sheets

FIG. 43

MACHINE CONTROL ACQUISITION FIELD IN SHARED MEMEORY

120

| | CONTROLLING MACHINE ADDRESS STORAGE AREA | IPL GENERATION | CONTROL STATUS INFORMATION |
|---|---|---|---|
| MACHINE 200 | AAAABBBB | 9501030945 00 | COMPLETED |
| MACHINE 300 | 00000000 | 9501030945 00 | — |
| MACHINE 400 | 00000000 | 9501041002 05 | — |

111
112
113

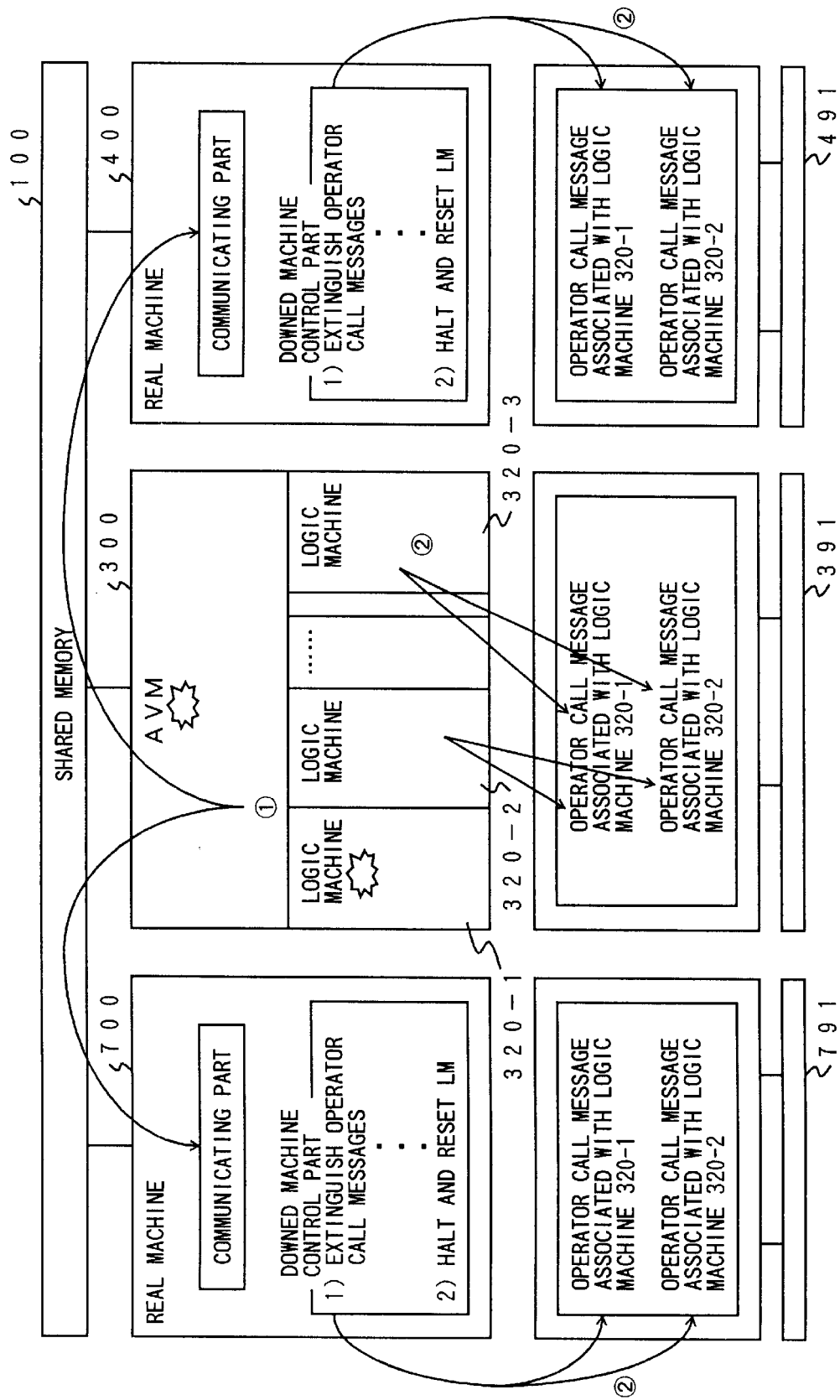

COMPUTER SYSTEM COMPRISING A PLURALITY OF MACHINES CONNECTED TO A SHARED MEMORY, AND CONTROL METHOD FOR A COMPUTER SYSTEM COMPRISING A PLURALITY OF MACHINES CONNECTED TO A SHARED MEMORY

BACKGROUND OF THE INVENTION

1. Field of the Invention

The present invention relates to a computer system comprising a plurality of machines connected to a shared memory and a control method for a computer system comprising a plurality of machines connected to a shared memory. More particularly, the present invention relates to a computer system comprising a plurality of machines connected to a shared memory and a control method for the same system, wherein improved controls are attained than in conventional systems.

Recently, computer systems in which a plurality of machines are connected to each other via a shared memory are generally used because of a reduced rate of evolution in the capability of a single processor and a strong need for improvement in reliability. There is also a demand for operating a computer system as a plurality of virtual computer systems, by using a shared memory.

Further, there is a demand for a system having a hot-standby capability, wherein it is possible to detect a system down occurring when a system operated under an AVM (an OS for controlling a virtual computer system) is down due to an abnormality.

2. Description of the Prior Art (1) Conventional computer system—1

A description will first be given of a first conventional computer system.

FIG. 1 shows the construction of a first conventional computer system.

In the example of FIG. 1, a machine 10 is operated as a plurality of virtual machines 11-1–11-n (hereinafter, referred to as logic machines). The machine 10 has an operating system (hereinafter, referred to as an AVM) 12 for controlling the logic machines 11-1–11-n.

(2) Conventional computer system—2

Secondly, a description will be given of a case where a computer system is connected to a shared memory.

FIG. 2 shows the construction of a second conventional computer system.

In the example of FIG. 2, the above-mentioned machine 10 is connected to a shared memory 50. The machine 10 and the shared memory 50 is connected via a real access path 60 provided in the shared memory 50. The machine 10 reads information from and writes information to the shared memory 50.

The machine 10 is provided with the AVM 12 and the plurality of logic machines 11-1–11-n. A logic (virtual) access path 71 is disposed between the AVM 12 and each of the logic machines 11-1–11-n. The logic machines 11-1–11-n read information from and writes information to the shared memory 50 via the access path 71 and the AVM 12.

FIG. 3 is a diagram explaining the second conventional computer system.

In the second conventional computer system shown in FIG. 3, the machine 10 is connected to a shared memory 51 via an access path 61, and a machine 20 is connected to the shared memory 51 via an access path 62. A machine 30 is connected to a shared memory 52 via an access path 63, and a machine 40 is connected to the shared memory 52 via an access path 64.

The machine 10 connected to the shared memory 51 is executing a process with respect to the shared memory 51. One of the logic machines in the machine 20 is in a standby state under the control of the AVM, and another in the machine 20 is used in developing a computer system. The machine 30 connected to the shared memory 52 is executing a process with respect to the shared memory 52, and the machine 40 is in a standby state. In this way, exclusive control is imposed when the system shown in FIG. 3 is in a hot-standby mode such that, while one of the machines 10 (30) is executing a process with respect to the shared memory 51 (52), the other machine 20 (40) is in a standby state.

(3) Conventional computer system—3

Thirdly, a description will be given of a case where a plurality of machines are connected to a shared memory.

FIG. 4 shows the construction of a third conventional computer system.

In the computer system shown in FIG. 4, a plurality of machines 10, 20, 30 and 40 are connected to the shared memory 50. The machines 30 and 40 are operated as virtual machines. Logic machines in each of the virtual machines 30 and 40 are provided with a relative machine No. For example, the logic machine 31-1 is provided with an No. 1, the logic machine 31-2 an No. 2, the logic machine 31-3 an No. 3, and the logic machine 40 an No. 4. Likewise, the logic machine 41-1 of the virtual machine 40 is provided with an No. 1, the logic machine 41-2 an No. 2, the logic machine 42-3 an No. 3, and the logic machine 41-4 an No. 4. Further, the machine 10 is provided with a real machine No. 0, the machine 20 a real machine No. 1, the machine 30 a real machine No. 2 and the machine 40 a real machine No. 3.

A description will be given of a case where an operator 80 specifies the logic machine 31-1 of the machine 30. When the operator 80 specifies the real machine No. 2 of the machine 30, it means that an AVM 32 of the machine 30 having the real machine No. 2 is specified. According to a predetermined sequence, the AVM 32 specifies a relative machine No. 1, for example, indicating the logic machine 31-1 of the machine 30. In a computer system comprising a plurality of machines connected to each other via a shared memory, a virtual machine operated under the AVM allows only one logic machine under its control to be connected to another computer. Since, the real machine No. and the logic machine are in one-to-one correspondence at a given moment, it is possible to specify a logic machine by specifying a real machine No. When the operator 80 specifies the real machine No. 2, for example, it means that the logic machine 31-1 is specified.

(4) Communication method in a conventional computer system

Fourthly, a description will now be given of a communication undertaken between the machines in a conventional computer system.

FIG. 5 is a diagram explaining communication system of a third conventional computer system. As shown in FIG. 5, the plurality of machines 10, 20 and 40 and the like share the shared memory 50. Communication between the machines via the shared memory 50 is executed such that an originating machine specifies a real machine No. of a destination machine. For example, assuming that the machine 10 has a real machine No. 0 and the machine 20 has a real machine No. 1, the machine 10 requests communication with the machine 20 by specifying the real machine No. 1. The machine 40 is provided with a plurality of logic machines 41-1–41-n. It is possible for the logic machine 41-3 of the machine 40 to communicate with the machine 20 via an AVM 42 and the shared memory 50, by specifying the real machine No. 1 of the machine 20. In this way, communication among the machines 10, 20 . . . via the shared memory 50 is possible by specifying the real machine No.

(5) Interruption handling in conventional communication

A description will now be given of interruption handling effected in conventional communication.

In the above-described system in which a plurality of machines share a shared memory, communication between virtual machines is possible using a GSIGP instruction. In order to keep track of how an interruption is pending or reflected (processed), communication process as shown in FIG. 6, which process is based on the pending status of an interruption, is conducted. GSIGP instructions have the function of allowing communication between machines and controlling remote machines. The function of controlling remote machines is taken advantage of when a downed machine is to be controlled. In this case, a GSIGP instruction is used to halt the operation of a CPU, reset the I/O and to begin a memory dump.

FIG. 6 is a sequence chart explaining interruption handling in conventional communication.

It is assumed that the machine A communicates with the machine B.

step 1) The machine A issues a GSIGP instruction for requesting communication to the machine B via a shared memory.

step 2) The machine B puts the interruption in a pending state by hardware means because the interruption is not reflected.

step 3) Upon an occurrence of a next communication request, the machine A issues a GSIGP instruction via the shared memory.

step 4) Upon a determination that the interruption is pending in the machine B, the shared memory receives the GSIGP instruction from the machine A, assuming that the interruption will be reflected by the machine B later, and queues the communication request from the machine A.

step 5) When the machine B is ready to reflect the interruption, the hardware of the machine B cancels the pending state of the interruption and causes the interruption to be reflected.

step 6) The machine B processes the pending communication request and the communication request queued in the shared memory.

Communication requests may be queued in the shared memory so that a plurality of communication requests may be processed in the event of an interruption.

(6) Conventional system control

In a conventional complex system in which machines are connected to each other via a shared memory, system control involving resetting of a downed machine by another machine, using a GSIGP instruction (reset), is enabled. When such a resetting is completed, the system switching according to hot-standby scheme is conducted.

FIG. 7 is a sequence chart explaining resetting process in conventional system control.

In the description that follows, it is assumed that the machine A controls resetting of the machine B.

step 10) The machine A issues a GSIGP instruction (reset) in order to reset the machine B.

step 11) The machine B begins its resetting by hardware means upon receipt of the GSIGP instruction via the shared memory.

step 12) The machine A issues a GSIGP instruction (sense) to determine whether the resetting is completed or the machine B is in the process of its resetting.

step 13) The machine A recognizes that the machine B is in the process of its resetting based on the result yielded in response to the GSIGP (sense) instruction.

step 14) The machine B completes its resetting by hardware.

step 15) The machine A issues a GSIGP instruction (sense).

step 16) The machine A recognizes that the machine B has completed its resetting based on the result yielded in response to the GSIGP instruction (sense).

(7) Conventional process executed conventionally in the event of a system down

Conventionally, when an OS detects a system down, the OS controls the downed machine by a GSIGP (halt CPU) or a GSIGP instruction (reset). A GSIGP instruction is honored and executed by a service processor (SVP) provided in each machine. The service processor assumes that GSIGP instructions (pending) may continue to be issued endlessly and effects forced resetting when a predetermined period of time has expired.

In case a logic machine is deactivated, an AVM recognizes the deactivation of the logic machine and removes the logic machine from the service by disconnecting a logic path between the logic machine and the AVM.

However, the aforementioned aspects (1)–(7) of the conventional system have the following problems.

(1) In the systems shown in FIGS. 1 through 3, a machine is provided to stand alone or connected to a shared memory directly. While it is possible for a machine in the latter configuration to exchange information with other machines, there is a problem in that the access of only one machine under the control of an AVM to the shared memory is enabled.

(2) When initialization by a plurality of machines is executed using an IPL, there is a likelihood that initialization is executed by the plurality of machines simultaneously, with the result that data compatibility may suffer. When there is a hang-up in the OS that mediated the IPL operation so that the OS is restarted, an erroneous operation of the system may result.

(3) In the system shown in FIG. 4, the AVM is capable of specifying a logic machine in correspondence to the specification by the operator and in accordance with a predetermined order. However, in the system shown in FIG. 8, wherein no predetermined specification order is determined for a plurality of logic machines in a virtual machine, specification of a logic machine only by means of a real machine No. is impossible. The same thing is true of a system in which logic machines in a virtual machine are operated concurrently. Referring to FIG. 8, when the operator 80 specifies a real machine No. 2 of the machine 30, the control is turned over to the AVM 32 of the machine associated with the real machine No. 2. However, the AVM 32 cannot determine which logic machine included in the machine 30 is to be specified. Therefore, it is impossible to process communication involving a specific logic machine.

(4) In a conventional scheme, only one logic machine out of a plurality of logic machines in a virtual machine connected to the shared memory can use the shared memory. That is, in a complex system where a plurality of machines operated as virtual machines each comprising a plurality of logic machines are connected to each other via a shared memory, it is impossible to specify a logic machine controlled in each virtual machine by real machine Nos.

(5) When a communication request is issued from a real machine to a virtual machine in a conventional configuration where real machines and virtual machines share a shared memory, an associated interruption is reflected by the originating machine before the communication request is reflected by the destination virtual machine. Therefore, the interruption does not become pending in the hardware of the destination machine. Accordingly, the other machines in this system recognize that this interruption is reflected. When the destination virtual machine is not ready to reflect an interruption, it is impossible for a real machine to keep track of the state of the virtual machine with regard to interruptions. Specifically, even if the virtual machine is in a pending state, requests to the virtual machine arrive one after another at the central program of the originating machine, causing the central program to discard the interruption. As a result, communication having as its destination a virtual machine cannot be executed properly.

When a communication request is queued in the shared memory due to the pending state of a first virtual machine and then an interruption requesting a second virtual machine occurs subsequently, the first interruption is not reflected readily because the destinations are different.

(6) When a GSIGP instruction (for CPU) is issued in a conventional configuration system where a plurality of virtual machines share a shared memory, as is done between machines operated as real machines, the CPU of the machine operated as a virtual machine comes to a halt. Even if the "interruption control method for communication between computer systems" disclosed in Japanese Laid-Open Patent Application No. 5-324362 is applied to a system in which a plurality of virtual machines share a shared memory, the machine that originated a GSIGP instruction (reset) may be unable to recognize a reset completion properly. Specifically, while a logic machine (for example, a logic machine a) in a virtual machine is being reset in response to a GSIGP instruction (reset) issued by a machine (for example a machine A), a request for resetting or communicating with a logic machine b operated under a same control program as the logic machine a, which request is issued by another machine (for example, a machine B), cannot be processed. In order to resolve this situation, the control program may instruct the hardware to cancel the "reset proceeding" state when the control program initiates resetting of the AVM. However, this has a problem in that the machine that originated the GSIGP instruction (reset) is unable to recognize completion (cancellation of the "reset proceeding" state) of the reset properly. FIG. 9 is another diagram explaining a problem with the prior art. Encircled numbers in FIG. 9 correspond to the numbers in the parentheses at the beginning of each description below.

(1) A machine A issues a GSIGP instruction (reset of logic machine a) for resetting a logic machine a in a machine V operated as a virtual machine.

(2) The reset request from the machine A is put in a pending state in the machine V by the hardware thereof.

(3) When the AVM of the machine V recognizes the reset request, the AVM executes a resetting process of the logic machine a.

(4) A machine B issues a GSIGP instruction (reset of logic machine b) for resetting a logic machine b in the machine V.

(5) Since the hardware of the machine V is executing the resetting process, the reset request from the machine B is not honored.

(6) When the resetting of the logic machine a is completed, the AVM instructs the hardware to cancel the pending state of the reset request.

(7) The machine A recognizes completion of the resetting of the logic machine a of the machine V.

In other words, while a resetting process is being executed in a virtual machine in response to a reset request issued by a first machine, it is impossible for a second machine to request resetting of or communication with the virtual machine operated under the AVM executing the resetting process.

FIG. 10 is yet another diagram explaining a problem with the prior art. Encircled numbers in FIG. 10 correspond to the numbers in the parentheses at the beginning of each description below.

(1) A machine A issues a GSIGP instruction (reset) for resetting a logic machine a in a machine V operated as a virtual machine.

(2) The hardware of the machine V holds the reset request according to the method disclosed in Japanese Laid-Open Patent Application No. 5-324362 ("interruption control method for communication between computer systems").

(3) The AVM of the machine V recognizes the reset request and instructs the hardware to cancel pending state of the reset.

(4) The AVM executes the resetting process of the logic machine a.

(5) The machine A recognizes completion of the resetting process of the logic machine a of the machine V.

Thus, there is a problem in that the machine that originated the GSIGP instruction (reset) erroneously recognizes completion (cancellation of the "reset proceeding" state) of the resetting process if the AVM of the machine V instructs the hardware to cancel the resetting process.

Further, if a logic machine in a machine operated under the AVM is down in a system configuration in which a plurality of machines are connected via a shared memory, a service processor provided in each machine is unable to perform a forced reset normally carried out when a resetting process is not completed within a predetermined period of time. This is because the service processor activates a forced reset when it recognizes a pending state. Cancellation of the "reset proceeding" state by the AVM causes the monitoring of the service processor using a timer to stop. Since the service processor is unable to recognize a pending state, it is unable to perform a forced reset.

Further, when a logic machine operated under the AVM is deactivated, a logic path between the AVM and the logic machine is disconnected so that the OS cannot control the logic machines. For example, the OS cannot reset a logic machine. For this reason, there is a problem in that an operator has to reset a logic machine whenever the logic machine is deactivated.

SUMMARY OF THE INVENTION

Accordingly, an object of the present invention is to build a large-scale computer system in which loads must be distributed across a plurality of machines, by connecting a plurality of computer systems to a shared memory that allows communication between a plurality of machines operated as a virtual machine and having a plurality of logic machines.

Another and more specific object of the present invention is to provide a computer system comprising a plurality of machines connected to a shared memory, wherein, when an initialization of the shared memory is started, an updating request from another machine is subjected to exclusive control, and, when one of the machines is put out of service, system failure due to, for example, a restart is prevented.

Still another object of the present invention is to provide a computer system comprising a plurality of machines connected to a shared memory, wherein the AVM of a machine operated as a virtual machine assigns machine Nos. to logic machines under its control so that both the AVM and the control system of the logic machine are capable of recognizing the computer Nos.

Still another object of the present invention is to allow flexible communication in a system in which a plurality of machines are connected via a shared memory.

Yet another object of the present invention is to provide a computer system comprising a plurality of machines connected to a shared memory, wherein an interruption to the AVM is properly reflected.

Another object of the present invention is to provide a computer system comprising a plurality of machines connected to a shared memory, wherein completion of a resetting process in response to a GSIGP instruction (reset) is properly recognized by a machine that originated the instruction.

Still another object of the present invention is to provide a computer system comprising a plurality of machines connected to a shared memory, wherein it is possible to detect an abnormality of the AVM and notify other machines of the abnormality, and it is possible for a machine to control a real machine that went down or the logic machines in the machine operated under the AVM in which the abnormality is found.

Yet another object of the present invention is to provide a plurality of machines connected to a shared memory, wherein it is possible for a machine that went down to notify other machines connected to the shared memory of a state of the system down.

Another object of the present invention is to provide a computer system comprising a plurality of machines connected to a shared memory, wherein, when there is a machine in which a system down occurs, it is possible for the OS of another machine to recognize the system down.

Still another object of the present invention is to provide a computer system comprising a plurality of machines connected to a shared memory, wherein, a machine that recognizes a downed machine is capable of controlling the downed machine.

Yet another object of the present invention is to provide a computer system comprising a plurality of machines connected to a shared memory, wherein it is possible to halt the operation of the CPU of a downed machine and reset the I/O thereof so that a hot-standby state is introduced.

Another object of the present invention is to provide a computer system comprising a plurality of machines connected to a shared memory, wherein control of a downed machine is effected such that, when a virtual machine goes down, it is possible to force a reset thereof using the hardware, similarly to the case of a real machine.

Still another object of the present invention is provide a computer system comprising a plurality of machines connected to a shared memory, wherein an operator interruption message once displayed is extinguished immediately when the operator completed its interruption.

In order to achieve the aforementioned objects, the present invention provides a computer system comprising a plurality of machines connected to a shared memory, the computer system including at least one real machine and/or a plurality of virtual machines, wherein each of the virtual machine is provided with an AVM for controlling a virtual machine, and the real machine is provided with an OS for controlling the real machine and individual logic machines in the virtual machine.

In accordance with one aspect of the present invention, it is possible to connect a plurality of machines operated as virtual machines to a shared memory, wherein communication between a virtual machine operated in a machine and a virtual machine operated in a separate machine is possible.

In accordance with another aspect of the present invention, it is possible for a virtual machine connected to a shared memory to lock a shared memory in a hot-standby mode so that an access from another machine is subject to exclusive control. When an abnormal halt of the operation of the locking machine is detected, it is possible for a detecting machine to initialize the failed machine so that an access path between the failed machine and the shared memory is disconnected. Thereby, disruption of data is prevented.

In accordance with still another aspect of the present invention, when an initialization process of a logic machine in a virtual machine is halted due to an abnormality, a logic path between the failed logic machine and the OS (AVM) that controls the failed logic machine is disconnected. Since an access path for the virtual machine is not disconnected, it is possible for the other logic machines under the same AVM to access the shared memory.

In accordance with yet another aspect of the present invention, identifiers are assigned to each of a plurality of logic machines operated in a virtual machine connected to a shared memory. Thus, upon being started, the OS of the logic machine inquires, as required, the identifier of itself of the AVM that controls the logic machines. Therefore, it is possible to identify a call originating logic machine and/or a call receiving logic machine in communication involving a logic machine.

In accordance with another aspect of the present invention, a determination is given in communication as to whether the destination machine is a real machine or a machine operated as a virtual machine. Information necessary for communication between a plurality of machines is exchanged so as to keep track of the operating state of the machines. Therefore, it is possible to effect communication wherein the state and identity of the communication destination is properly recognized, even in a complex system where real machines and virtual machines are connected to via a shared memory.

In accordance with another aspect of the present invention, when a virtual machine receives a request for communication from another machine, a determination is made by the virtual machine as to whether or not the request has as its destination the virtual machine or another machine. When the request has as its destination the virtual machine, the virtual machine queues the communication request under the control of the OS until the logic machine requested is ready for a communication process. When the logic machines is ready for the process, the communication request is reflected.

In accordance with still another aspect of the present invention, communication requests for a plurality of logic machines are queued. When a logic machines is ready for the communication, the logic machine is notified of the request.

The OS of the notified logic machine determines whether or not the there are other communication requests queued. When there are, those communication requests are also processed. In this way, communication requests are properly reflected even when there is a new interruption, or different communication interruption states exist between the requested logic machine and the machine which controls the same logic machine.

In accordance with yet another aspect of the present invention, when there is an overflow of a queue, the OS controlling the requested logic machine notifies the machine that originated the communication request of the overflow of the queue so that a new communication request is prevented from being issued.

In accordance with another aspect of the present invention, when a virtual machine receives a reset request from another machine, the OS controlling the logic machines determines the logic machine that is the target of control. When the control of the logic machine is completed, the OS notifies the machine that originated the reset request of the completion of the control. Therefore, the machine that issued the reset request is able to switch to a hot-standby mode.

In accordance with still another aspect of the present invention, it is possible for the OS controlling a logic machine to receive a communication request from another machine while the OS is executing the resetting process.

In accordance with yet another aspect of the present invention, when the AVM is down due to an unrecoverable error, the failed virtual machine itself is able to notify the other machines connected to a shared memory of the system down via the shared memory. Thereupon, it is possible for one of the other machines connected to the shared memory to control the downed machine; i.e., reset the input and output of the downed machine or halt the operation of the CPU of the downed machine. Instead of allowing a communication session between the downed machine and the machine that received the system down being continued even after the occurrence of the system down, thereby inviting a chance of an error occurring, this aspect of the invention ensures that the downed machine is disconnected from the system logically.

In accordance with another aspect of the present invention, the state of the downed machine can be properly recognized. Specifically, the state of the downed machine in which a failure occurred during a communication session can be properly recognized. Therefore, it is possible to control the downed machine; i.e. reset the input/output of the downed machine or halt the operation of the CPU of the downed machine. Thus, it is ensured that the downed machine is disconnected from the system.

In accordance with still another aspect of the present invention, the OS waits for a notification of completion of a control from the AVM according to a timer monitoring scheme. When there is no completion notification or failure notification from the AVM within a predetermined period of time, it is determined that a logic machine in the machine operated under the AVM is down.

In accordance with yet another aspect of the present invention, when a logic machine in a virtual machine is down, the logic machines other than the downed logic machine are also regarded as being down. Thus, all the logic machines in the virtual machine are disconnected from the system. In this way, a high-speed stand-by process becomes possible by effecting control with respect to the hardware of virtual machine.

In accordance with another aspect of the present invention, halt of the CPU operation and the reset of the input/output are allowed in a virtual machine. While the I/O reset control according to the prior art is possible only in a real machine not operated under the AVM, the present invention allows such a control in the virtual machine as well.

In accordance with still another aspect of the present invention, when the OS detects a down of the AVM and when there are any other machine (which may be a virtual machine) other than the logic machines operated under the AVM, the other machine takes control of the downed machine. Alternatively, if there are no machines other than the logic machines operated under the downed AVM, one of the logic machines under the control of the AVM takes control of the downed machine.

In accordance with yet another aspect of the present invention, when a logic machine in a virtual machine is deactivated, the virtual machine notifies another machine of the deactivation. However, the AVM for the deactivated logic machine is responsible for controlling the downed machine or resetting the deactivated logic machine. Therefore, control by means of GSIGP instructions is not necessary. In this way, it is possible to control the deactivated machine; i.e., reset the I/O thereof or halt the operation of the CPU thereof.

In accordance with another aspect of the present invention, it is possible for a machine to receive a notification of a deactivation of another machine.

In accordance with still another aspect of the present invention, an operator interruption message displayed when the control of the downed machine fails is extinguished so as to reduce the degree of operator interruption. Accordingly, a hot-standby mode is attained without an interruption by an operator.

BRIEF DESCRIPTION OF THE DRAWINGS

Other objects and further features of the present invention will be apparent from the following detailed description when read in conjunction with the accompanying drawings, in which:

FIG. 43 shows the construction of a machine control acquisition field provided in a shared memory, according to the second embodiment;

FIG. 55 shows how occurrences of operator calls are reduced according to the second embodiment.

DESCRIPTION OF THE PREFERRED EMBODIMENTS

Figure 1:
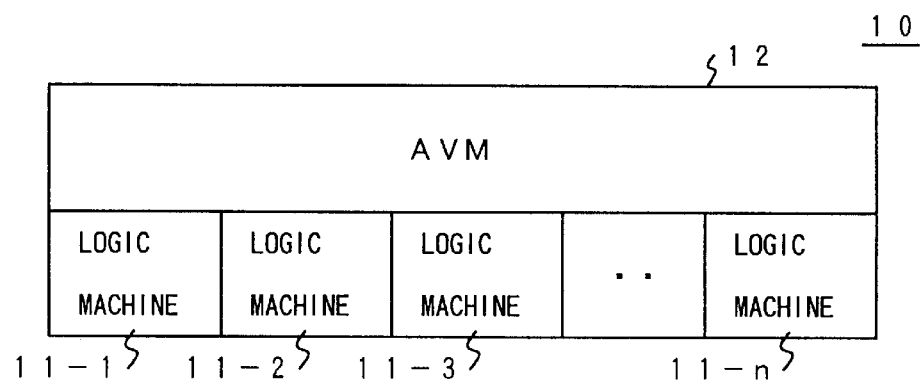
FIG. 1 shows the construction of a first conventional computer system.
Figure 2:
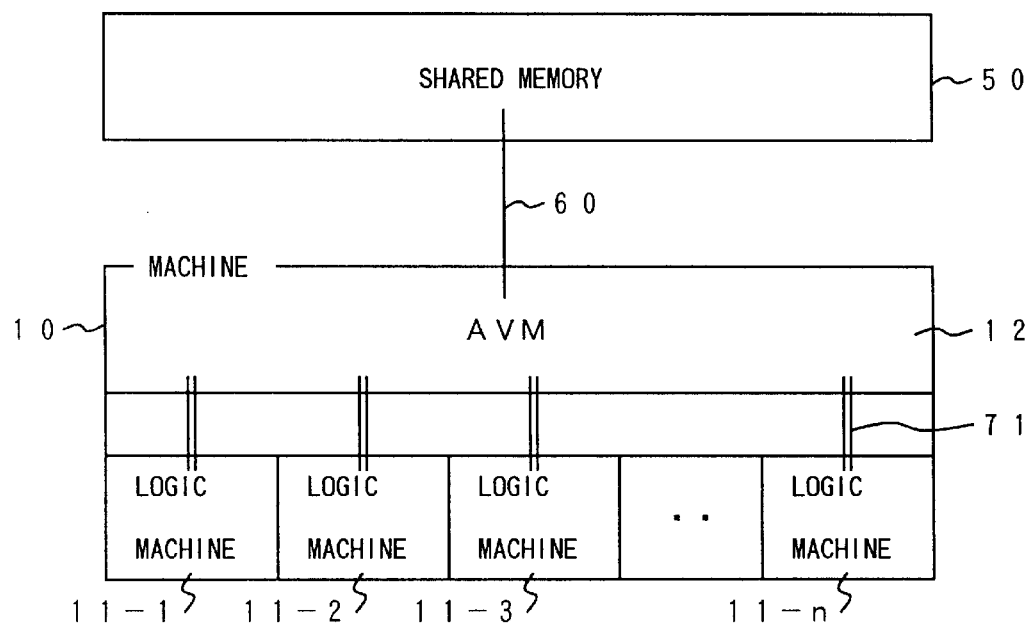
FIG. 2 shows the construction of a second conventional computer system.
Figure 3:
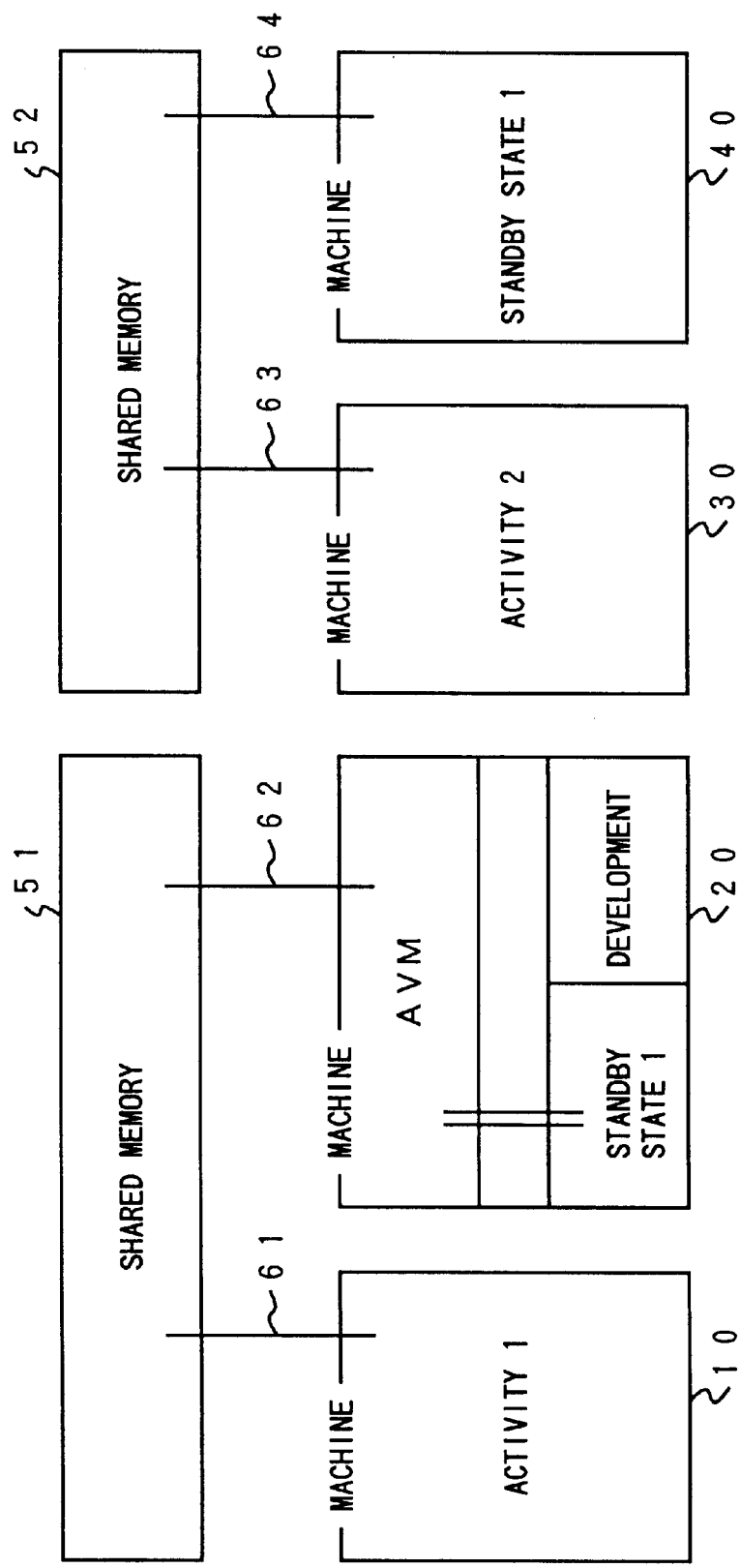
FIG. 3 is a diagram explaining the second conventional computer system.
Figure 4:
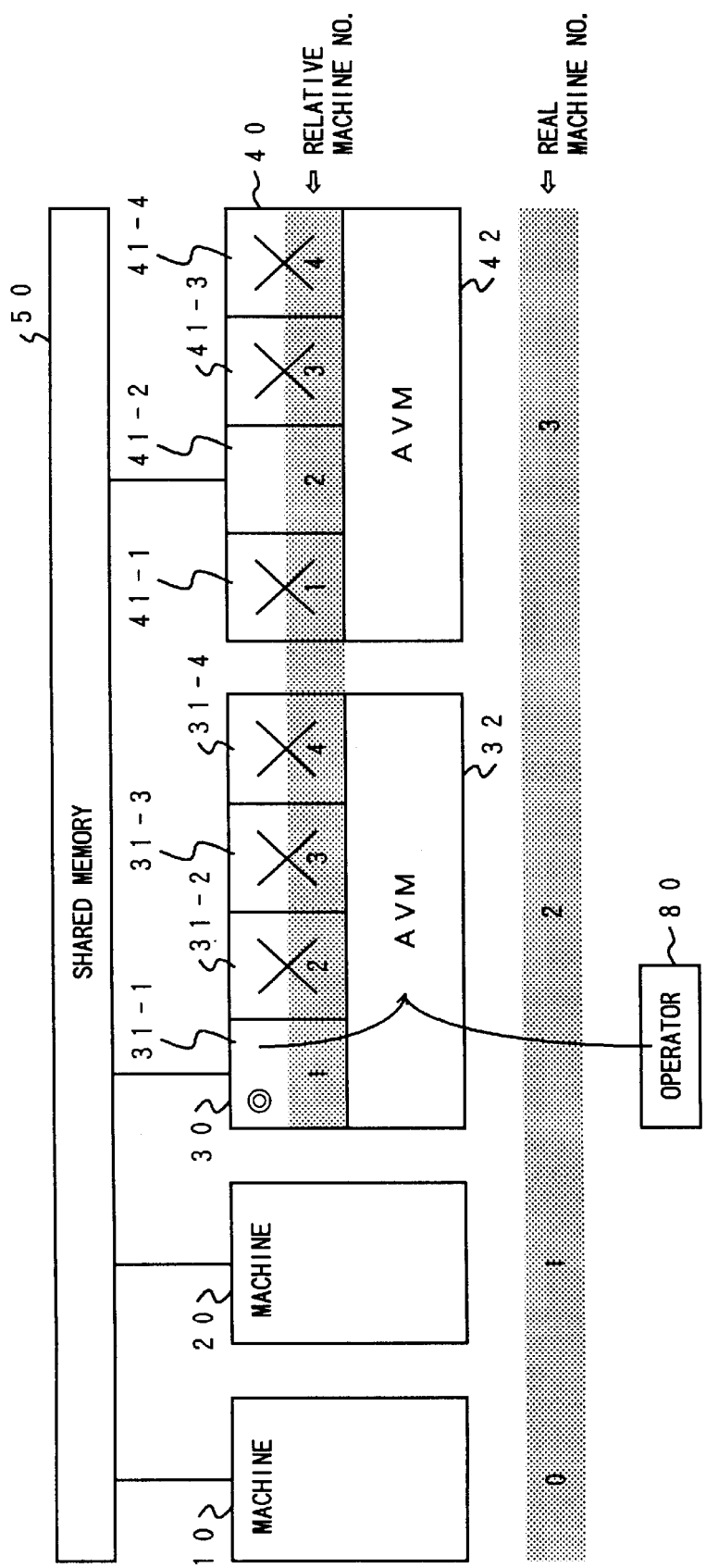
FIG. 4 shows the construction of a third conventional computer system.
Figure 5:
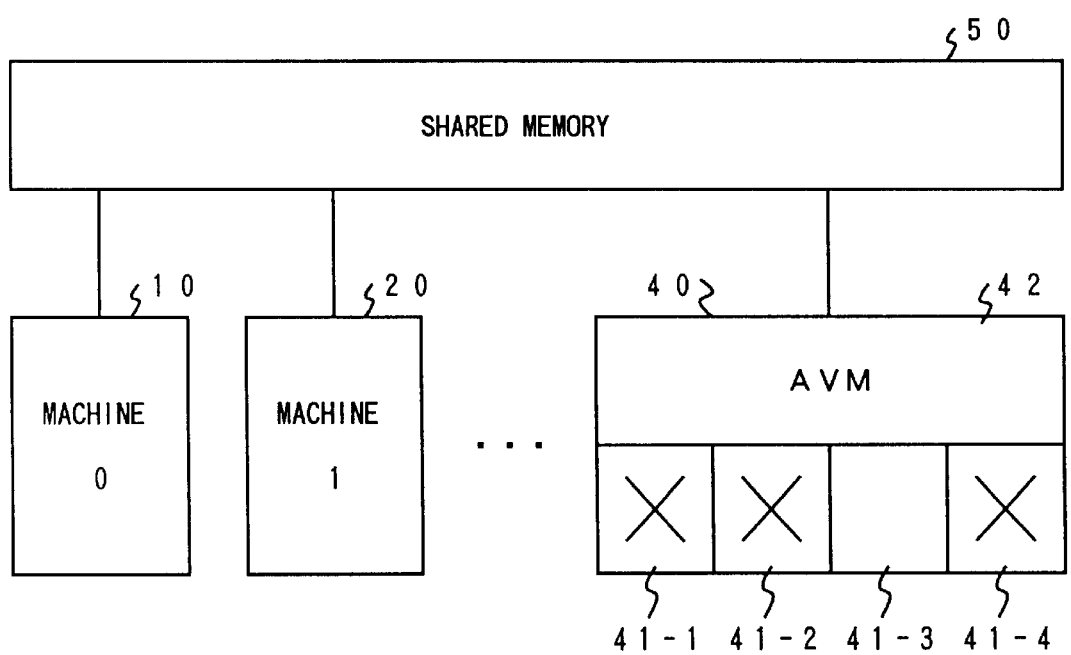
FIG. 5 is a diagram explaining communication system of a third conventional computer system.
Figure 6:
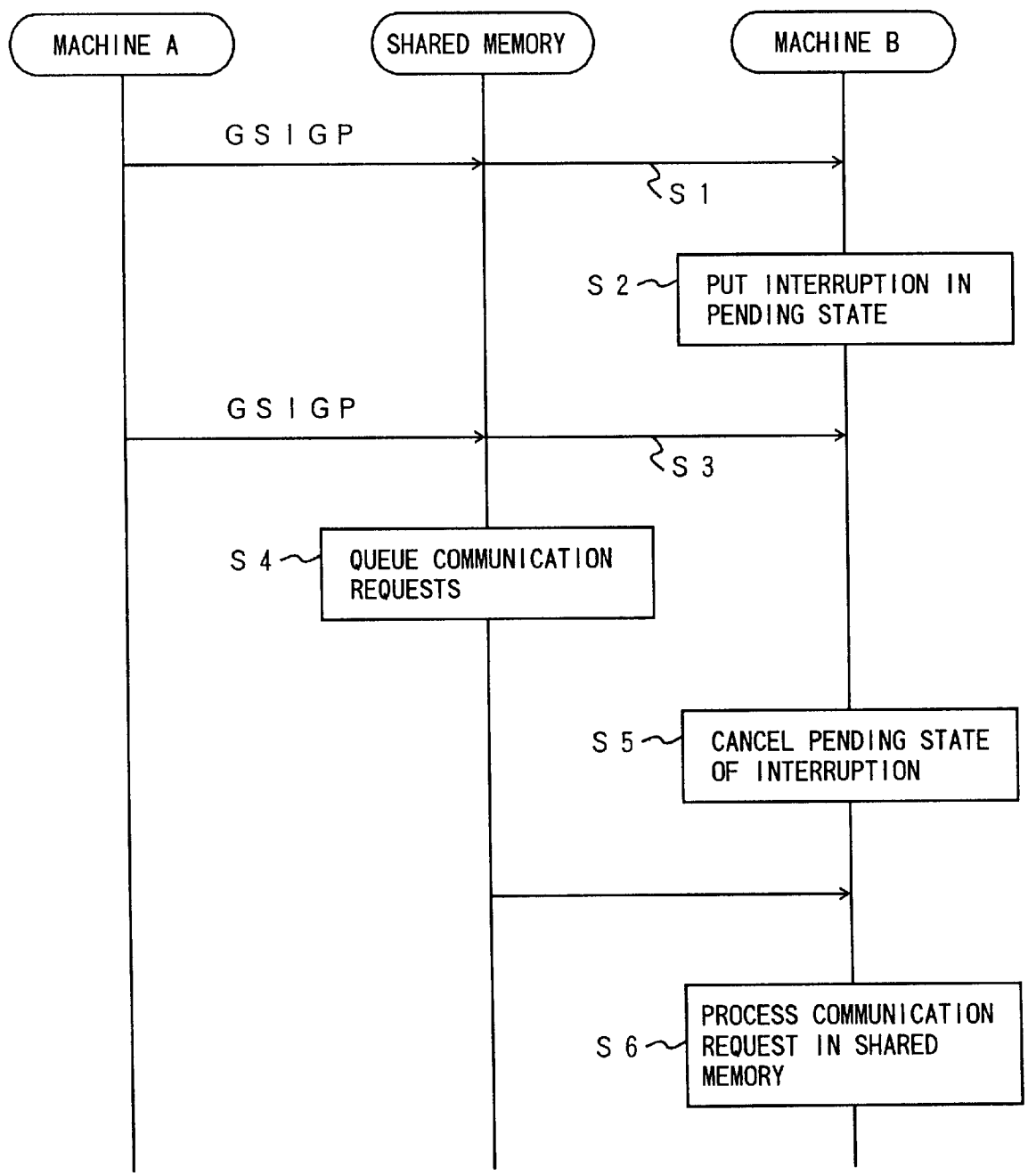
FIG. 6 is a sequence chart explaining interruption handling in conventional communication.
Figure 7:
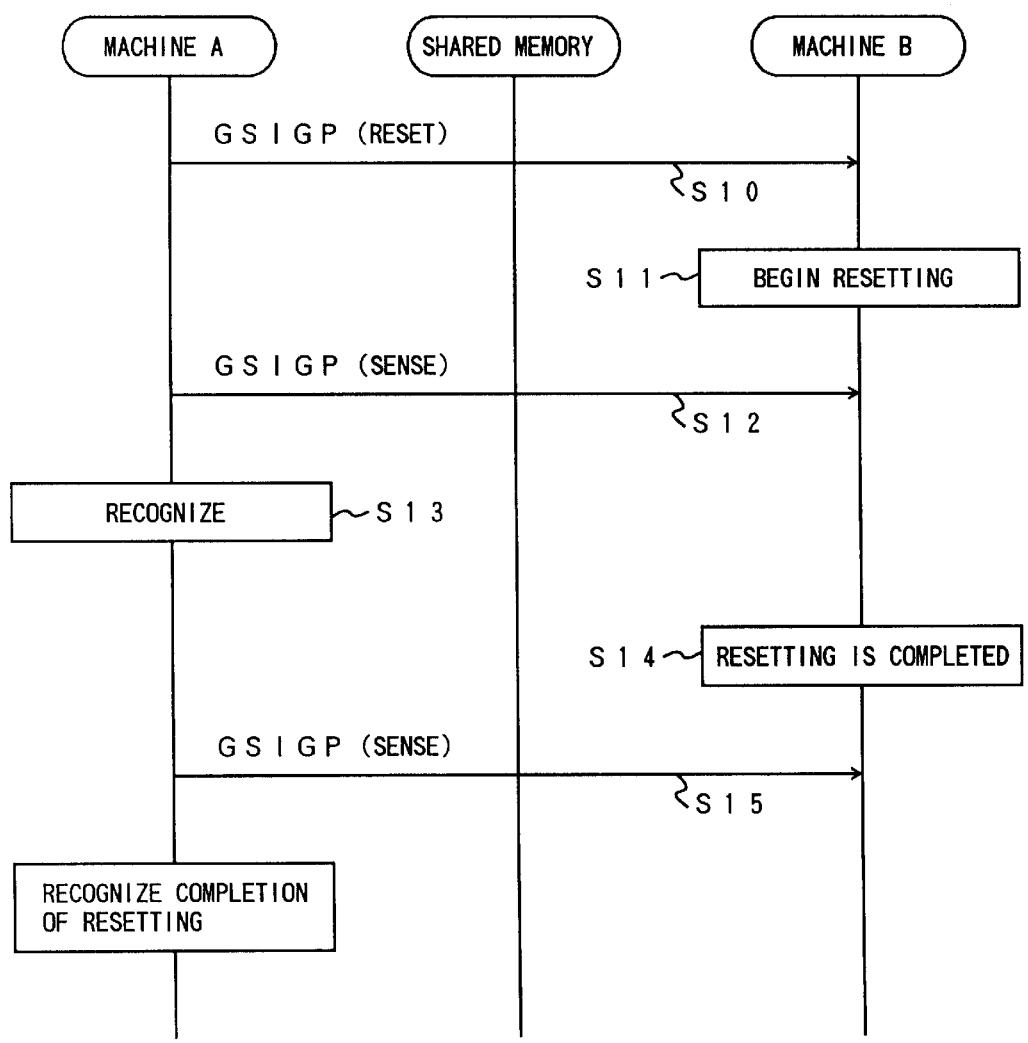
FIG. 7 is a sequence chart explaining resetting process in conventional system control.
Figure 8:
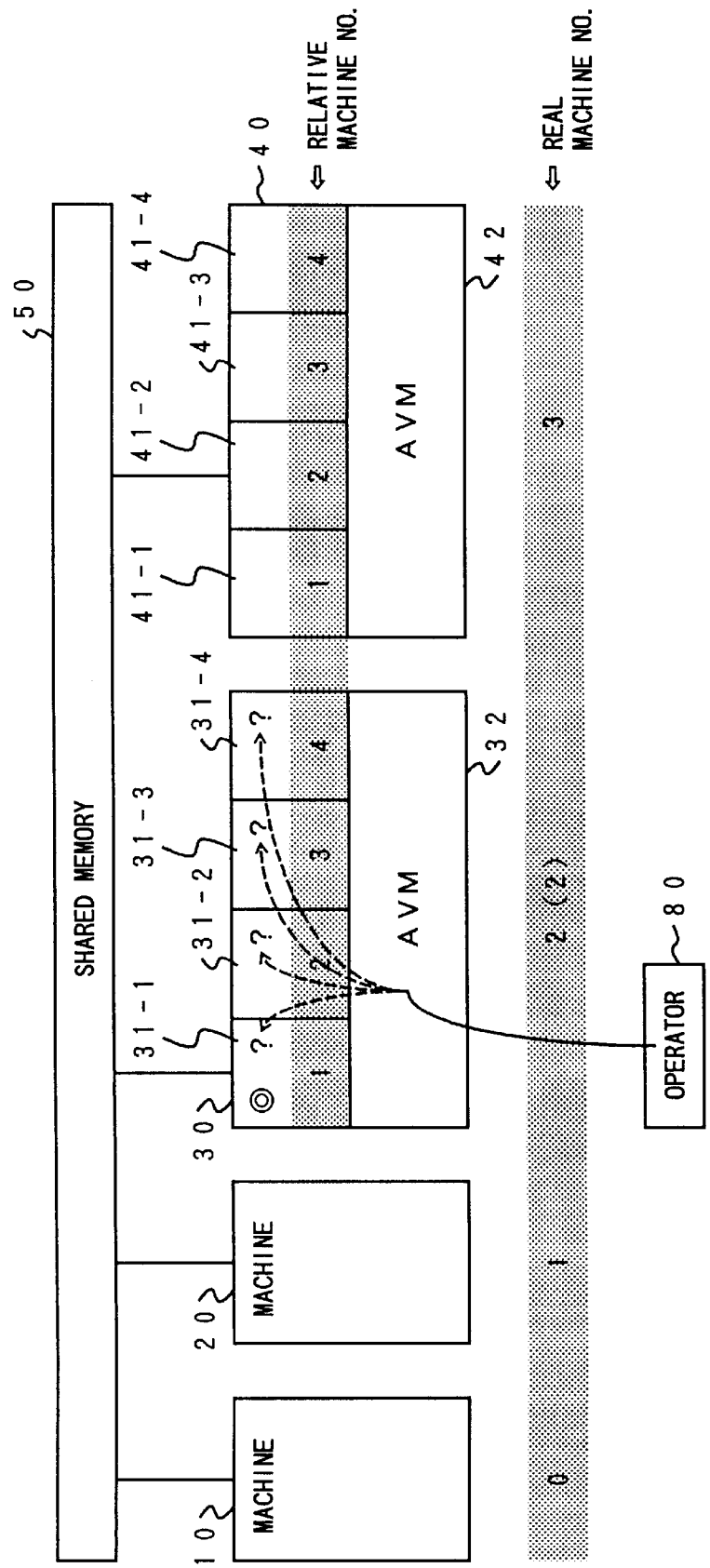
FIG. 8 is a diagram explaining a problem with the prior art.
Figure 9:
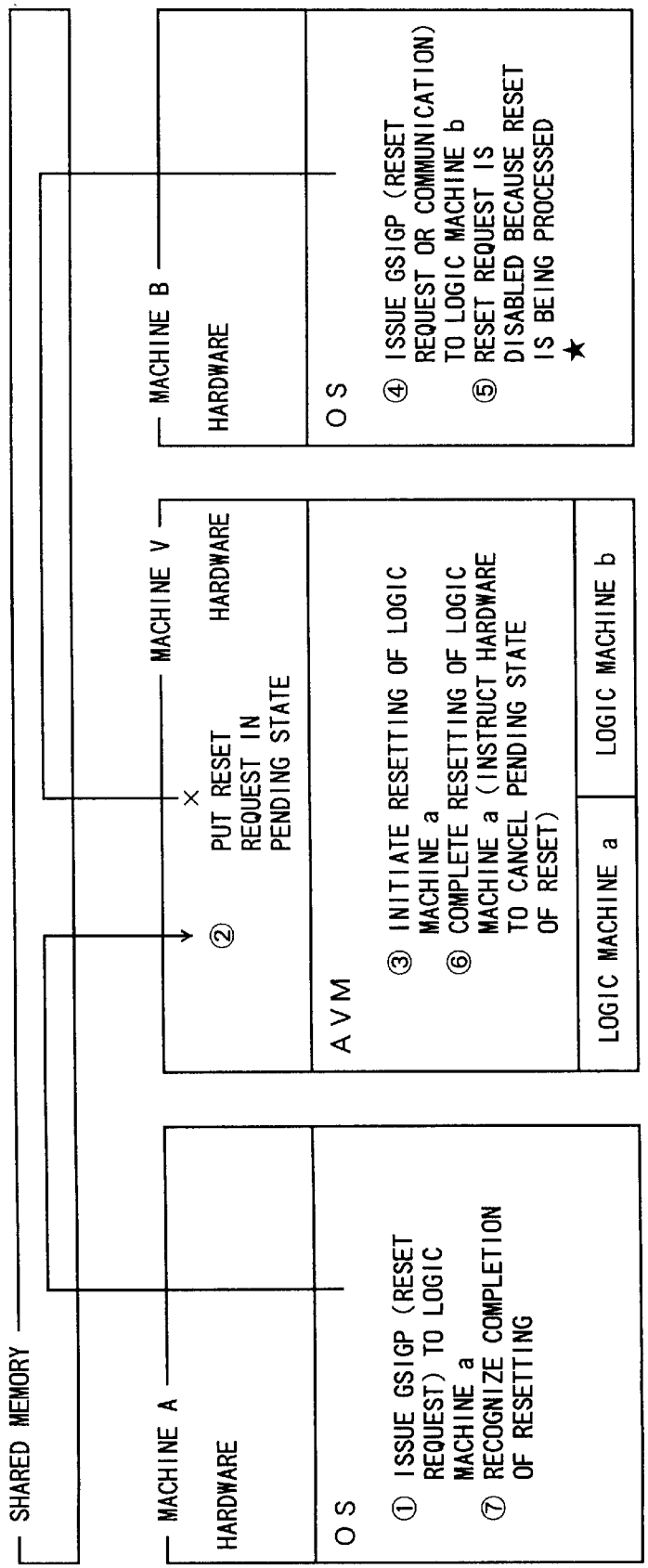
FIG. 9 is a diagram explaining another problem with the prior art.
Figure 10:
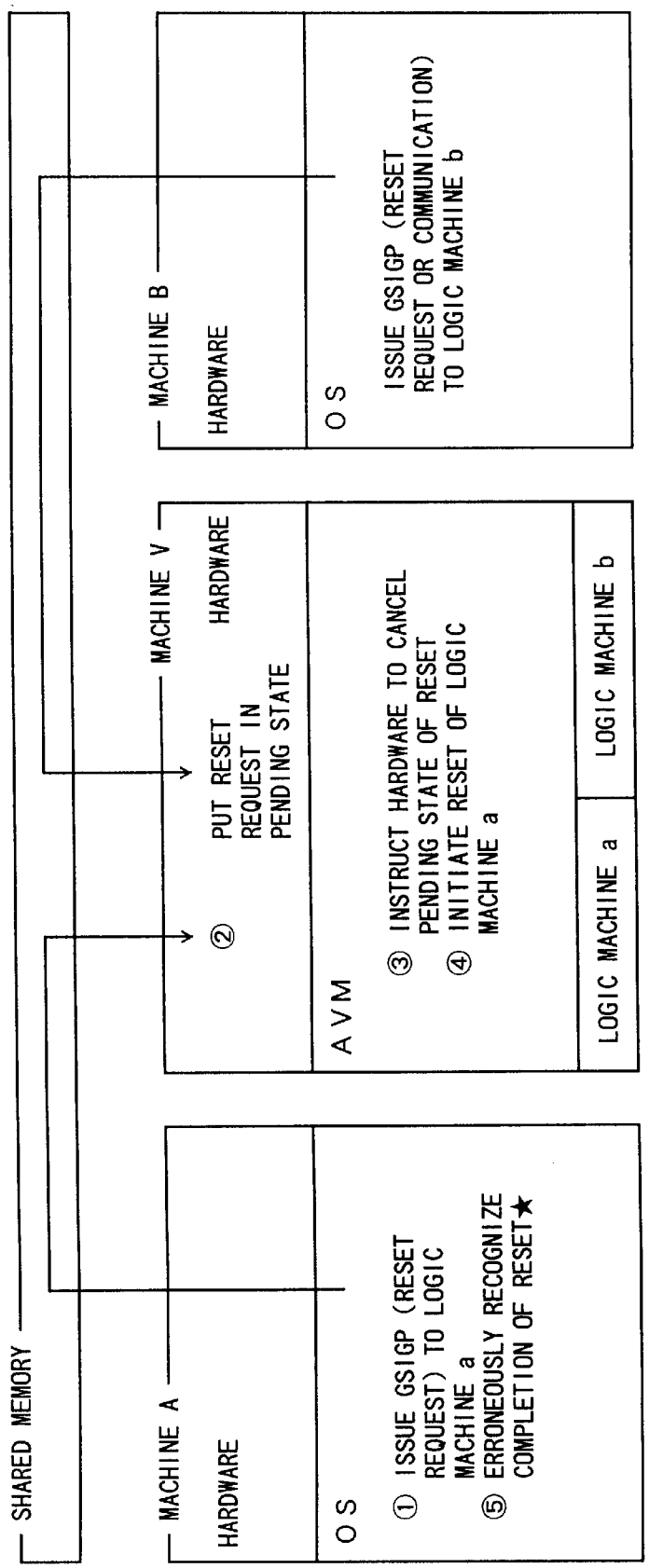
FIG. 10 is a diagram explaining still another problem with the prior art.
Figure 11:
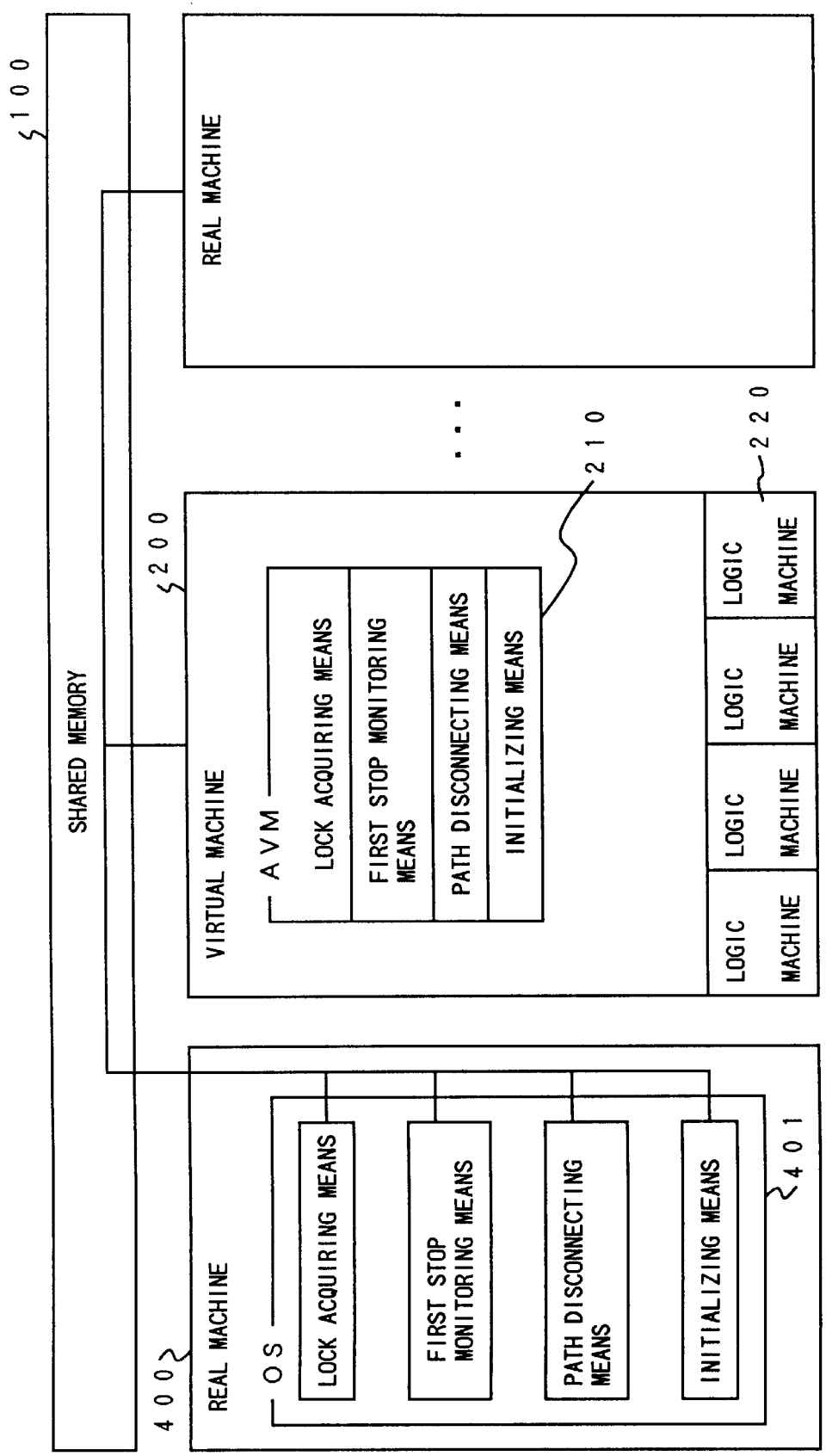
FIG. 11 shows the principle of the present invention.

FIG. 11 shows the principle of the present invention. Referring to FIG. 11, at least one real machine 400 and at least one virtual machine system 200 is connected to a shared memory 100. The real machine is provided with an operating system 401 (referred to as an OS) capable of controlling individual logic control machines in the virtual machine system 200. The virtual machine system 200 is actually a real machine operated in a virtual machine mode and will be simply referred to as the virtual machine 200. The virtual machine 200 has an operating system (referred to as an AVM) for controlling a virtual machine system.

Figure 12:
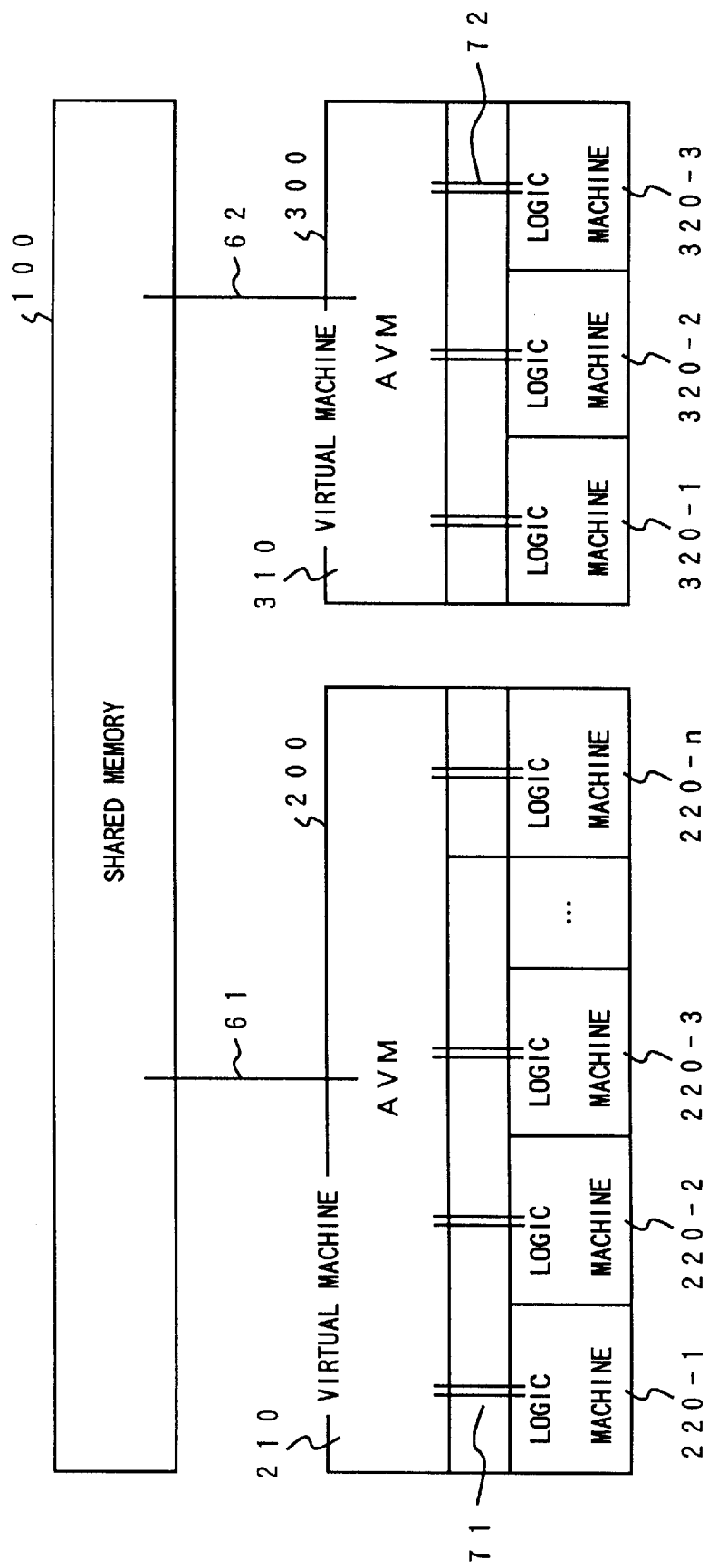
FIG. 12 shows the basic construction of the computer system of the present invention.
Figure 13:
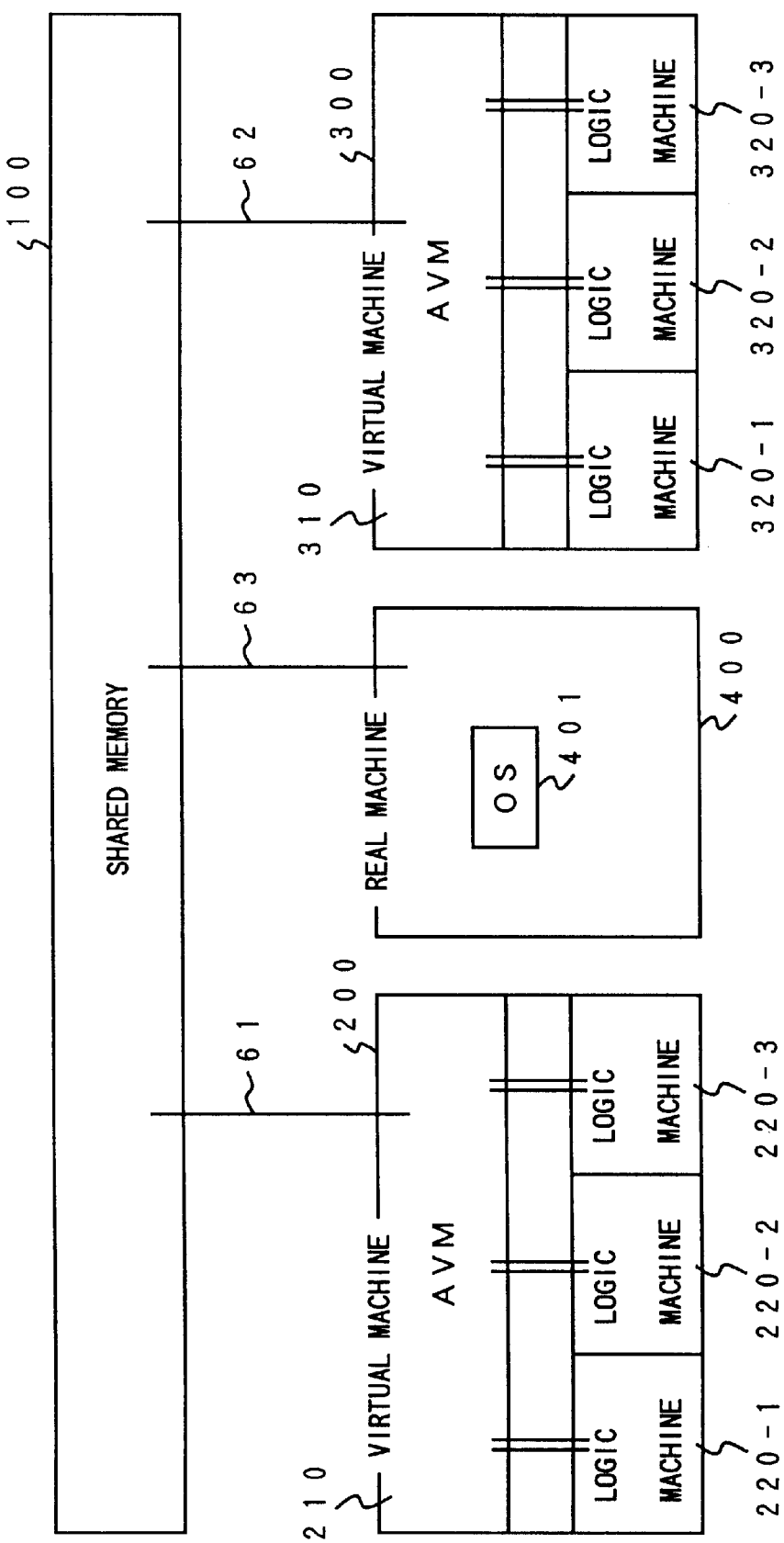
FIG. 13 shows another construction of the computer system of the present invention.

FIGS. 12 and 13 show constructions of the computer system to which the description of first and second embodiments refers to.

The construction shown in FIG. 12 is a basic construction of a complex system (hereinafter, sometimes referred to as an SCMP system) in which virtual machines 200 and 300 share a shared memory 100. The virtual machine 200 comprises a total of n logic machines 220-1, . . . 220-n and an AVM 210 built in a CPU of the virtual machine 200. Each of the logic machines 220-1, . . . 220-n is connected to the AVM 210 via a logic path 71. The machine 300 comprises three logic machines 320-1, 320-2 and 320-3, and an AVM 310. Each of the logic machines 320-1, 320-2 and 320-3 is connected to the AVM 310 via a logic path 72.

The construction shown in FIG. 13 is a variation of the construction shown in FIG. 12 wherein the machine 400 operated in a real machine mode and provided with the OS 401 is added.

The first embodiment concerns control of a complex computer system and the second embodiment concerns control of a downed machine in a complex system.

A description will be given in the following order by referring to FIGS. 12 and 13.

i. initializing process of the shared memory ii. identifier assigning process in communication iii. operating state monitoring process iv. machine-to-machine communication process v. interruption during communication vi. acknowledgement of completion

[i. initializing process of the shared memory]

A description will now be given of a first example of initializing process of the shared memory.

When the shared memory 100 is initialized, the OS a of a machine that is started first in the SCMP system establishes an access path to the shared memory 100 and runs an IPL, thereby acquiring a lock in the shared memory 100. As a result, even if the OS of another machine tries run an IPL, the IPL operation is excluded due to the lock. In this way, data stored in the shared memory is maintained. For example, referring to FIG. 13, it is assumed that one of the OSs in the machine 300 accesses the shared memory 100 and runs an IPL in the shared memory 100. Even if the OS of the machine 200 or the machine 400 tries to run an IPL thereafter, the IPL requests are excluded.

If the OS a stops while still maintaining the lock in the shared memory 100, the shared memory 100 is initialized in response to an IPL operation by the OS of another machine. For example, if one of the OSs in the machine 300 stops, due to an abnormality or the like, while still maintaining the lock in the shared memory 100, it is possible for the OS of another machine to detect the stop of the stopped OS in the machine 300 and run an IPL in the shared memory 100. A method for monitoring a stop of the other machines and a method for the IPL operation by a machine that issues an IPL subsequent to another machine will be described later.

Figure 14:
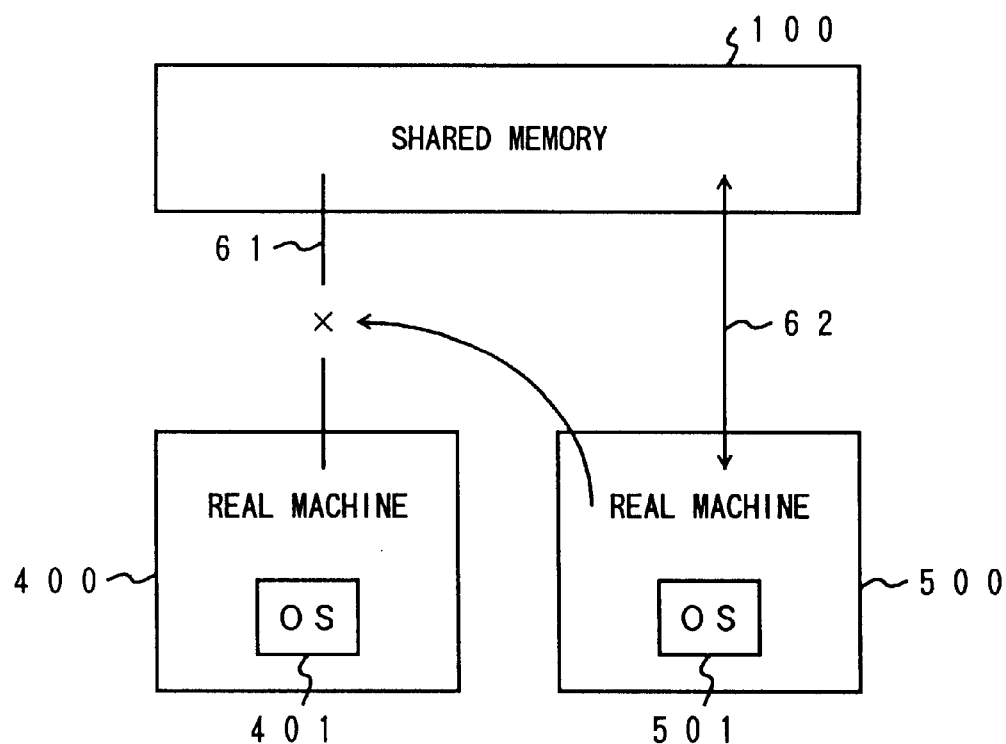
FIG. 14 is a diagram schematically explaining initialization according to one aspect of a first embodiment of the present invention.

FIG. 14 is a diagram schematically explaining initialization according to one aspect of the first embodiment of the present invention. Machines 400 and 500 are real machines and connected to the shared memory 100 via access paths 61 and 62, respectively. When the OS 401 of the machine 400 runs an IPL in the shared memory 100 via the access path 61, the OS 401 of the machine 400 acquires a right to initialize the shared memory 100 by locking the shared memory 100. When the OS 401 of the machine 400 stops after it has locked the shared memory 100, an OS 501 of the machine 500 detects the stop of the machine 400 and runs an IPL. In this way, an access path to the shared memory 100 is established irrespective of the lock, by running an IPL. The OS 501 of the machine 500 physically disconnect the access path 61 connecting the machine 400 and the shared memory 100 and activates the access path 62 between the machine 500 and the shared memory 100.

Therefore, the first embodiment of the present invention ensures that data is guaranteed such that data disruption in the shared memory 100 due to a malfunction of the OS found to be in a stopped state is prevented. The above-described disconnection of the access path is described in detail in Japanese Laid-Open Patent Application No. 4-60750 "Apparatus for handling stop of a machine" and Japanese Laid-Open Patent Application No. 4-23149 "Dual data security apparatus".

Figure 15:
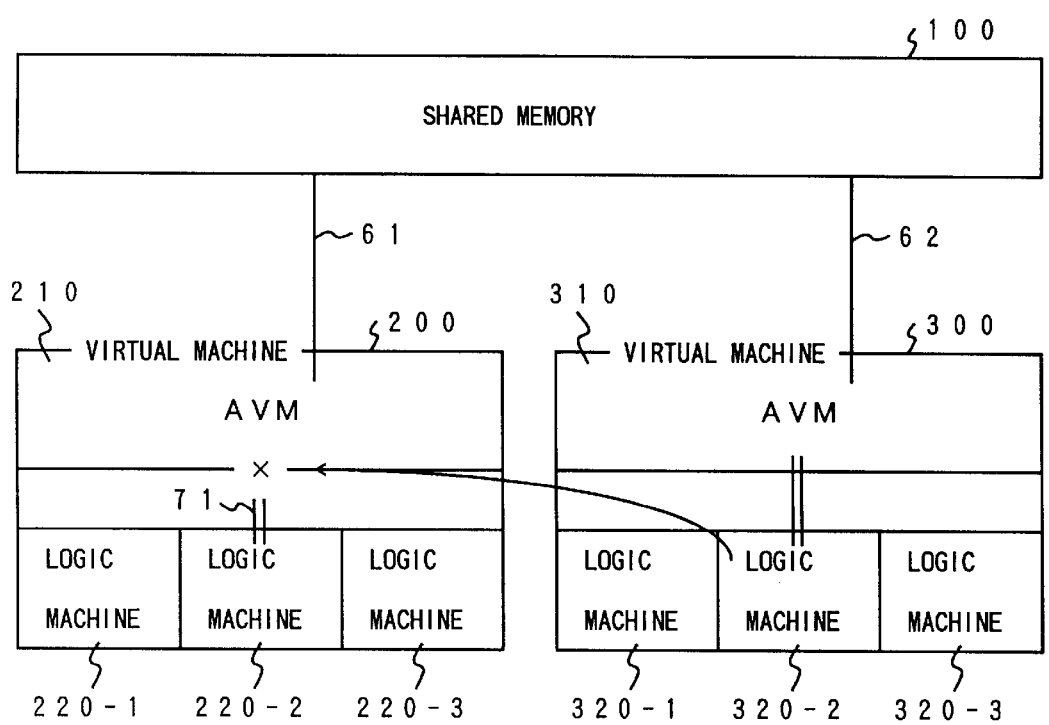
FIG. 15 is a diagram schematically explaining initialization according to another aspect of the first embodiment.

A description will now be given of how the OS of a machine operated under the AVM detects a stop of another machine. FIG. 15 is a diagram schematically explaining initialization according to another aspect of the first embodiment of the present invention.

Referring to FIG. 15, if the logic machine 320-2 in the machine 300 recognizes that the logic machine 220-2 in the machine 200 stops using a stop monitoring function described later, physical disconnection of the access path 61 between the shared memory 10 and the machine 200 is not performed, unlike the aforementioned example, so as to prevent the other logic machines in the machine 200 from being disconnected. Instead, the OS of the machine 320-2 initiates communication between the AVM 310 and the AVM 210 so that the logic path 71 between the AVM 210 and the logic machine 220-2 is disconnected.

Figure 16:
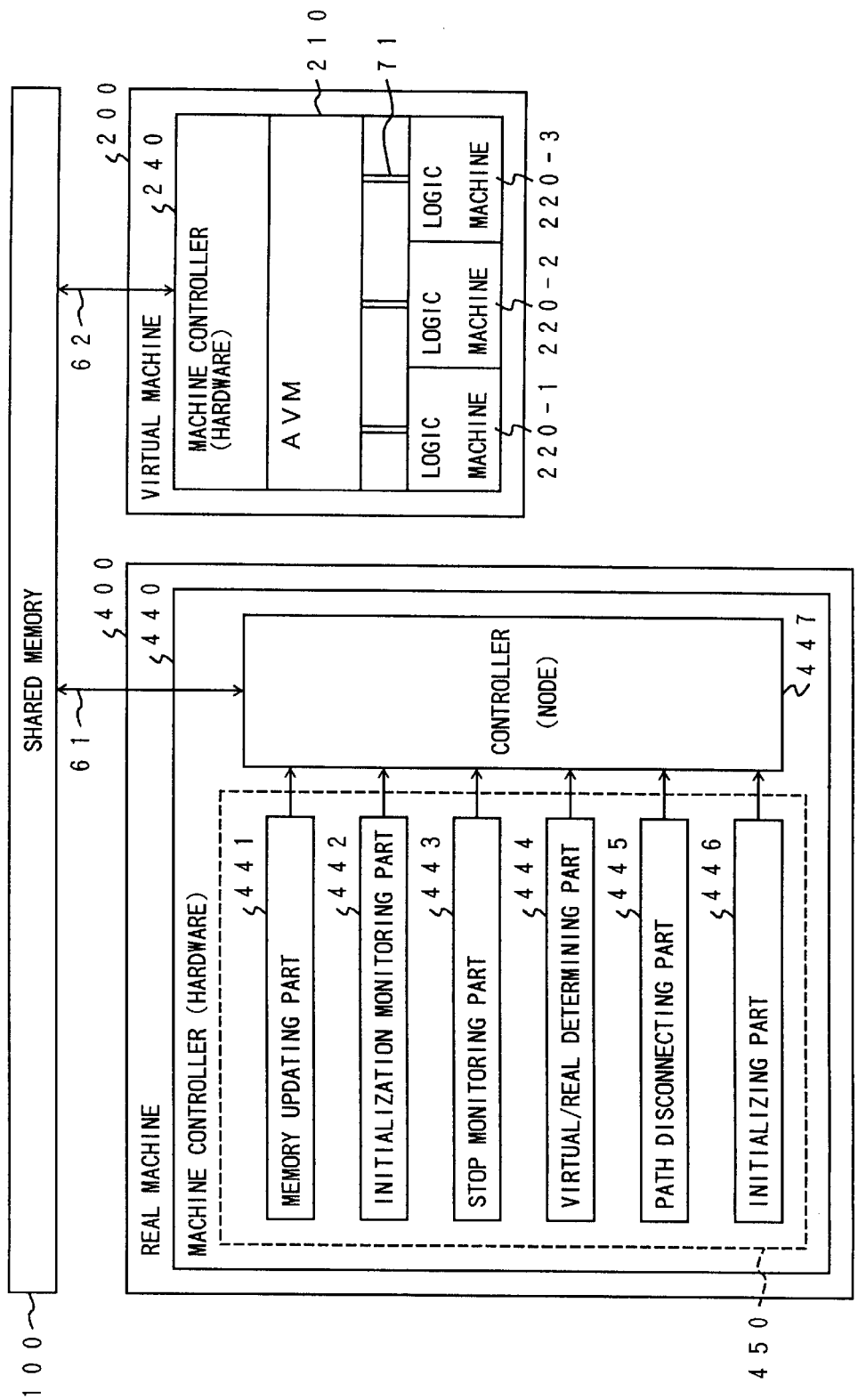
FIG. 16 shows a system configuration for initialization process according to the first embodiment of the present invention.

FIG. 16 shows a system configuration for initialization process according to the first embodiment of the present invention. In the system shown in FIG. 16, the real machine 400 and the virtual machine 200 shown in FIG. 13 are connected to the shared memory 100.

Referring to FIG. 16, a machine controller 440 for the real machine 400 comprises a memory updating part 441 for updating a specific memory area in the shared memory 100; an initialization monitoring part 442 for monitoring to determine whether or not another machine is in the process for initializing the shared memory 100; a stop monitoring part 443 for monitoring to determine whether or not the other machine in the process of initialization is in a stopped state (downed); a virtual/real determining part 444 for determining whether the stopped (downed) machine is a real machine or a virtual machine; a path disconnecting part 445 for disconnecting access paths connecting the stopped machines and the shared memory 100; an initializing part 446 for running an IPL when the machine 400 is to initialize the shared memory 100; and a controller 447 for controlling the parts 441 through 446. The memory updating part 441, the initialization monitoring part 442, the stop monitoring part 443, the virtual/real determining part 444, the path disconnecting part 445, the initializing part 446 and the controller 447 are parts of an OS 450. The controller 447 is constructed of hardware.

The virtual machine 200 comprises a machine controller 240 (hardware), the logic machines 220-1, 220-2 and 220-3, and the AVM 210 for controlling the logic machines 220-1, 220-2 and 220-3 connected thereto via the logic paths 71. The detailed construction of the OS for the logic machines 220-1, 220-2 and 220-3 is the same as that of the OS 450 of the machine controller 440 of the machine 400, so that the description thereof is omitted.

It is to be noted that the shared memory may be divided so that a plurality of virtual machines may use respective portions of the shared memory 100.

Figure 17:
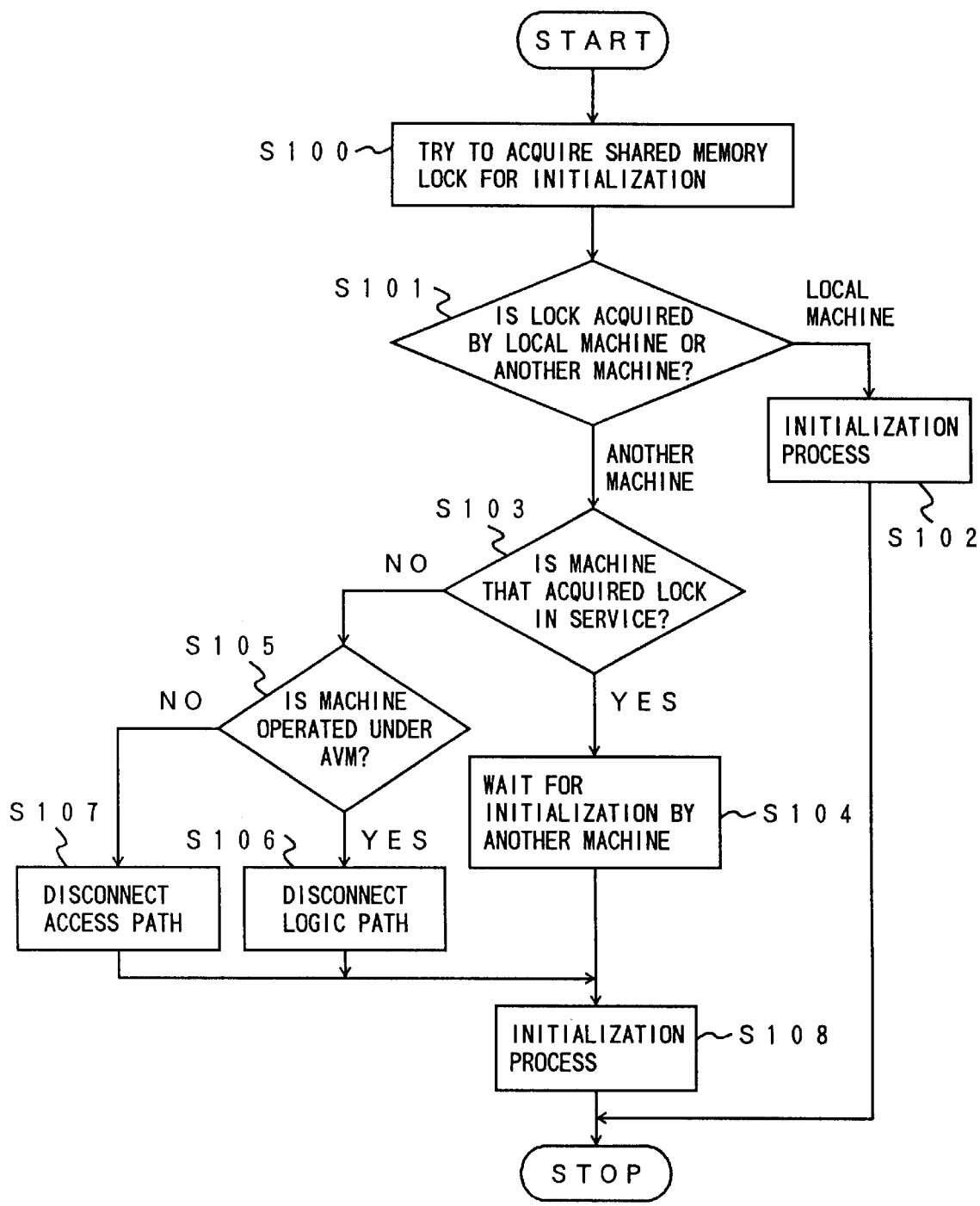
FIG. 17 is a flowchart of the initialization process according to the first embodiment of the present invention.

A description of the parts described above will be given below. FIG. 17 is a flowchart of the initialization process according to the first embodiment of the present invention.

The initialization is executed by each OS. In the example shown in FIG. 17, it is assumed that one of the logic machine is responsible for the initialization.

step 100) The OS of the logic machine tries to acquire a lock in the shared memory 100 for initialization.

step 101) The initialization monitoring part determines that the control is turned over to step 103 if another machine has already acquired the lock, and that the control is turned over to step 102 if the local machine, that is, the machine in which the initialization part is provided, has acquired the lock.

step 102) The initializing part of the local machine performs the initialization process.

step 103) The stop monitoring part checks to see if the machine that has acquired the lock is in service. The checking is done through communication between the OSs (between the machines) after acquiring the address for the target machine. If a response is returned in the communication, it is determined that the target machine is in service, whereupon the control is turned over to step 104. If there is no response, the control is turned over to step 105.

step 104) The controller waits for completion of the initialization process by the other machine in service. Upon completion, the control is turned over to step 108.

step 105) The virtual/real determination part determines whether or not the target machine is operated under the AVM based on the acquired machine address thereof. If the target machine is operated under the AVM, the control is turned over to step 106. If the target machine is operated as a real machine, the control is turned over to step 107.

step 106) The path disconnecting part disconnects the logic path if the target machine (downed machine) is operated under the AVM, whereupon the control is turned over to step 108.

step 107) The path disconnecting part disconnects the access path if the target machine is operated as a real machine.

step 108) The initializing part executes the initialization process.

A detailed description of a method for controlling the downed machine will be given in the second embodiment.

[ii. identifier assigning process during communication]

A description will now be given of identifier assigning process in communication.

When allocating resource of the machine 200 to the logic machines 220-1–220-n, the AVM 210 gives the logic machines 220-1–220-n unique virtual machine numbers. Accordingly, each of the AVMs in the system includes unique numbers.

Figure 18:
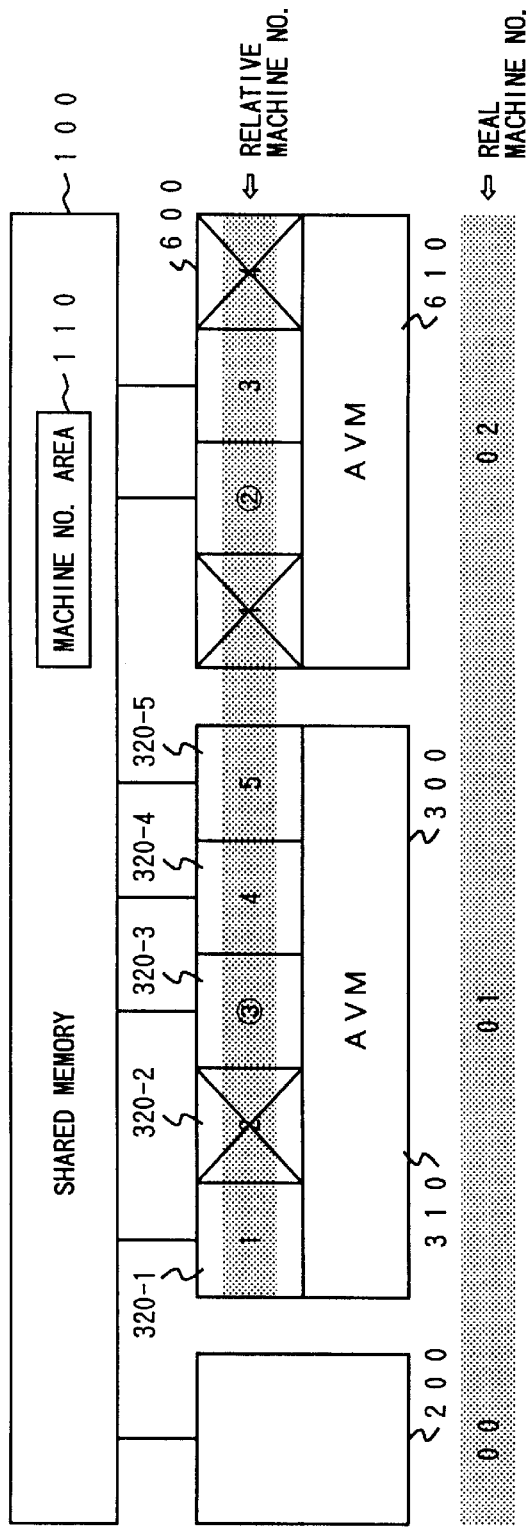
FIG. 18A shows real machine Nos. assigned to machines, and relative machine Nos. assigned to logic machines included in each of the machines operated as virtual machines.
FIG. 18B shows logic machine Nos. generated from the real machine Nos. and the relative machine Nos.

FIGS. 18A and 18B are diagrams explaining the process for assigning identifiers to the logic machines according to the first embodiment.

FIG. 18A shows real machine Nos. assigned to machines 200, 300 and 600, and relative machine Nos. assigned to the logic machines included in each of the machines operated as virtual machines, the machine 300 being provided with the AVM 310 and the machine 600 being provided with an AVM 610. FIG. 18B shows logic machine Nos. generated from the real machine Nos. and the relative machine Nos.

Upon a request from the OS of individual logic machines, the AVMs 310 and 610 notifies the OS of the relative machine No. The OS is responsible for generating the logic machine No. from the real machine No. and the relative machine No. Referring to FIG. 18A, the logic machine indicated by "X" is regarded as being in a stopped state. No logic machine No. is given to the logic machine that is in a stopped state.

For example, the AVM 310 reads the real machine No. "01" given to the machine 300 and the relative machine No. for the logic machine to which a logic machine No. is to be given. For example, the logic machine 320-3 is given a logic machine No. "013" as per "01"+"3".

Figure 19:
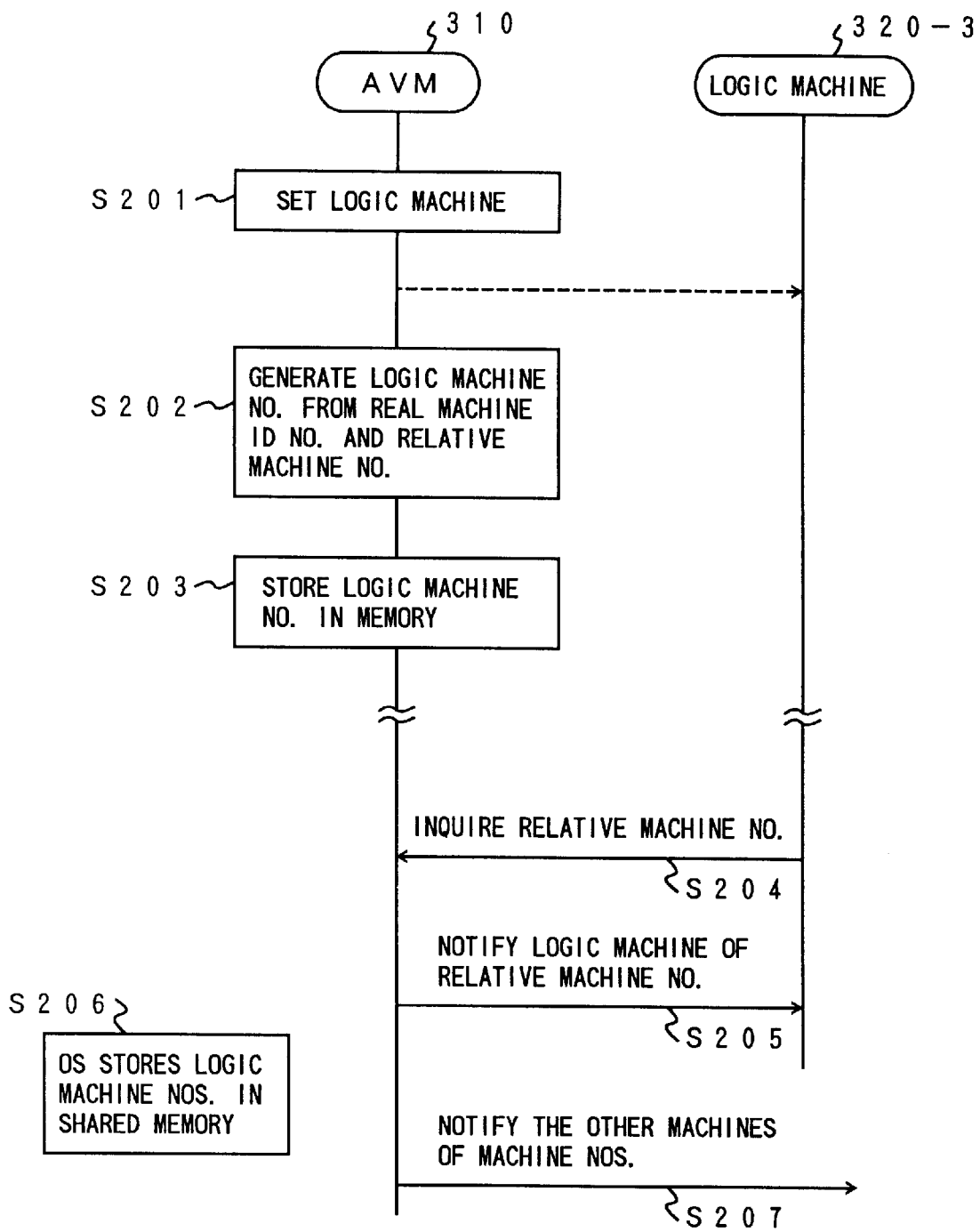
FIG. 19 is a sequence chart explaining the process for assigning logic machine Nos. to the logic machines, according to the first embodiment.

FIG. 19 is a sequence chart explaining the process for assigning logic machine Nos. to the logic machines, according to the first embodiment. In the description that follows, the assigning of the logic machine No. to the logic machine 300-3 having the relative machine No. "3" in the machine 300 shown in FIGS. 19A is taken as an example.

step 201) The AVM 310 sets the logic machines under its control in the machine 300. In the example of FIG. 18A, a total of four logic machines 320-1, 320-3, 320-4 and 320-5 are set.

step 202) The AVM of the machine 300 acquires the real machine No. and the relative machine No. from the memory (not shown) so as to generate the logic machine No. by synthesis.

step 203) The logic machine No. generated in step 202 is stored in the memory (not shown) in the AVM 310.

step 204) The OS of the logic machine 320-3 inquires the relative machine No. of the AVM 310.

step 205) The AVM 310 reads the relative machine No. from the memory and transfers the same to the logic machine 320-3.

step 206) The OS transfers the logic machine Nos. for all the logic machines in the machine 300 stored in the memory to a machine number area 110 in the shared memory 100.

step 207) If any other machine is connected to the shared memory 100, the OS transfers the logic machine Nos. for the logic machines in the machine 300 as well as the real machine No. of the machine 300 to the other machines.

Figure 20:
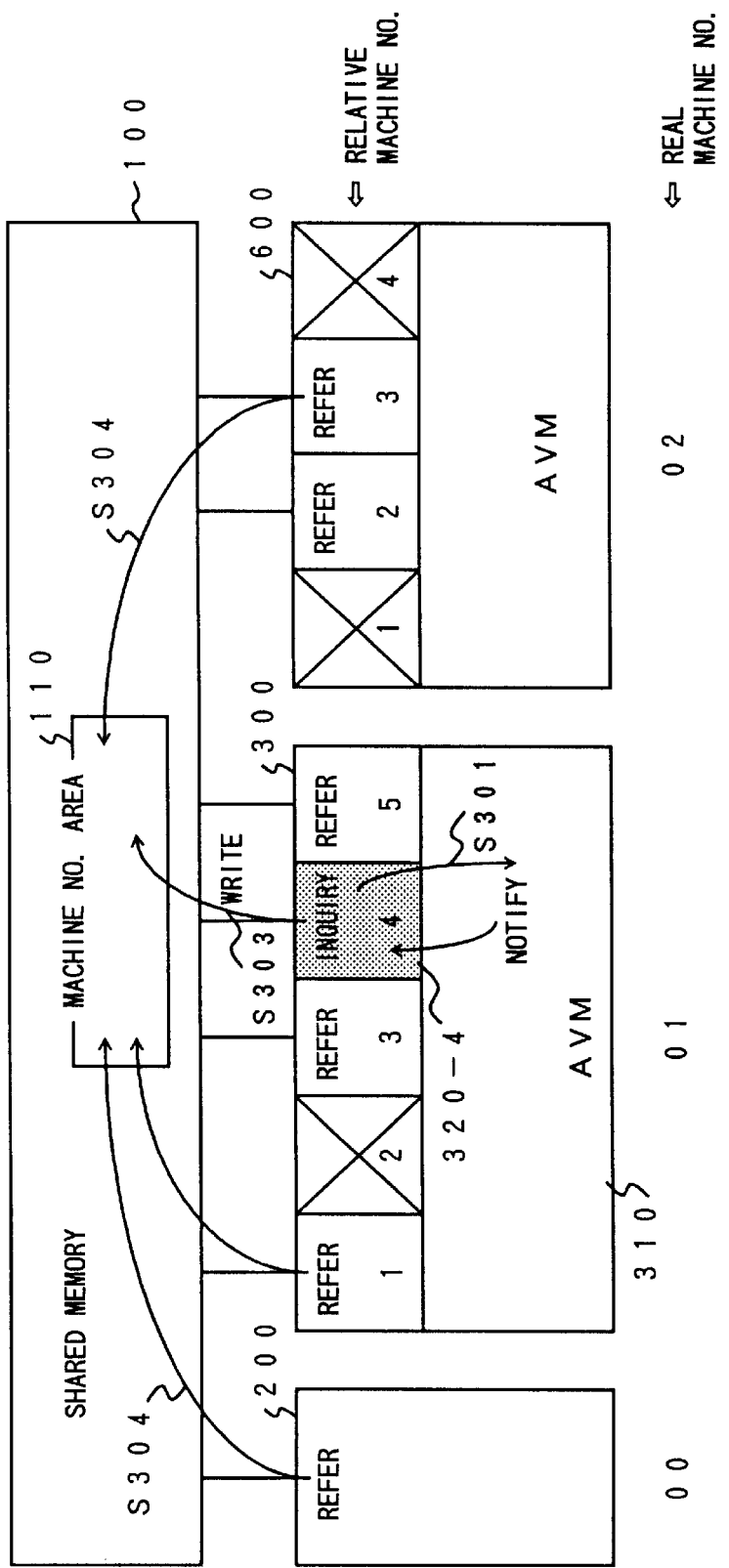
FIG. 20 is a diagram explaining the operation of referring to a logic machine No. according to the first embodiment.

FIG. 20 is a diagram explaining the operation of referring to a logic machine No. according to the first embodiment. Numbers following the alphabet "S" in FIG. 20 correspond to the numbers give to the steps described below.

step 301) The logic machine 320-4 having the relative machine No. "4" in the machine 300 inquires the relative machine No. of the logic machine 320-4 of the AVM 310 of the machine 300.

step 302) The AVM 310 of the machine 300 notifies the logic machine 320-4 of the relative machine No. "014".

step 303) The OS in the logic machine 320-4 writes the logic machine No. "014" of the logic machine 320-4 in the machine number area 110 in the shared memory 100.

step 304) When the machine 200 or the machine 600 requires the logic machine No. of the logic machine 320-4 in the machine 300, the requiring machine issues an inquiry to the machine number area 110 in the shared memory 100 so as to read necessary information from the shared memory 100. In this way, it is possible for a machine to refer to the logic machine No., registered in the shared memory 100, of a logic machine belonging to another machine. Thus, identification of a call originating logic machine and a call receiving logic machine in communication between logic machines belonging to different machines is possible.

Figure 21:
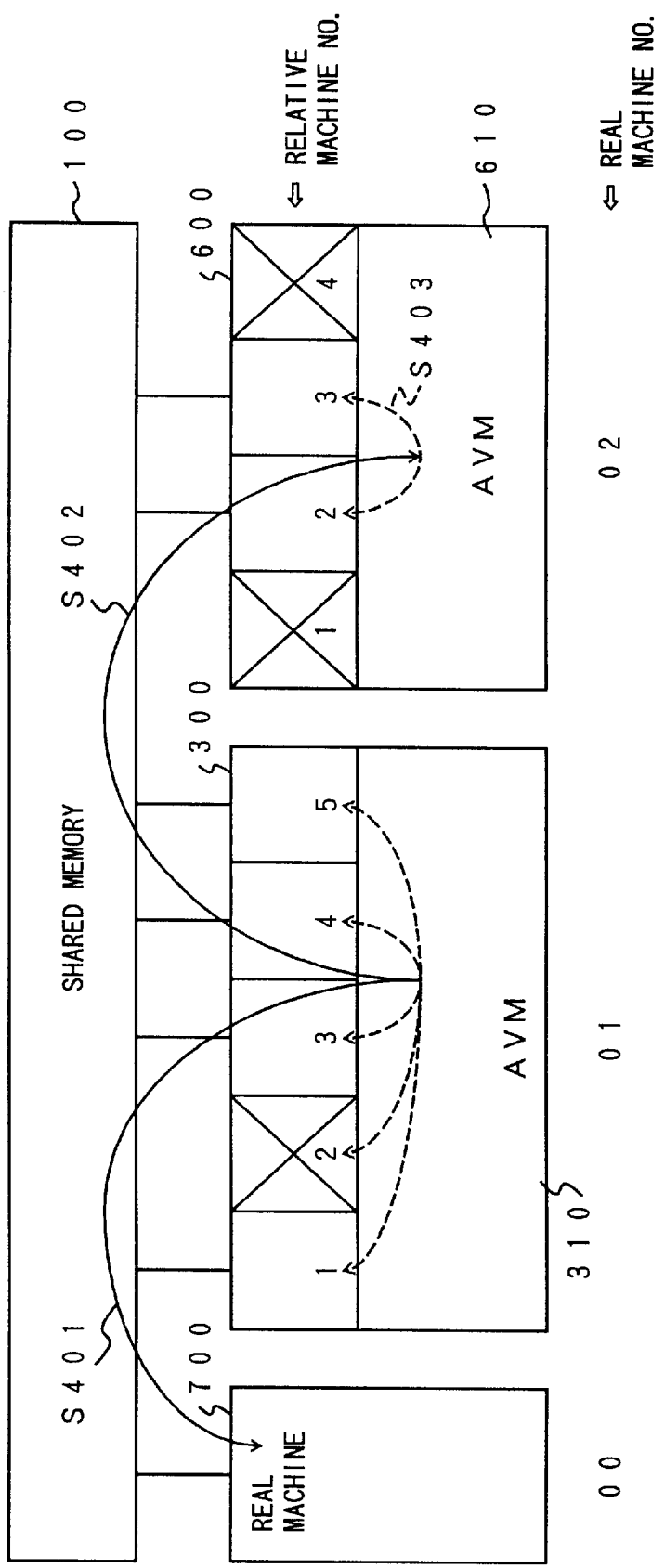
FIG. 21 is an example of operation of notifying another machine of a logic machine No.

FIG. 21 is an example of operation of notifying another machine of a logic machine No.

step 401) The AVM 310 of the machine 300 directly notifies a machine 700 of the logic machine No. "014" of the logic machine 320-4, because the machine 700 is operated as a real machine.

step 402) Notification to a virtual machine is done such that the AVM 310 of the machine 300 specifies a logic machine operated under the AVM 310 using a parameter and transfers the required No. to the AVM 610 of the virtual machine 600.

step 403) The AVM 610 of the machine 600 that receives the notification notifies all the logic machines under its control of the logic machine No. "014" received.

[iii. operating state monitoring process]

A description will now be given of operating state monitoring according to the first embodiment.

The description given below concerns an example of acquiring the state of a logic path connecting each logic machine in a given machine and the shared memory.

In communication between a plurality of computer systems (machines) via the shared memory, information relating to whether the destination machine involved in the communication is operated as a real machine or a virtual machine is required.

Whether the destination machine is operated as a real machine or a virtual machine can be determined based on a response from the destination machine. If the destination machine is operated as a real machine, a corresponding response is returned for a DIAGNOSE instruction (STGCN or STGCF) ("access path/machine No./connection-hardware information collecting instruction"). In case the destination machine is operated as a virtual machine, an inquiry is issued to the AVM of the destination machine. The AVM of the machine that received the inquiry places, in a parameter area, information indicating whether or not each of the logic machines under the control of the AVM is in service and information indicating whether or not a logic path connecting each of the logic machines and the shared memory is valid, and returns information necessary for the inquiry originating machine.

In this embodiment, it is assumed that information relating to the operating state is not stored in the shared memory 100 and that the AVM that requires the information directly inquires the operating state information of another machine.

Figure 22:
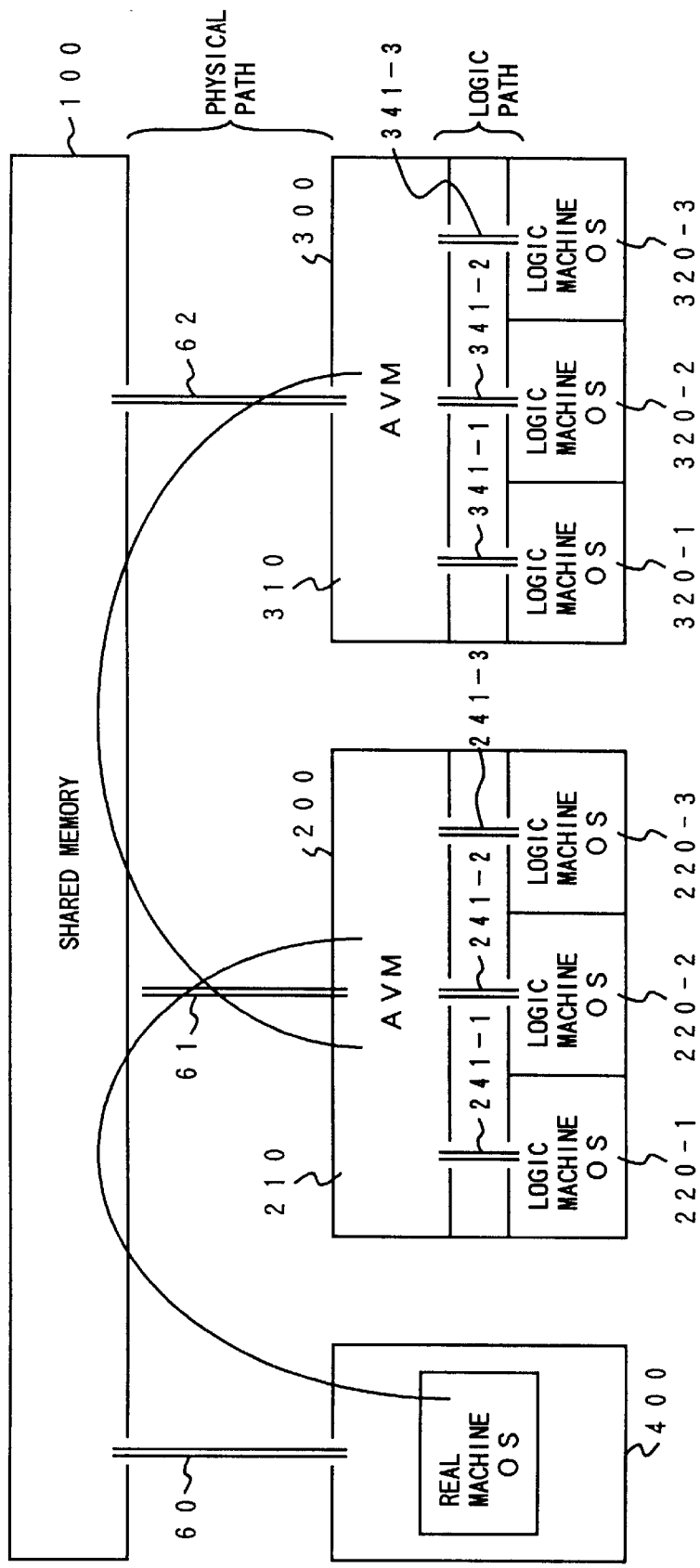
FIG. 22 shows a concept behind operating state information acquisition according to the first embodiment.

FIG. 22 shows a concept behind operating state information acquisition according to the first embodiment. The access path 61 connects the machine 200 with the shared memory 100; the access 62 path connects the machine 300 with the shared memory 100; and the access path 60 connects the machine 400 with the shared memory 100. The access paths 61, 62 and 60 are physical paths. Logic paths (virtual paths) 241-1, 241-2 and 241-3 connect the logic machines 220-1, 220-2 and 220-3 with the AVM 210, respectively. In the illustrated example, it is assumed that the logic machine 220-1 in the machine 200 originates a request for the operating state information relating to the machines 400 and 300. If the AVM is the destination, the operating state information relating to all the logic machines under its control are requested.

Figure 23:
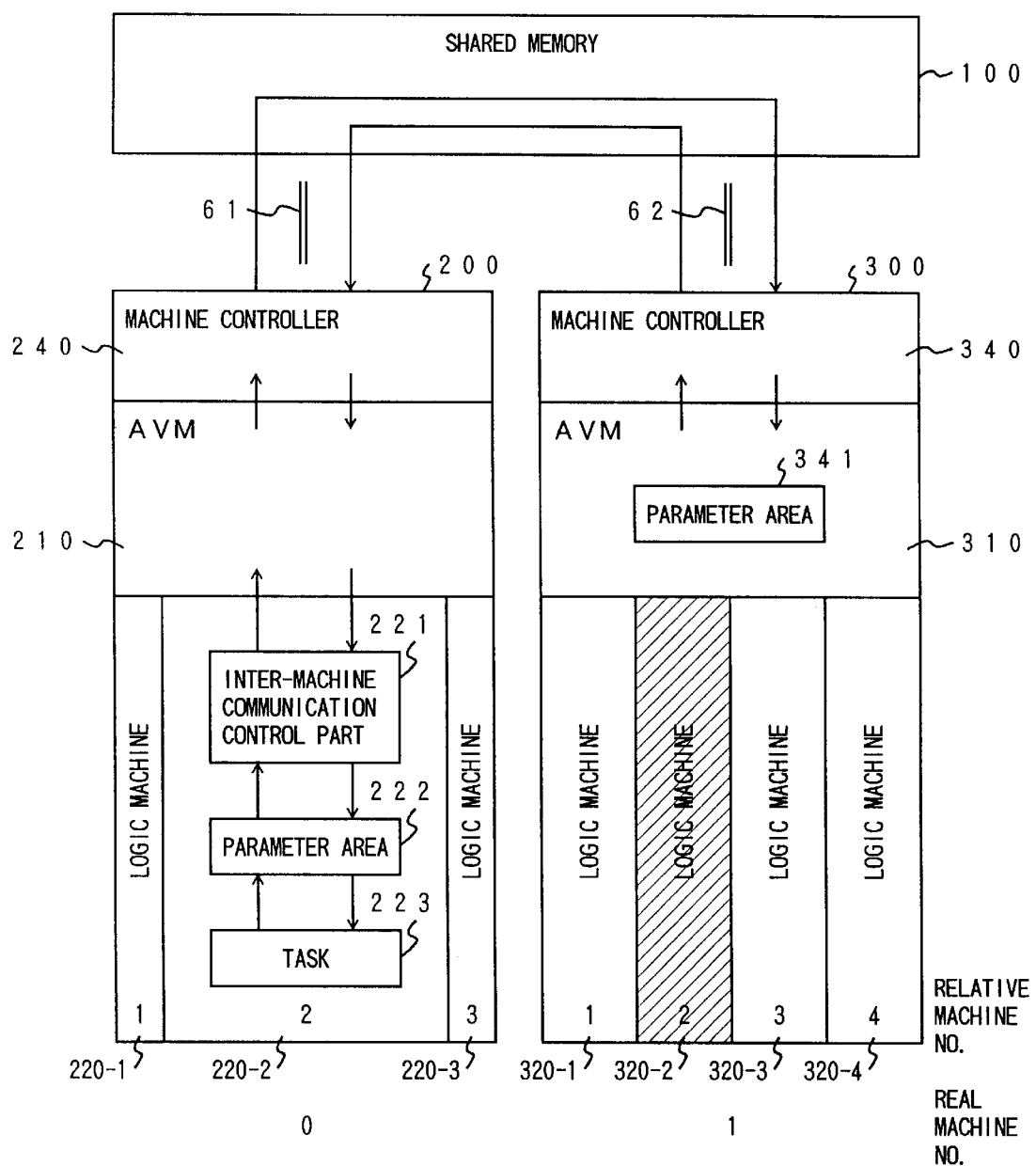
FIG. 23 shows a system configuration with reference to which the operating state information acquisition according to the first embodiment is described.

FIG. 23 shows a system configuration with reference to which the operating state information acquisition according to the first embodiment is described. In the system shown in FIG. 23, it is assumed that the virtual machine 200 inquires the operating state information of the machine 300.

The machine 200 comprises the machine controller 240 constructed of hardware, the AVM 210 and the plurality of logic machines 220-1–220-3.

Figure 24:
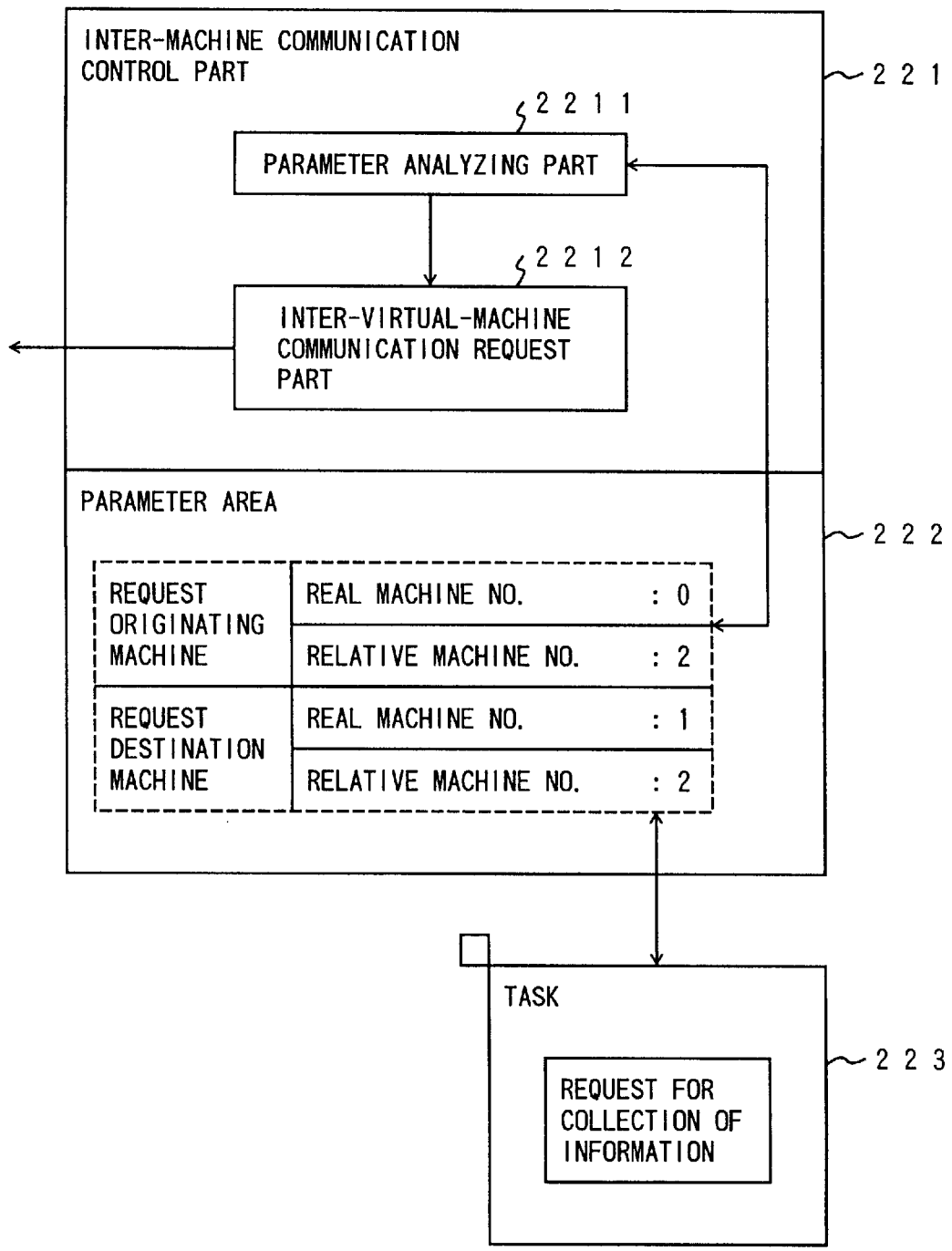
FIG. 24 shows the detailed construction of a logic machine according to the first embodiment.

Each of the logic machines 220-1–220-3 in the machine 200 comprises an inter-machine communication control part 221, a parameter area 222 and a task 223 that originates a request for collection of information. FIG. 24 shows the detailed construction of a logic machine according to the first embodiment. Referring to FIG. 24, the inter-machine communication control part 221 includes a parameter analyzing part 2211 and a inter-virtual-machine communication request part 2212. Provided in the parameter area 222 are the real machine No. (for example, 0) and the relative machine No. (for example, 2) of a request originating machine, and the real machine No. (for example, 1) and the relative machine No. (for example, 2) of a request receiving machine.

Figure 25:
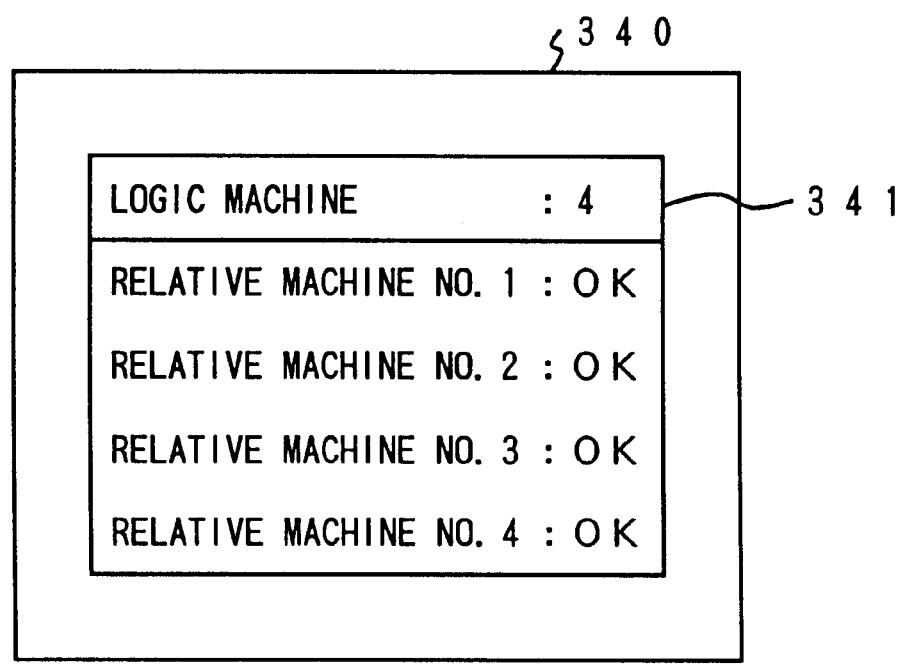
FIG. 25 shows an example of a parameter area, according to the first embodiment, provided in a destination machine of an inquiry.

A parameter area 341 as shown in FIG. 25 is provided in the AVM 310 of the machine 300. Information relating to the logic machines in the machine 300 is set as parameters in the parameter 341. Specifically, the number of logic machines (for example, 4) and the state of each of the logic machines (OK or NO) are set as parameters.

Figure 26:
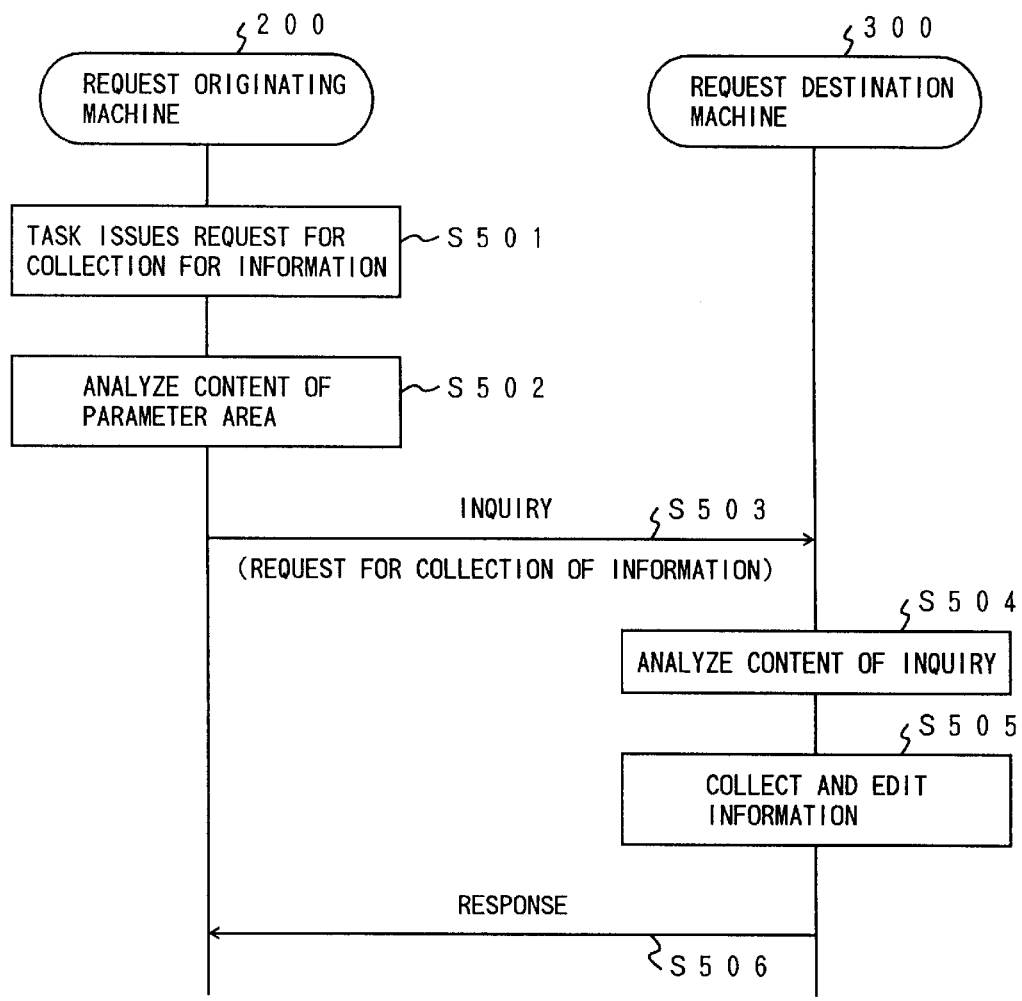
FIG. 26 is a sequence chart explaining an operating state inquiring operation according to the first embodiment.

A description will now be given, with reference to FIG. 23, of an operation of inquiring the operating state information. FIG. 26 is a sequence chart explaining an operating state inquiring operation according to the first embodiment.

step 501) The task 223 of the logic machine 220-2 in the machine 200 issues a request for collection of information.

step 502) The inter-machine communication control part 221 of the logic machine 220-2 controls the parameter analyzing part 2211 to analyze the content of the parameter area 222. The parameter analyzing part 2211 of the inter-communication control part 221 refers to the parameter area 222 and acquires the real machine No. "1" and the relative machine No. "2" of the request destination machine, and the real machine No. "0" and the relative machine No. "2" of the request originating machine (that is, the machine 200). The parameter analyzing part 2211 then transfers the acquired Nos. to the inter-virtual-machine communication request part 2212 of the inter-machine communication control part 221.

step 503) The inter-virtual-machine communication request part 2212 issues a request to the machine corresponding to the acquired real machine No. and the relative machine No. via the AVM 210. In the example shown in FIG. 23, the request is issued to the logic machine 320-2 in the machine 300.

step 504) The machine controller 340 of the machine 300 analyzes the content of the inquiry sent from the machine 200.

step 505) The machine controller 340 of the machine 300 delivers the parameters to the parameter area 341 of the AVM 310. The AVM 310 responds and returns associated parameters to the machine controller 340. The machine controller 340 then collects information relating to the configuration of the machine 300, edits the information and stores the edited information in the parameter area 341. The machine controller 340 inquires of the AVM 310 logic machine identifiers of the logic machines having a logic path connected to the AVM 310 and the operating state of the logic machines, that is, information indicating whether or not each of the logic machines is in service. In response to the inquiry from the machine controller 340, the AVM 310 checks the logic path between itself and each of the logic machines, and recognizes the operating state of the logic machines connected to the logic path. The AVM 310 sets information thus obtained in the parameter area 341.

step 506) The AVM returns the content of the parameter 341 to the machine 200.

If the machine 200 is able to determine that the logic machine 320-2 in the machine 300 is in service based on the operating state information acquired, that is, based on an "OK" returned in step 506, the machine 200 enters communication with the logic machine 320-2.

As has been described, the first embodiment makes it possible, in communication between a plurality of machines, for the request originating machine to obtain information as to whether or not the destination machine is in service, and the like.

[iv. machine-to-machine communication process]

A description will now be given of how communication is processed between machines, according to the present invention. In a computer system, communication may take place between the OS of a machine and the AVM for controlling logic machines (OS to AVM), or between the machines (OS to OS). When communication between the OSs is required, it is necessary to specify a logic machine in the call originating machine and a logic machine in the call destination machine. In case communication is to take place between the OSs of logic machines operated under the AVM, the AVM intermediates the communication.

Figure 27:
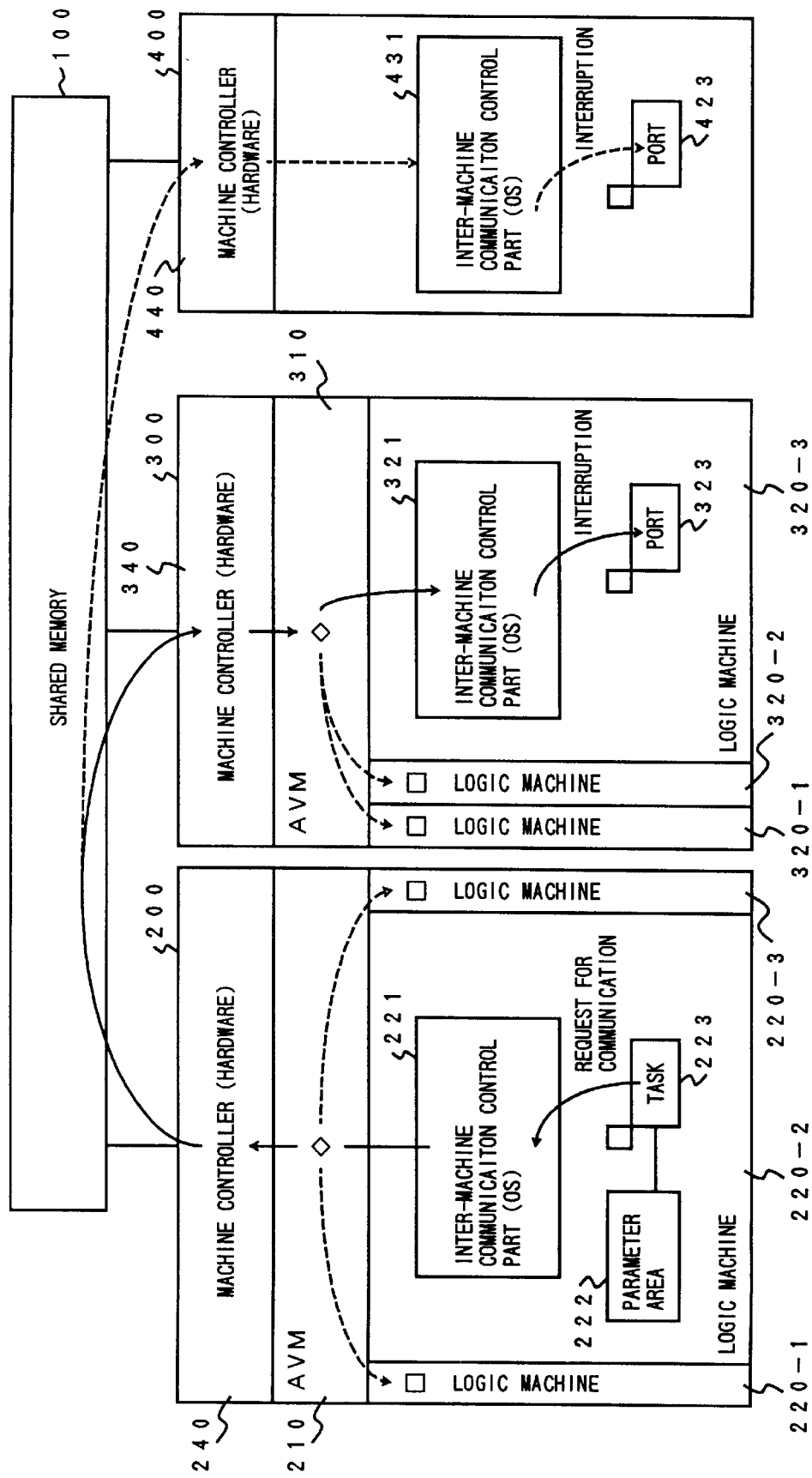
FIG. 27 is a diagram explaining communication process according to the first embodiment effected between machines.

FIG. 27 is a diagram explaining communication process according to the first embodiment effected between machines. Those components that are the same as the components of FIG. 23 are designated by the same reference numerals. The machine 200 has the logic machines 220-1–220-3, the machine 300 has the logic machines 320-1–320-3, and the machine 400 is operated as a real machine having no logic machines.

In the description that follows, it is assumed that the logic machine 220-2 in the machine 200 initiates communication with the logic machine 320-3 in the machine 300 via the shared memory 100.

The logic machine 220-2 in the machine 200 has the inter-machine communication control part 221 and the task 223, wherein the task 223 issues a request for communication between machines to the inter-machine communication control part 221. The task 223 acquires the real machine No. and the relative machine No. of the call destination machine by referring to the parameter area 222.

The AVM 210 of the machine 200 determines whether or not the call destination machine (machine 300) is another machine or a logic machine belonging to another machine. If the call destination is another real machine or a logic machine belonging to another machine, the AVM 210 issues a request for communication. If the call destination machine resides within the machine 200, the AVM 210 causes an interruption in the OS of the target logic machine under the control of the AVM 210. Since the destination machine resides in the machine 300, the machine controller 340 of the machine 300 honors the communication request via the shared memory 100 and acquires the relative machine No. based on information transmitted from the call originating machine (machine 200). The machine controller 340 then causes an interruption in the AVM 310.

The AVM 310 of the machine 300 determines which of the logic machines under its control is the destination of the communication, based on the relative machine No. transferred from the machine controller 340. The AVM 310 then dispatches the target logic machine (the logic machine 320-3) and causes an interruption in the inter-machine communication control part 321 in the logic machine 320-3.

The inter-machine communication control part 321 in the logic machine 320-3 receives all the information transmitted from the call originating machine 200 and activates a port provided in a task 323 for individual communication sessions.

Figure 28:
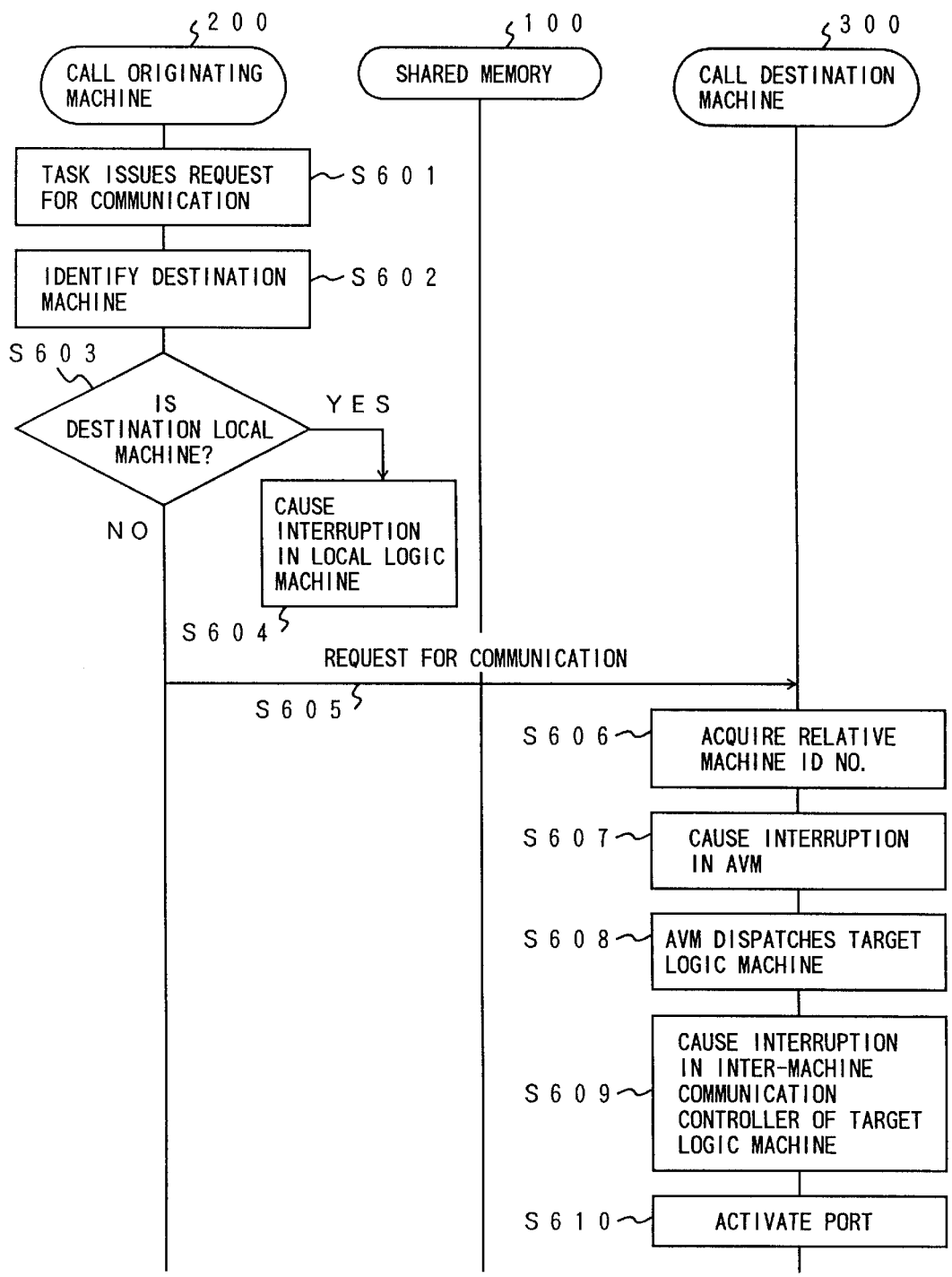
FIG. 28 is a sequence chart of a first communication operation according to the first embodiment executed between machines.

A description will now be given, with reference to FIG. 28, of how a series of communication processes are executed. FIG. 28 is a sequence chart of a first communication operation according to the first embodiment executed between machines.

step 601) The task 223 provided in the logic machine 220-2 of the call originating machine 200 transfers the real machine No. and the relative machine No. of the call destination machine to the inter-machine communication control part 221 and requests a communication. Specifically, the task 223 acquires the real machine No. and the relative machine No. of the call originating machine and the call destination machine and transfers the Nos. to the inter-machine communication control part 221. The content of the request for communication includes a communication instruction, a request code, the real machine No. and the relative machine No. of the call originating machine and the call destination machine.

While the task 223 transfers the real machine Nos. and the relative machine Nos. to the inter-machine communication control part 221 in this example, it is also possible to issue an inquiry to the shared memory 100 so that the Nos. are acquired from the shared memory 100.

step 602) The inter-machine communication control part 221 of the logic machine 220-2 transfers the real machine Nos. and the relative machine Nos. to the AVM 210 of the machine 200. The AVM 210 identify the real machine (machine 300) that is the destination of the communication, based on the real machine Nos. and the relative machine Nos.

step 603) The AVM 210 determines whether the requested communication has as its destination the machine 200 or another machine, based on the real machine No.

step 604) If the destination is the machine 200, the AVM 210 causes an interruption in the logic machine in the machine 200 corresponding to the relative machine No.

step 605) If the destination is another machine (in this case, the machine 300), the AVM 210 turns the control to the machine controller 240.

step 606) The machine controller 240 issues a request for communication to the machine 300 via the shared memory 100.

step 607) The machine controller 340 of the machine 300 honors the communication request and confirms that the communication has as its destination the machine 300 by referring to the real machine No. If it is duly determined that the communication with the machine 300 is requested, the machine controller 340 acquires the relative machine No. from the information transmitted from the machine 200. The machine controller 340 then delivers the relative machine No. to the AVM 310. In response to the delivery of the relative machine No. by the machine controller 340, the AVM 310 causes an interruption.

step 608) The AVM 310 dispatches the logic machine 320-3 corresponding to the relative machine No.

step 609) The AVM 310 causes an interruption in the inter-machine communication control par 321 of the target logic machine 320-3.

step 610) The inter-machine communication control part 321 of the logic machine 320-3 receives all the information transmitted from the call originating machine 200 and activates the port provided in the task 323 for individual communication sessions.

The AVM 310 of the receiving machine effects control such that the call originating machine does not recognize that the reception is completed until communication with the logic machine 320-3 is established.

In communication between machines (OSs) via the shared memory 100, communication instructions (GSIGP instructions) provided in the hardware are employed. A transmission according to this scheme ends when the hardware writing communication text in a specific area in the shared memory 100. The call originating machine regards that the reception by the destination machine has been completed when the entirety of the text is received (loaded) from the shared memory 100. Therefore, even if the OS of the logic machine has not received the text, the call originating machine recognizes that the reception is completed as long as the entirety of the text is imported from the shared memory 100. In the communication operation according to the first embodiment, the AVM 310 does not import the entirety of the text through the step 609 describe above. Therefore, premature recognition by the call originating machine that the reception is completed does not occur even when the AVM 310 executes the processes through step 609. Thereby, in a machine-to-machine communication according to the first embodiment, the call originating machine can safely determine that the reception of the content of the communication is completed by the target machine, based on the information indicating whether or not the entirety of the transmitted information is read from the shared memory 100 into the call destination machine. A detailed description of this will be given in the following section v.

While the communication described above has as its destination one logic machine belonging to a machine in the above-described example, it is also possible to issue a request for communication having as its destination a plurality of logic machines or all the logic machines in a machine. In this case, the task of the logic machine of the call originating machine may define as many number of relative machine Nos. for the call destination machines as required.

Figure 29:
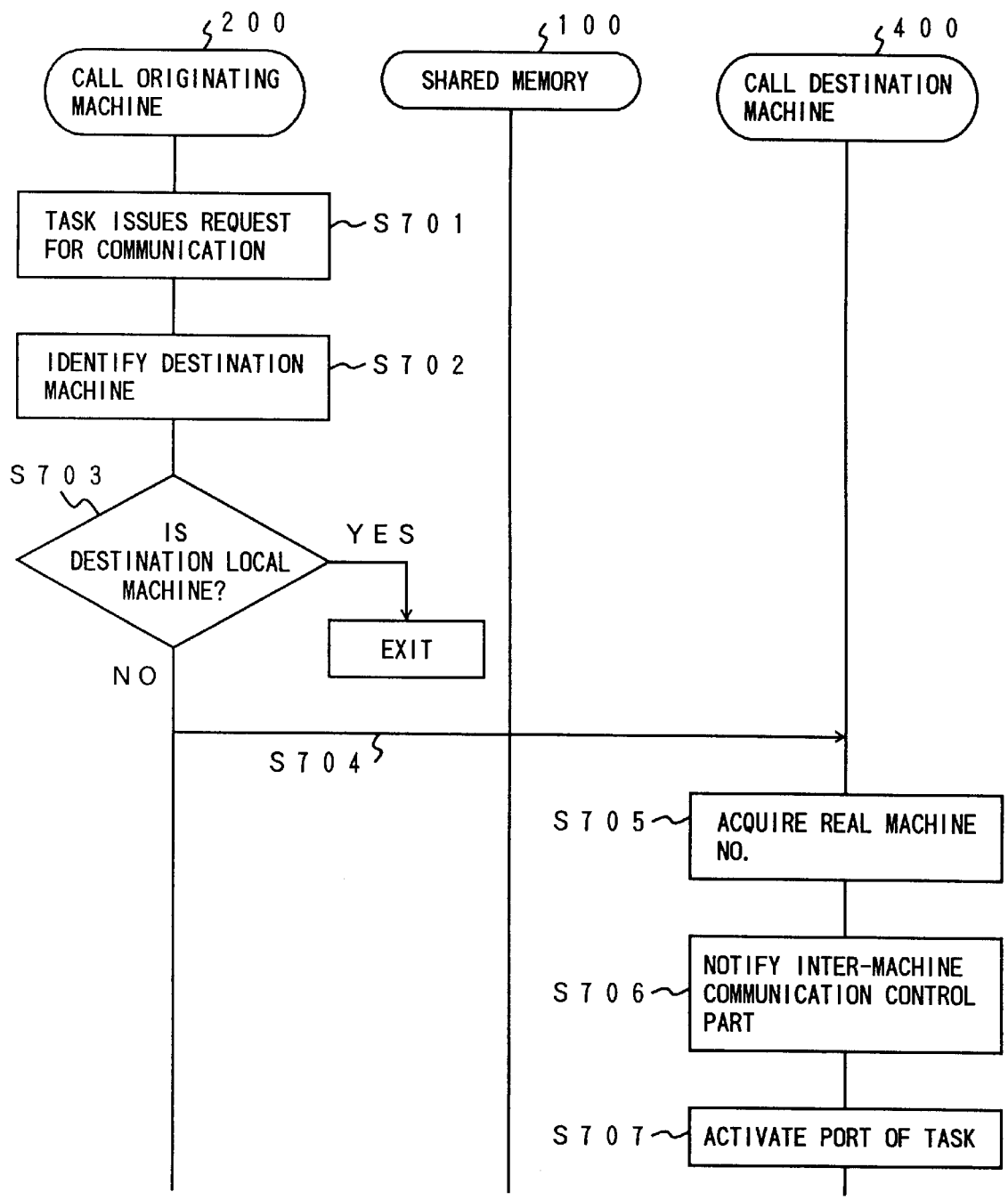
FIG. 29 is a sequence chart of a second communication operation according to the first embodiment executed between machines.

A description will now be given of a case where a logic machine issues a request for communication with another real machine. FIG. 29 is a sequence chart of a second communication operation according to the first embodiment executed between machines. In the description that follows, it is assumed that the call originating machine is the machine 200 and the call destination machine is the machine 400.

step 701) The task 223 provided in the logic machine 220-2 of the call originating machine 200 transfers the real machine No. and the relative machine No. of the call destination machine to the inter-machine communication control part 221 and issues a request for communication having as its destination the machine specified by the Nos. Specifically, the task 223 acquires the real machine No. and the relative machine No. of the call originating machine and the call destination machine from the parameter area 222 in the logic machine 220-2 and transfers the Nos. to the inter-machine communication control part 221.

step 702) The inter-machine communication control part 221 of the logic machine 220-3 delivers the real machine No. and the relative machine No. to the AVM 210 of the machine 200. The AVM 210 specifies the call destination machine (machine 400) based on the real machine No.

step 703) The AVM 210 determines whether the call destination machine is the machine 200 itself or another real machine based on the real machine No. If the machine 200 is the destination, the process is terminated.

step 704) If the destination is another real machine, the machine controller 240 transmits a request for communication to the call destination machine 400 via the shared memory 100.

step 705) The machine controller 440 of the machine 400 acquires the real machine No. from the communication request and confirms that the communication has as its destination the machine 400.

step 706) The machine controller 440 transfers the communication request to the inter-machine communication control part 431.

step 707) The inter-machine communication control part 431 activates a port of the task 423.

As has been described, the first embodiment of the present invention enables smooth communication between a logic machine and a logic machine of another machine, and communication between a logic machine and another machine (real machine).

The communication according to the first embodiment is not limited to the examples described above. The communication may take place between a real machine and a real machine, or the communication may be originated by a real machine and received by a logic machine of another machine.

[v. interruption for communication]

A description will now be given of how an interruption is processed according to the first embodiment.

This aspect of the invention concerns queuing executed when an interruption occurs between machines.

In a first example of the interruption process, the AVM of the receiving machine is provided with the function of queuing communication requests. When the queue overflows, the machines in the system are notified of the identity of the destination logic machine requested in communication so that communication requests from the call originating machine are halted.

Figure 30:
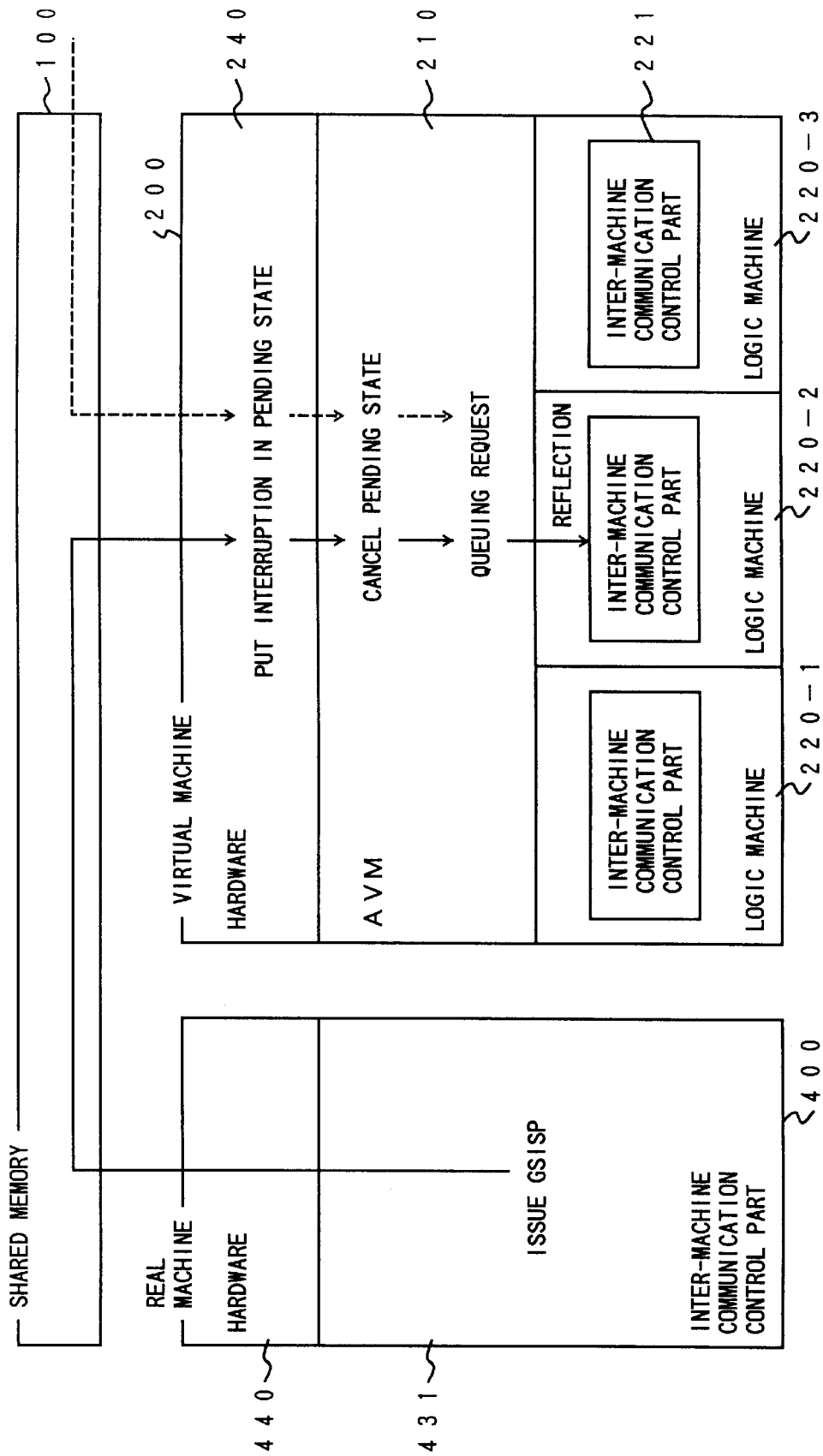
FIG. 30 is a diagram explaining a first example of interruption process according to the first embodiment.
Figure 31:
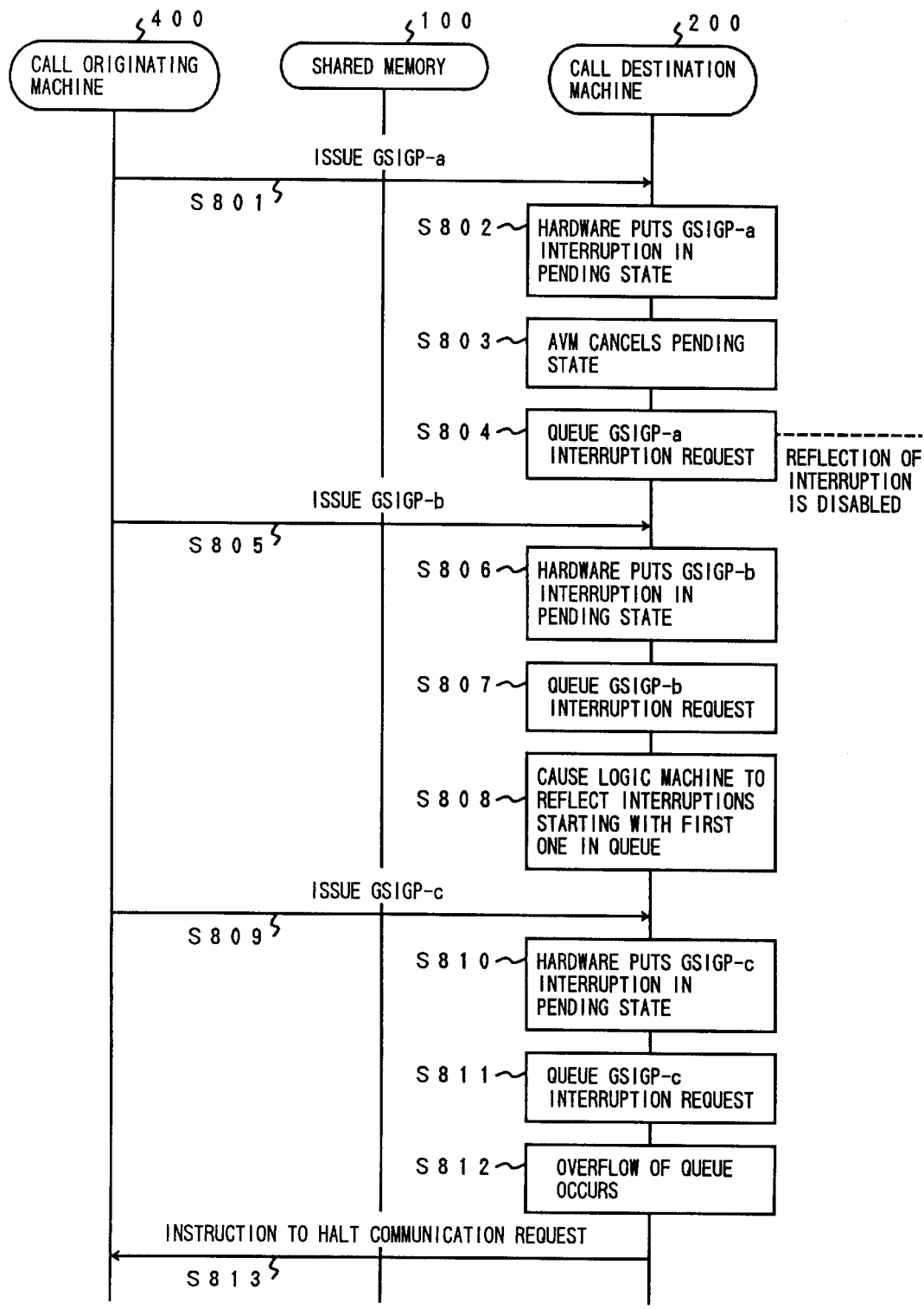
FIG. 31 is a sequence chart for the operation of the first example of the interruption process according to the first embodiment.

FIG. 30 is a diagram explaining the first example of interruption process according to the first embodiment. FIG. 31 is a sequence chart for the operation of the first example of the interruption process according to the first embodiment.

step 801) The machine 400 issues a GSIGP instruction (a) to the logic machine 220-2 in the machine 200, requesting communication therewith, via the shared memory 100.

step 802) Since the interruption is not reflected by the machine 200, the machine controller 240 of the machine 200 puts the interruption in a pending state.

step 803) When the AVM 210 is ready for the interruption, the machine controller 240 causes the AVM 210 to reflect the interruption. At this stage, the pending state of the interruption is canceled. This is regarded by the other machines as an reflection of the interruption.

step 804) The AVM 210 acquires the GSIGP instruction (a) and identifies the destination logic machine based on the relative machine No. and places the interruption in one of the queues, each of the queues being provided for a corresponding logic machine. (It is assumed that reflection of the interruption by the target logic machine is disabled at this stage).

step 805) The machine 400 issues a second GSIGP instruction (b) to the logic machine 220-2 in the machine 200 via the shared memory 100.

step 806) The machine controller of the machine 200 puts the interruption in a pending state as in step 802 above.

step 807) The AVM 210 places the GSIGP instruction (b) requesting an interruption in a queue.

step 808) The AVM 210 causes the logic machine 220-2 to reflect a first communication request in the queue. Subsequently, interruption requests are fetched from the queue one by one and reflected by the logic machine.

step 809) The machine 400 issues a third GSIGP instruction (c) requesting communication with the logic machine 220-2 in the machine 200.

step 810) The machine controller 240 of the machine 200 puts the GSIGP instruction (c) in a pending state.

step 811) The AVM 210 places the GSIGP instruction (c) for requesting communication in a queue.

step 812) An overflow of the queue occurs.

step 813) The AVM 210 instructs the call originating machine 400 to halt communication requests.

While it is assumed in this example that a request to halt communication requests is issued to the machine 400, the request to halt communication requests may similarly be issued to another machine by acquiring the real machine number of the other (call originating) machine. If a logic machine of another machine is the call originating machine, the relative machine No. as well as the real machine No. is acquired so that the request to halt communication requests is issued to the logic machine of the call originating machine.

A description will now be given of a second example of the communication interruption process.

Figure 32:
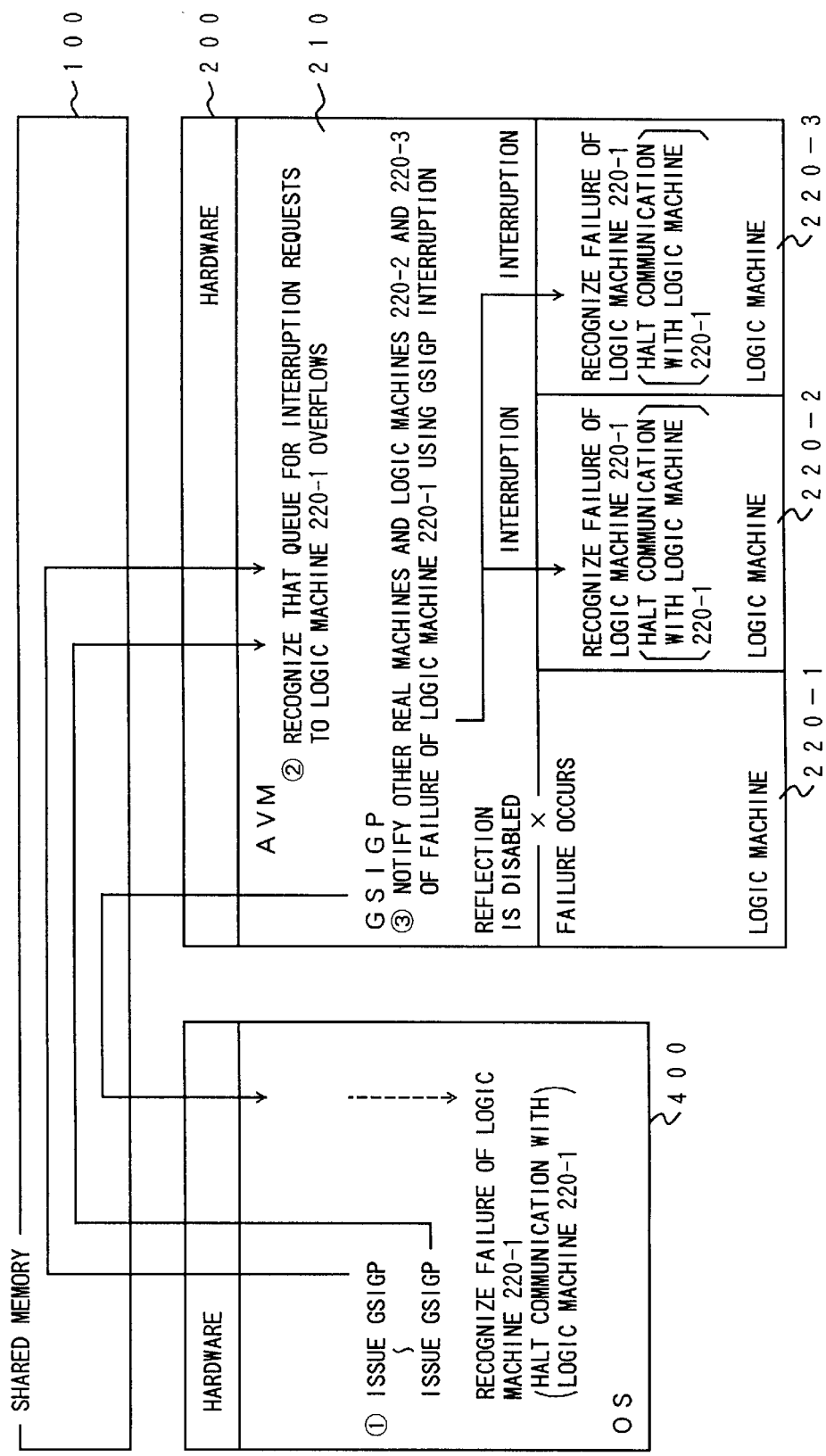
FIG. 32 is a diagram explaining a second example of the interruption process according to the first embodiment.

FIG. 32 is a diagram explaining a second example of the interruption process according to the first embodiment.

While the first example described above concerns a scheme wherein a request to halt communication requests is issued to the call originating machine when there is an overflow of the queue for the call destination logic machine. In the second example, an interruption is issued to another logic machine belonging to the same machine as the original call destination logic machine when a failure occurs in the original call destination logic machine.

Figure 33:
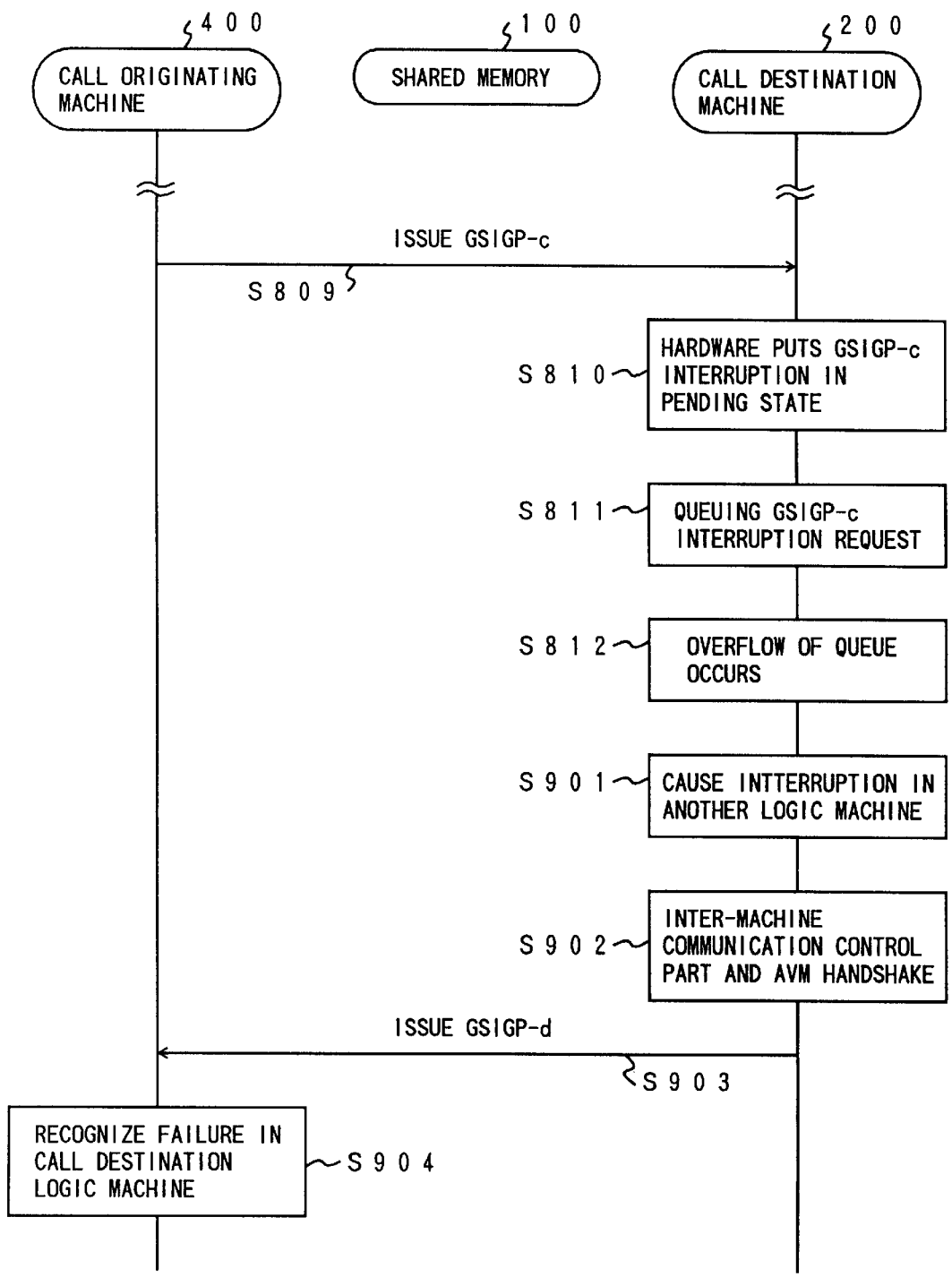
FIG. 33 is a sequence chart for the operation of the second example of the interruption process according to the first embodiment.

FIG. 33 is a sequence chart for the operation of the second example of the interruption process according to the first embodiment. The steps through step 812 are executed in the same manner as the steps of the first example shown in FIG. 31, and the description thereof is omitted.

step 901) The AVM 210 of the call destination machine 200 causes an interruption in a logic machine other than the logic machine specified by the call originating machine 400 as the destination machine. In the example shown in FIG. 33, an interruption is caused in the logic machines 220-2 and 220-3 in response to an overflow of the queue for the logic machine 220-1 specified by the machine 400, or in the event of another type of failure.

step 902) A handshake between the AVM and the inter-machine communication control part (OS) of the logic machines 220-2 and 220-3 takes place. The machine 400 is then notified, by means of a communication interruption using a GSIGP instruction, of an occurrence of a failure in the logic machine specified by the call originating machine 400 as the destination machine. In this way, the machine 400 is instructed to halt communication with the logic machine 220-1 in the event of a failure in the logic machine 220-1.

step 903) The OSs of the call originating machine 400 and the other machines recognize, by means of the GSIGP instruction, that a failure has occurred in the call destination logic machine.

A description will now be given of a third example of the interruption process.

The third example concerns a scheme wherein, when a new interruption is caused, a determination is made as to whether or not there are communication requests queued in the shared memory 100. If there are, communication requests queued in the shared memory 100 are processed.

Figure 34:
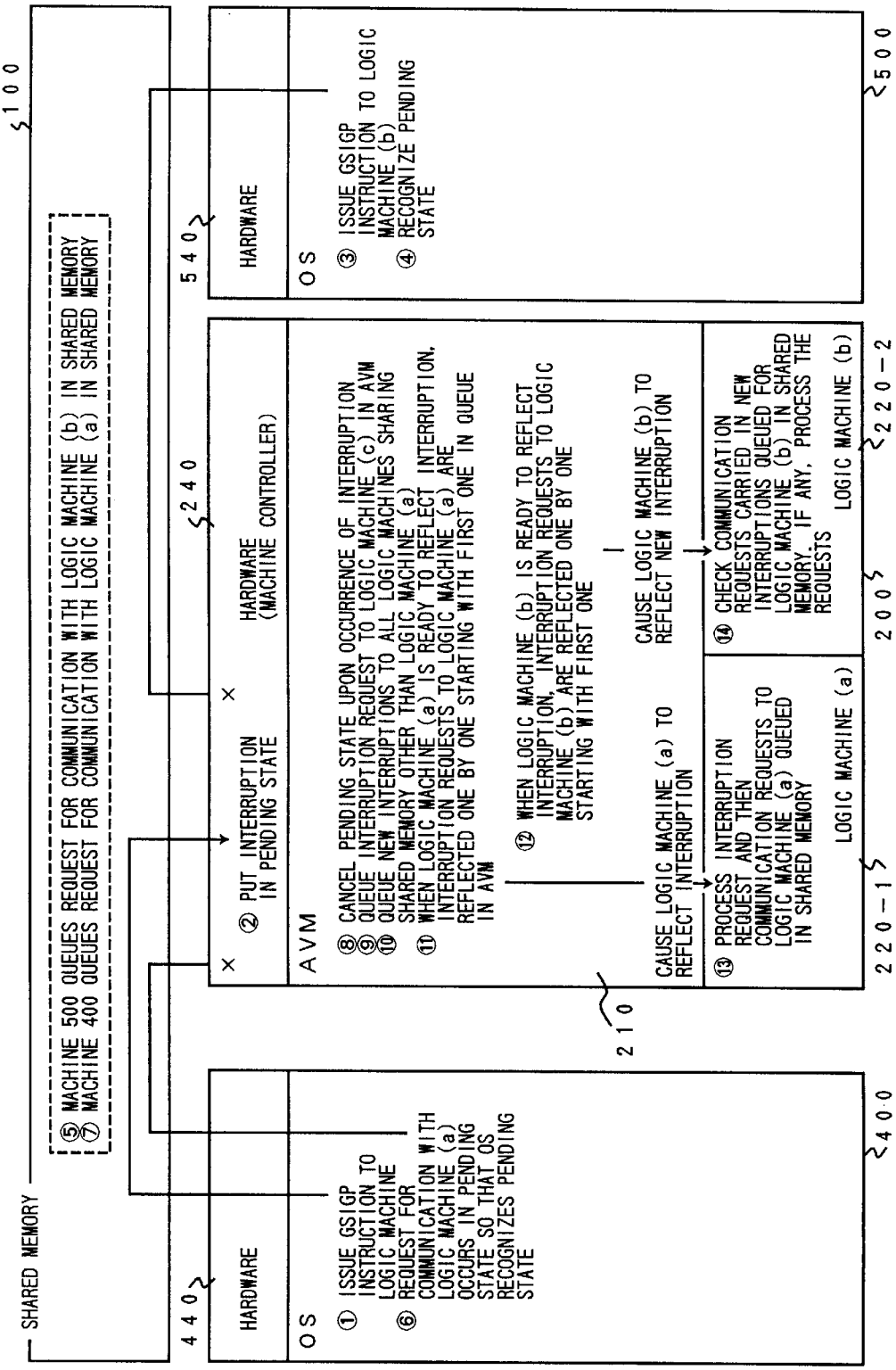
FIG. 34 is a diagram explaining a third example of the interruption process according to the first embodiment.

FIG. 34 is a diagram explaining the third example of the interruption process according to the first embodiment. The system shown in FIG. 34 comprises the machine 400, the machine 200 constructed of the logic machines 220-1(a) and 220-2(b), and the machine 500. In the description that follows, it is assumed that the machine 400 issues a GSIGP instruction to the logic machine 220-1(a) in the machine 200, and the machine 500 issues a GSIGP instruction to the logic machine 220-2(b) of machine 200.

Figure 35:
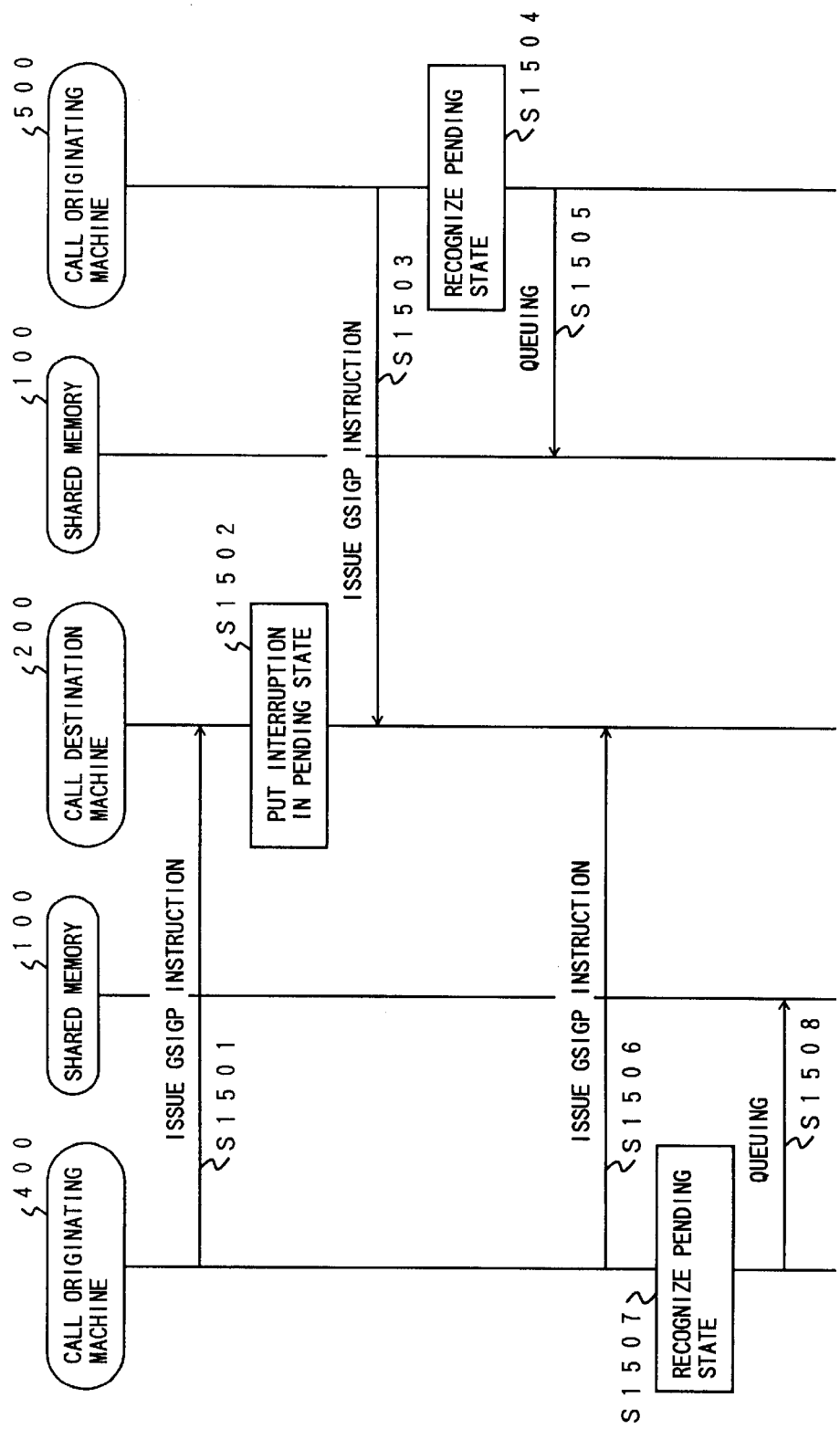
FIG. 35 is a sequence chart for the operation of the third example of the interruption process according to the first embodiment.
Figure 36:
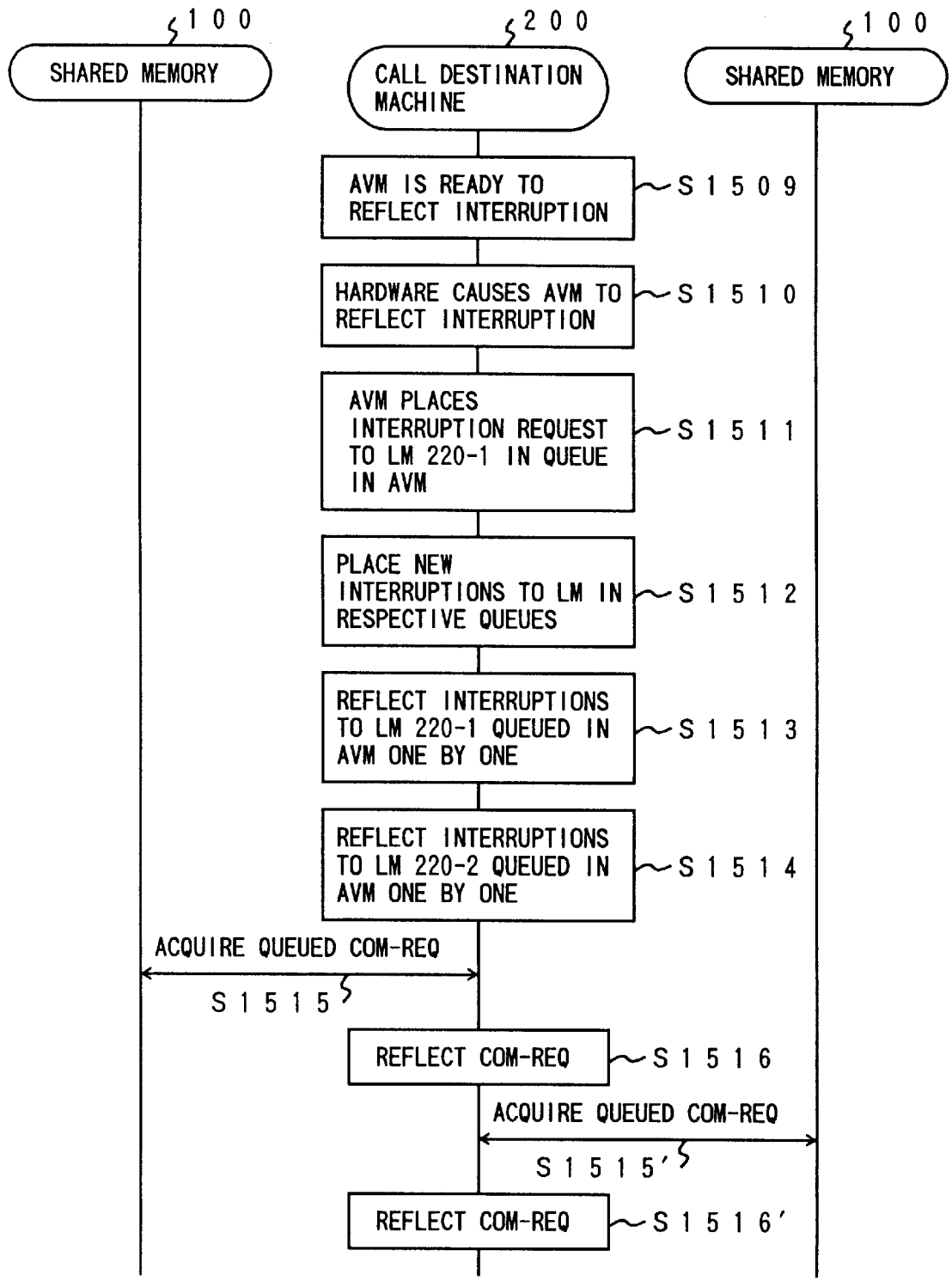
FIG. 36 is another sequence chart for the operation of the third example of the interruption process according to the first embodiment.

FIGS. 35 and 36 are sequence charts for the operation of the third example of the interruption process according to the first embodiment.

step 1501) The machine 400 issues a GSIGP instruction requesting communication with the logic machine 220-1(a) in the machine 200.

step 1502) Since reflection of an interruption is disabled in the machine 200, the machine controller 240 puts the interruption in a pending state.

step 1503) The machine 500 issues a GSIGP instruction requesting communication with the logic machine 220-2(b) in the machine 200.

step 1504) Since the earlier interruption is in the pending state in the machine 200, the machine 500 recognizes the pending state.

step 1505) The machine 500 queues the request for communication with the logic machine 220-2(b) in the shared memory 100.

step 1506) The machine 400 issues a GSIGP instruction to the logic machine 220-1(a) in the machine 200.

step 1507) Since interruptions are put in a pending state by the machine controller 240 of the machine 200, the machine 400 recognizes the pending state.

step 1508) The machine 400 queues the request for communication with the logic machine 220-1(a) in the machine 200 in the shared memory 100.

step 1509) The AVM 210 is ready for an interruption.

step 1510) The machine controller 240 causes the AVM 210 to reflect interruption. The pending state of interruptions is canceled at this stage. This is regarded by the other machines that the interruptions are reflected.

step 1511) The AVM 210 of the machine 200 places interruption requests to the logic machine 220-1(a) in an interruption request queue in the AVM 210. At this stage, actual processing of the interruptions by the logic machine 220-1(a) is disabled.

step 1512) The AVM 210 places, in a queue, new interruptions to logic machines sharing the shared memory 100 other than the logic machine (a), which is requested to reflect the interruption, each of the queues being provided for the respective logic machine. Step 1512 is actually executed in concurrence with step 1511.

step 1513) When the logic machine 220-1(a) is ready to reflect an interruption, the AVM 210 causes the logic machine 220-1(a) to reflect interruptions, starting with the first one in the queue provided in the AVM 210 for the logic machine 220-1(a).

step 1514) When the logic machine 220-2(b) is ready to reflect an interruption, the AVM 210 causes the logic machine 220-2(b) to reflect interruptions, starting with the first one in the queue provided in the AVM 210 for the logic machine 220-2(b).

step 1515) The OS of the logic machine 220-1(a) in the machine 200 checks whether or not there are communication requests to the logic machine 220-1(a) queued in the shared memory 100. If any, the OS acquires the communication requests and causes the requests to be reflected by the logic machine 220-1(a).

step 1516) The OS of the logic machine 220-2(b) in the machine 200 checks the shared memory 100 for any requests for interruptions in the logic machine 220-2(b) queued. If any, the OS acquires the communication requests and causes the requests to be reflected by the logic machine 220-2(b).

It will be appreciated that various forms of interruptions carrying communication requests can be properly processed according to the first embodiment.

Figure 37:
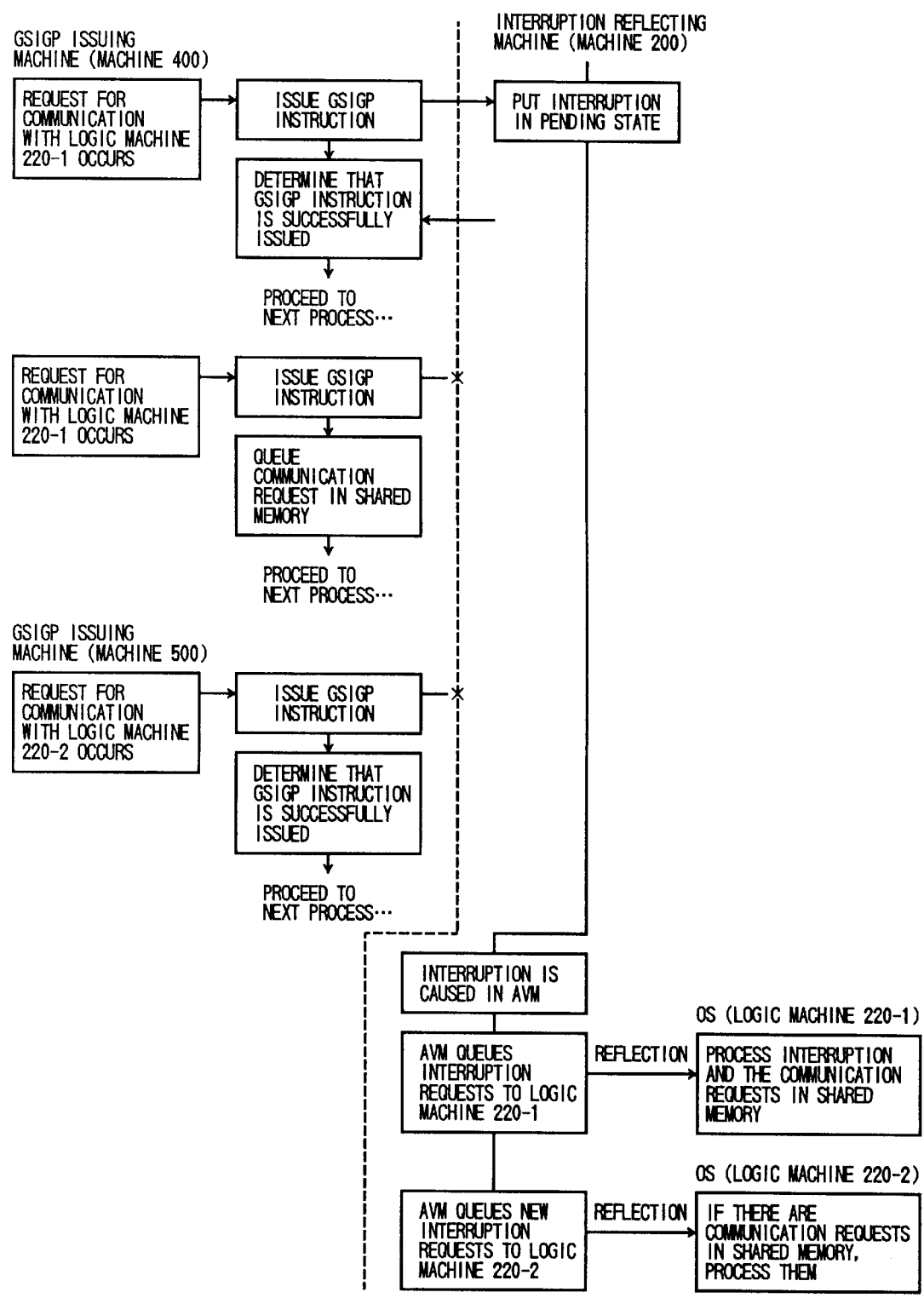
FIG. 37 is a variation of the sequence charts of FIGS. 35 and 36, wherein interruption events are arranged differently.

FIG. 37 is a variation of the sequence charts referred to in the above, wherein interruption events are arranged differently.

The machine 400 and the machine 500 issue GSIGP instructions. The machine 200 receives the GSIGP instructions.

When a request for communication with the logic machine 220-1(a) in the machine 200 occurs in the machine 400, the machine 400 issues a GSIGP instruction to the machine 200.

It is assumed, as in the above description, that the interruptions in a pending state in the machine 200.

Meanwhile, another communication request arises in the machine 400. The machine 400 issues a GSIGP instruction to the machine 200. Since the machine 200 is in a pending state with respect to the interruptions, the communication request is placed in a request queue provided in the shared memory 100 specifically for the logic machine 220-1(a).

A request for communication with the logic machine 220-2(b) occurs in the machine 500. The machine 500 issues a GSIGP instruction to the machine 200. Since the machine 200 is in a pending state with respect to the interruptions, this communication request is also placed in a request queue provided in the shared memory 100 for the logic machine 220-2(b).

When the AVM 210 of the machine 200 is ready for an interruption, the AVM 210 recognizes the interruptions and then places the interruption requests to the logic machine 220-1(a) in a queue provided in the AVM 210. Thereupon, the OS of the logic machine 220-1(a) processes the queued communication requests one by one according to instructions provided by the AVM 210.

The AVM 210 queues interruption requests to the logic machine 220-2(b) and causes the logic machine 220-2(b) to reflect the requests. The OS of the logic machine 220-2(b) processes the communication requests one by one until there is no communication requests queued in the shared memory 100.

As has been described, communication requests are properly transmitted even if the communication interruption condition differs from one logic machine to another with respect to the AVM of the virtual machine accommodating the logic machines.

[vi. acknowledgement of completion (resetting process)]

The following description assumes a resetting process wherein a logic machine in a first virtual machine is controlled by another real or virtual machine sharing the shared memory 100 with the first virtual machine, using a system control function (a GSIGP instruction (reset)) provided in the shared memory 100. When recognizing a completion of the system operation of a logic machine, a real machine or a logic machine in a virtual machine specifies the logic machine using a GSIGP instruction so as to request a reset thereof. The AVM of the requested machine identifies the specified logic machine to be reset and controls the resetting thereof. The I/O reset effected when a downed machine, in which a failure occurs, is controlled will be described in a second embodiment.

Figure 38:
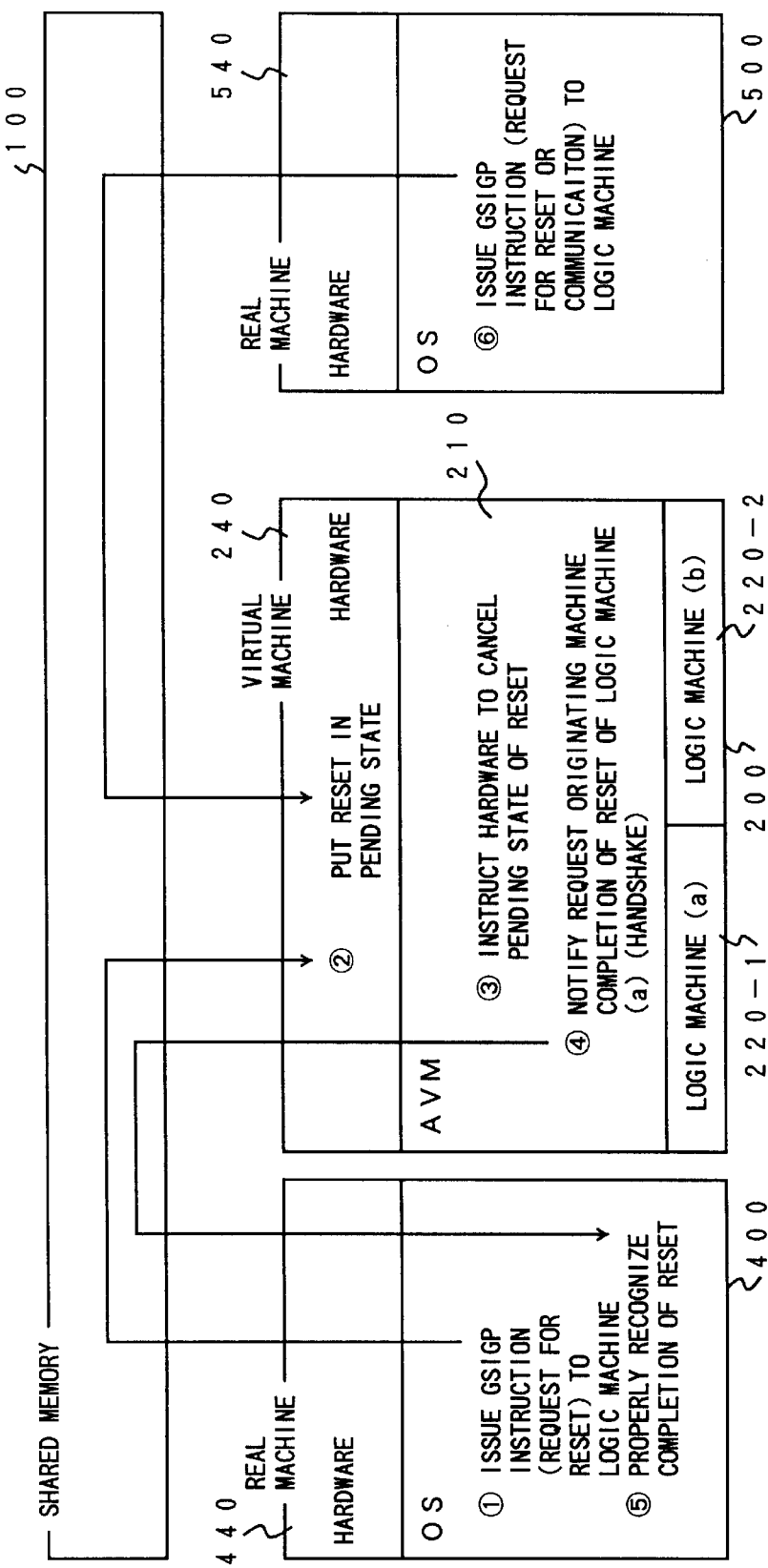
FIG. 38 is a diagram explaining resetting process according to the first embodiment.

FIG. 38 is a diagram explaining resetting process according to the first embodiment. Referring to FIG. 38, the machine 400 issues a request (GSIGP instruction) for resetting of the logic machine 220-1(a) in the machine 200 including the logic machines 220-1(a) and 220-2(b). When the reset is completed, the machine 400 recognizes it accordingly. When another machine 500 issues a request for resetting the logic machine 220-2(b) while the machine 200 is resetting the logic machine 220-1(a), the reset request from the machine 500 is put in a pending state in the machine controller 240 of the machine 200, because the reset request from the machine 400 is activated in the machine 200, as shown in FIG. 38. When the resetting of the logic machine 220-1(a) is completed, the reset request from the machine 500 is activated.

When the resets are completed, the AVM 210 and the OSs of the request issuing machines perform a handshake so that the reset requesting machines 400 and 500 are properly notified of the completion.

Figure 39:
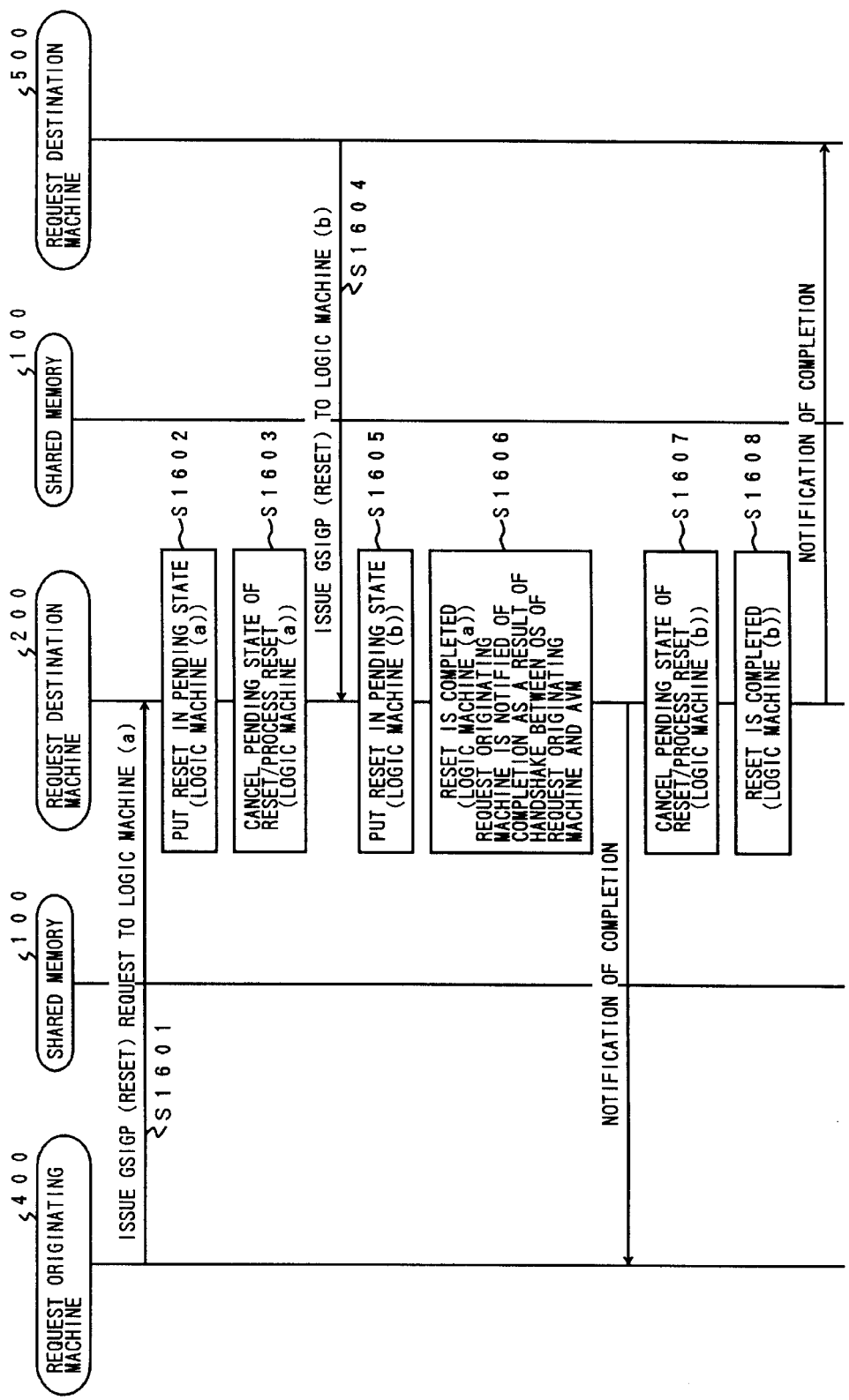
FIG. 39 is a sequence chart of the resetting process according to the first embodiment.

FIG. 39 is a sequence chart of the resetting process according to the first embodiment. The sequence shown in FIG. 39 corresponds to the illustration of FIG. 38.

step 1601) The inter-machine communication control part (OS) of the machine 400 issues a GSIGP (reset request) to the logic machine 220-1(a) in the machine 200.

step 1602) The machine controller 240 (hardware) of the machine 200 receives the GSIGP instruction (reset request) issued from the machine 400 and puts the request in a pending state.

step 1603) When the AVM 210 of the machine 200 recognizes the reset request, the AVM 210 instructs the machine controller 240 to cancel the pending state of the reset request.

step 1604) The machine 500 issues a GSIGP instruction (reset) to the logic machine 220-2(b) in the machine 200.

step 1605) The machine controller 240 of the machine 200 puts the GSIGP instruction issued from the machine 500 in a pending state.

step 1606) When the resetting of the logic machine 220-1(a) is completed, the AVM 210 of the machine 200 sends a completion notification to the machine 400.

step 1607) When the AVM 210 recognizes the reset request from the machine 500 put in a pending state in the machine controller 240, the AVM 210 instructs the machine controller 240 to cancel the pending state so that the resetting of the logic machine 220-2(b) in the machine 200 is activated.

step 1608) When the resetting of the logic machine 220-2(b) is completed, the AVM 210 of the machine 200 sends a completion notification to the machine 500.

Figure 40:
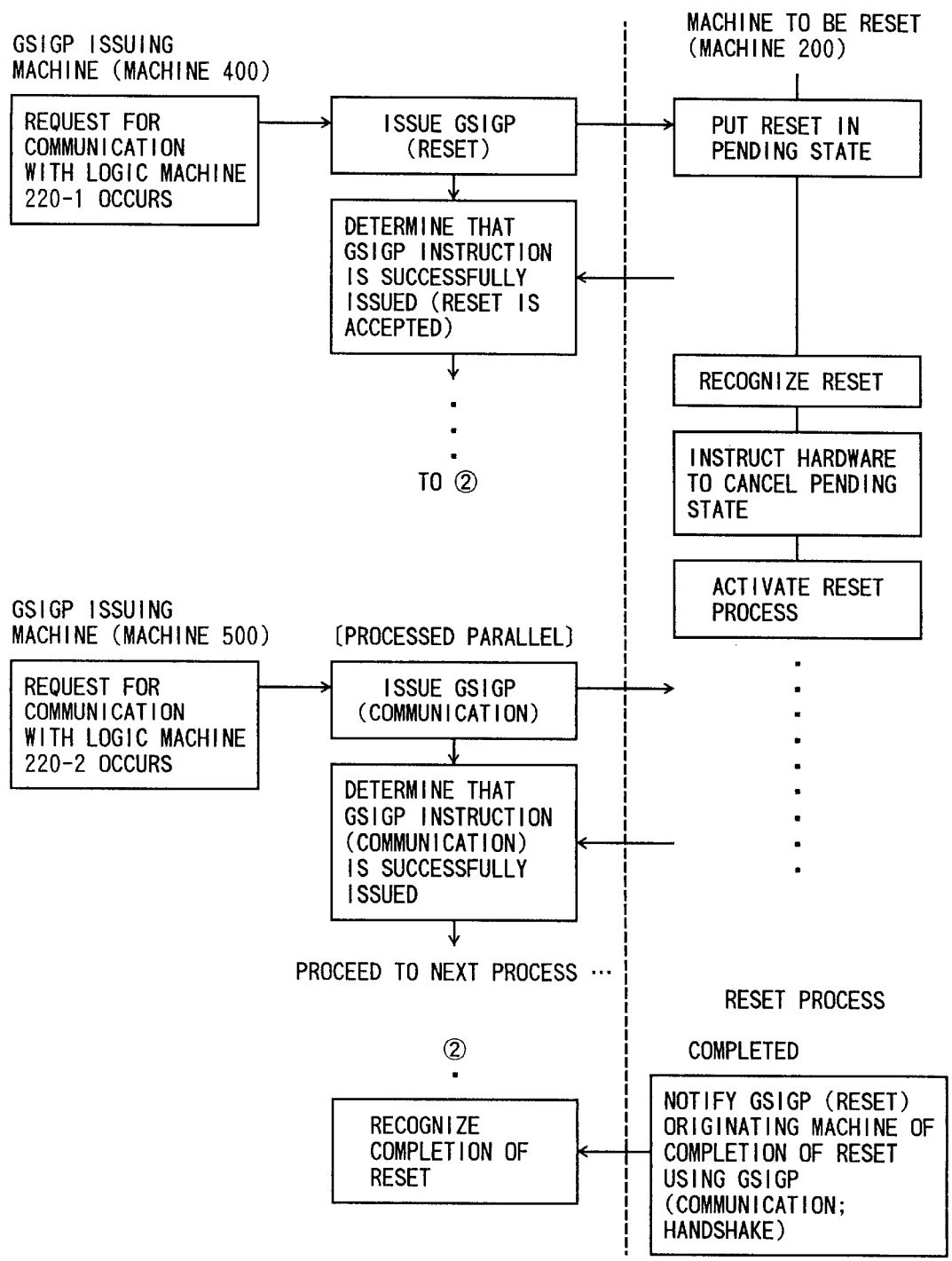
FIG. 40 is a variation of the sequence chart of FIG. 39, wherein resetting processes are arranged differently.

FIG. 40 is a variation of the sequence chart of FIG. 39, wherein resetting processes are arranged differently. Referring to FIG. 40, when the machine 400 issues a GSIGP instruction (reset request) to the logic machine 220-1(a) in the machine 200, the AVM 210 of the machine 200 puts the reset request in a pending state. The machine 400 determines that the GSIGP instruction has been successfully issued at a point when the machine 200 has received the instruction and waits for a reset completion notification. When the AVM 210 of the machine 200 recognizes the reception of the GSIGP instruction, the AVM 210 instructs the machine controller 240 to cancel the pending state of the reset. Thereupon, the AVM 210 activates the resetting process with respect to the logic machine 220-1(a) so that the resetting thereof is executed.

Another machine 500 issues a GSIGP instruction (reset request) to the logic machine 220-2(b) in the machine 200. Upon recognizing that the GSIGP instruction has been received by the machine 200, the machine 500 determines that the GSIGP instruction has been successfully issued and waits for a completion notification.

When the earlier reset requested by the machine 400 is completed, the AVM 210 of the machine 200 issues a reset completion notification using a GSIGP instruction (communication; handshake). Thereafter, when the reset requested by the machine 500 is completed, the AVM 210 issues a completion notification to the machine 500 as it did to the machine 400.

A description will now be given of a second embodiment of the present invention.

The second embodiment concerns a process effected when a failure occurs in a machine belonging to a SCMP system comprising a plurality of machines connected to a shared memory.

The description below will be given in the following order.

i. Down notification process by the AVM ii. Process for detecting a down of a virtual machine iii. Process for controlling logic machines operated under the AVM iv. I/O reset process in a virtual machine v. Wait process executed by logic machines when their own hardware is to be controlled vi. Process for reducing occurrences of operator calls

[i. Down notification process by the AVM]

Figure 41:
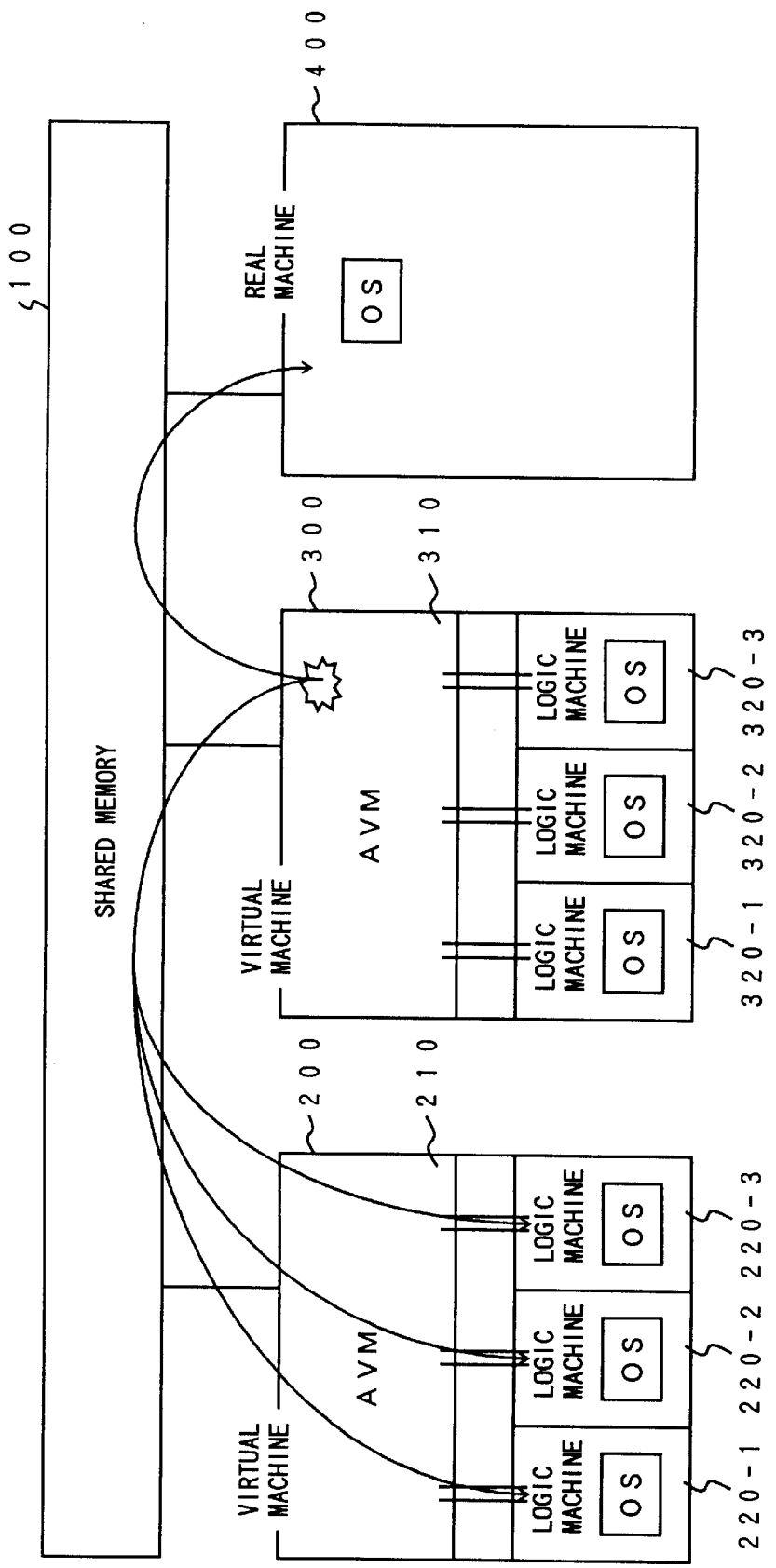
FIG. 41 schematically shows a second embodiment.

FIG. 41 schematically shows the second embodiment.

Referring to FIG. 41, three machines 200, 300 and 400 are connected to the shared memory 100. The machines 200 and 300 are virtual machines operated under the AVM and comprise three logic machines, each of the logic machines being provided with the OS. The machine 400 is operated as a real machine under the OS. FIG. 41 shows a case where the AVM 310 of the virtual machine 300 is down due to an unrecoverable failure. The AVM 310 notifies the other machines of the down via the shared memory 100.

A detailed description will now be given of the above-described process.

Figure 42:
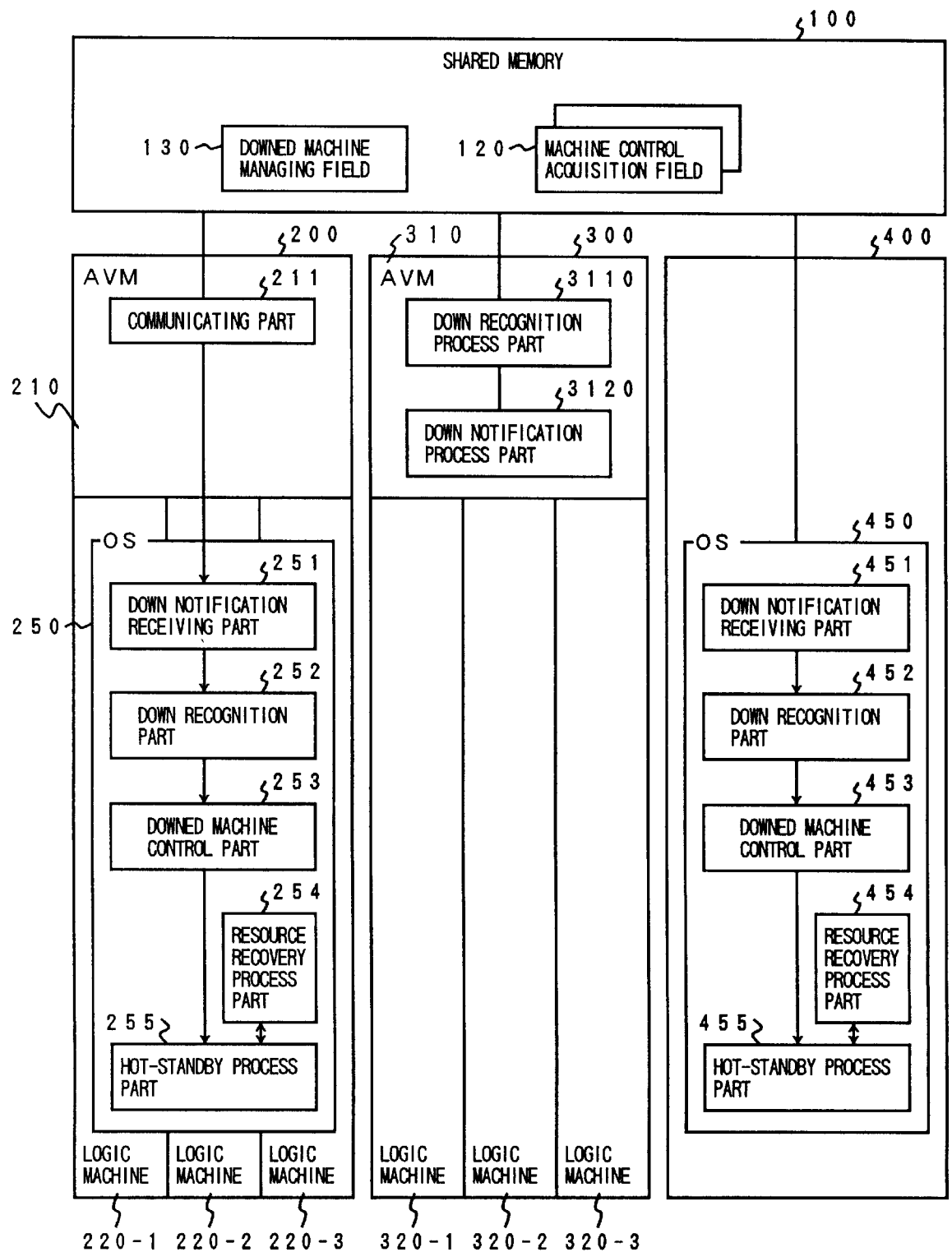
FIG. 42 shows the construction for a down notification process according to the second embodiment.

FIG. 42 shows the construction for a down notification process according to the second embodiment. FIG. 42 shows the same system configuration as FIG. 41. The configuration of a virtual machine is the same from machine to machine. However, the description will be given of individual virtual machines.

The shared memory 100 comprises a machine control acquisition field 120 that stores information relating to acquisition of the machines, each sub-field being provided for a corresponding machine; and a downed machine managing field 130 that registers downed machines.

As shown in FIG. 43, each sub-field of the machine control acquisition field 120 is provided for the corresponding machine and comprises a controlling machine address storage area 111, an IPL generation area 112 and an area 113 for information relating to the state of control.

When a machine detects a down of another operating machine, the address of the machine that detected the down is written in the controlling machine address storage area 111. The machine whose address is written in the controlling machine address storage area 111 acquires a right to control the machine for which the associated sub-field is provided. In the example shown in FIG. 43, assuming that the address of the machine 300 is "AAAABBBB", the machine 300 acquires a right to control the machine 200.

Numbers indicative of generations of IPL operations are written in the IPL generation area 112 so as to prevent an erroneous recognition of a down.

Control state information, indicating that the down control is completed and a machine that failed to acquire the right to control the downed machine is allowed to execute a resource recovery process, is written in the area 113.

The downed machine managing field 130 is a field for storing information relating to the downed machine and comprises:

Information indicating whether or not hardware monitoring function is effective;

Information indicating virtual/real distinction of the machine;

Period of time that logic machines have to wait before executing control of the hardware of their own machine; and CPU model The above information is registered in the field 130 while an IPL is being run. When an associated machine becomes down, another machine takes control of the downed machine based on the information described above.

Referring to FIG. 42, it is assumed that the machines 200 and 400 are notified of an occurrence of a failure by the AVM 310 of the machine 300. The machine 200 comprises the AVM 210, and the logic machines 220-1, 220-2 and 220-3. Each of the logic machines 220-1, 220-2 and 220-3 belonging to the machine 200 has an OS 250. The AVM 210 is provided with a communicating part 211 which forwards a down notification from another machine to the OS 250 of the logic machines in the machine 200. The OS 250 comprises a down notification receiving part 251, a down recognition part 252, a downed machine control part 253, a resource recovery process part 254 and a hot-standby process part 255.

The down notification receiving part 251 receives a down notification from another machine via the communicating part 211 of the AVM 210 and analyzes the parameters.

The down recognition part 252 recognizes the identity of the downed machine and the reason for the down.

The downed machine control part 253 performs the following processes. A detailed description will be given later.

Recognition of the operating mode of the downed machine

Investigation into whether or not the logic machines are in service when the down occurred Investigation into whether or not the logic machines are down Acquire a right to control the downed machine Halt the operation of the CPU of the downed machine Investigation into whether or not a reset is enabled (investigation into whether or not hardware monitoring function is valid)

Reset the input/output of the downed machine

Dumping of the downed machine

The hot-standby process part 255 initiates a hot-standby mode when the control of the downed machine by the downed machine control part 253 is completed, or when a control of the downed machine by an interruption of an operator is completed.

Specific processes performed by the hot-standby process part includes specifying of a target machine in a hot-standby; and recovering of resources. The recovering process part recovers resources on the DASD, resources on the shared memory, and information provided in the system (information indicating whether or not logic machines are down), and the hot-standby process part resets the recovered resources.

The AVM 310 of the machine 300 comprises a down recognition process part 3110 for detecting a down occurring in the AVM 310 and a down notification process part 3120 for notifying the other machines of the occurrence of the down via the shared memory 100.

The machine 400 is operated in a real mode and its OS 450 has a construction similar to that of the OS 250 in the machine 200. That is, the OS 450 comprises a down notification receiving part 451, a down recognition part 452, a downed machine control part 453, a resource recovery process part 454 and a hot-standby process part 455. Since the operations of these parts are the same as those of the corresponding parts in the machine 200, the description there of is omitted.

Figure 44:
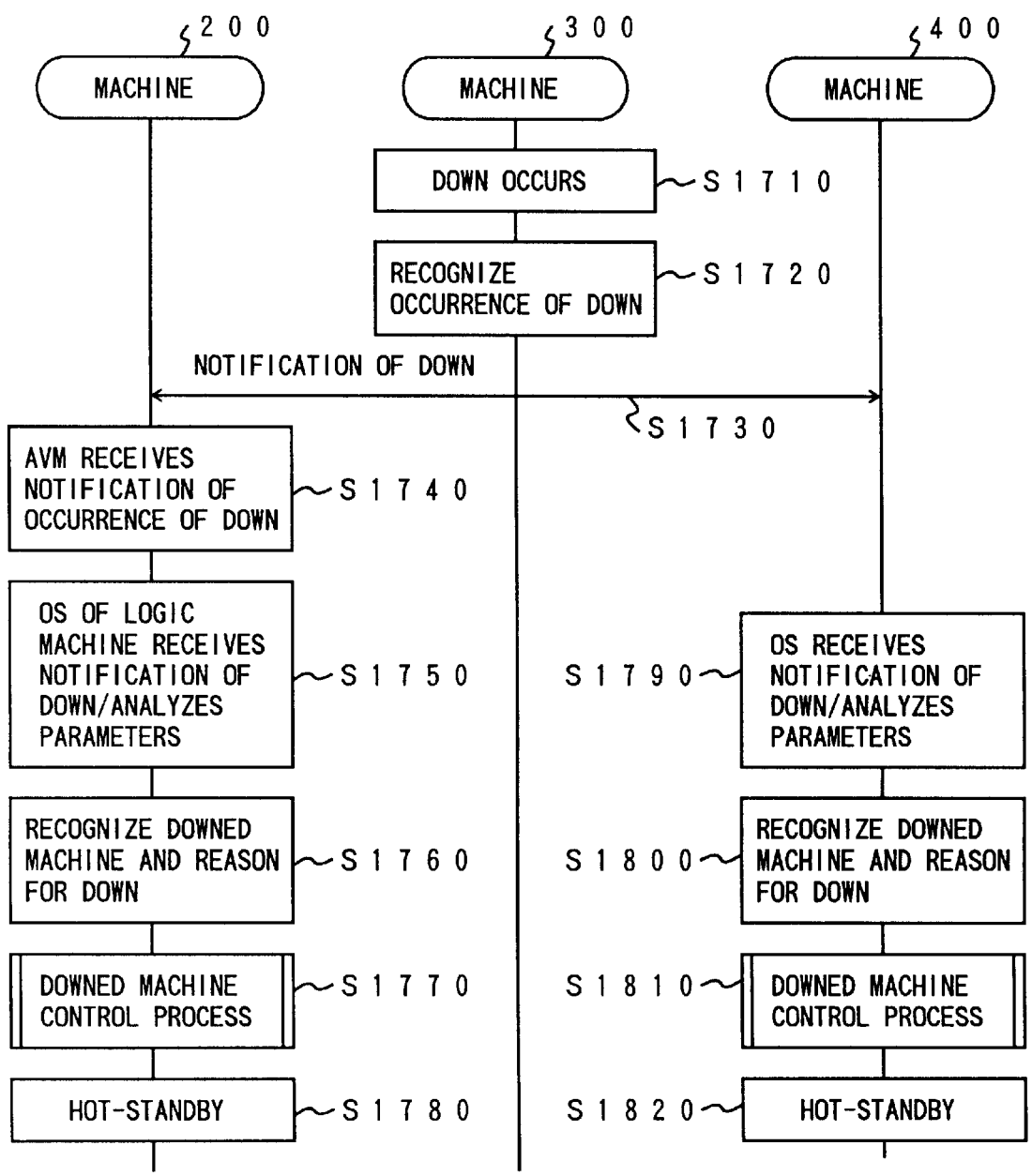
FIG. 44 is a sequence chart showing an operation of notifying and recognizing an occurrence of a down according to the second embodiment.

FIG. 44 is a sequence chart showing an operation of notifying and recognizing an occurrence of a down according to the second embodiment. The shared memory 100 is omitted in FIG. 44.

step 1710) An unrecoverable failure occurs in the AVM 310 of the machine 300.

step 1720) The down recognition process part 3110 of the machine 300 (referred to as a downed machine) recognizes the occurrence of the down and notifies the down notification process part 3120 accordingly.

step 1730) The down notification process part 3120 of the AVM 310 of the downed machine 300 notifies the machines 200 and 400 accordingly via the shared memory 100. Inter-machine communication function explained in the first embodiment is employed in the notification. When the notification is for a machine operated under the AVM, the notification is given to the logic machines operated under the AVM of the notified machine.

step 1740) Upon reception of the down notification from the downed machine 300, the communicating part 211 of the AVM 210 of the machine 200 forward the notification to the down notification receiving part 251 of the logic machines 220-1, 220-2 and 220-3 operated under the AVM 210.

step 1750) The down notification receiving part 251 analyzes the parameters delivered in the down notification.

step 1760) The down recognition part 252 identifies the downed machine and the reason for the down based on the result of the parameter analysis.

step 1770) The downed machine control part 253 controls the downed machine 300. The detail of the control will be described with reference to FIG. 45.

step 1780) The hot-standby process part 255 of the machine 200 initiates a hot-standby mode when the control of the downed machine 300 by the downed machine control part 253 is completed, or when a control of the downed machine 300 by an interruption of an operator is completed.

step 1790) The steps 1790 through 1820 are executed in the machine 400 after the machine 400 receives the down notification in step 1730 from the downed machine 300. The description of these steps is omitted because the steps are the same as the steps 1750 through 1780.

Figure 45:
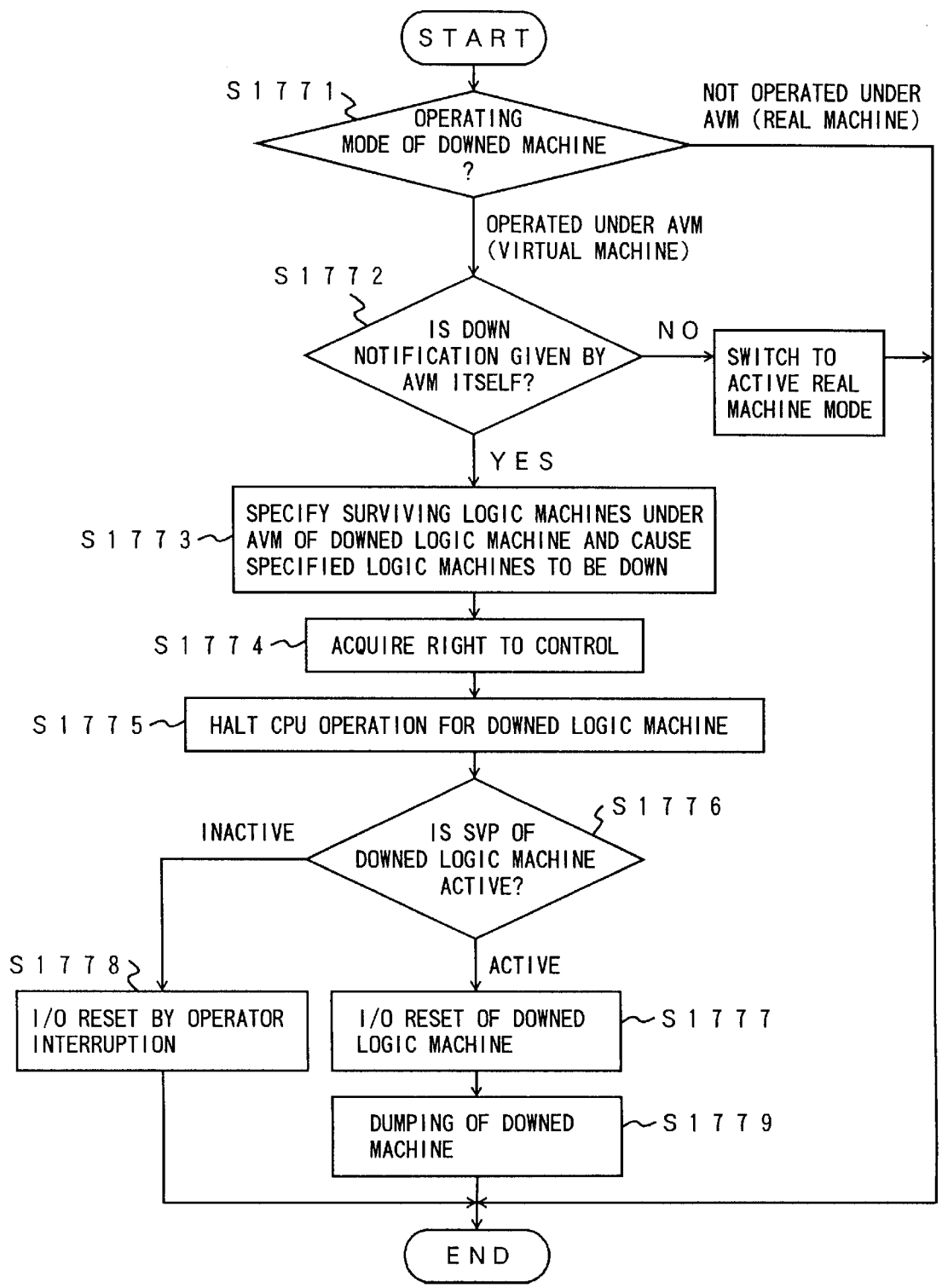
FIG. 45 is a flowchart of downed machine control process according to the second embodiment.

FIG. 45 is a flowchart of downed machine control process according to the second embodiment. The process described below corresponds to the steps 1770 and 1810 described above. In this example, it is assumed that the process shown in FIG. 45 is executed by a logic machine in the machine 200 for the downed machine 300. It is to be noted that the step 1810 is executed by the machine 400. The machine 400 does not issue a GSIGP instruction and waits for completion of the control effected by one of the logic machines in the machine 200.

step 1771) The downed machine control part 253 determines whether or not the AVM 310 of the downed machine 300 is in service. If the AVM 310 is in service, the control is turned over to step 1772. If the AVM 310 is not in service, the control process for the downed machine 300 is terminated.

step 1772) If it is determined that the AVM 310 is in service, a determination is made as to whether or not the down notification is given by the AVM 310 itself. If the down notification is given by the AVM 310 itself, the control is turned over to step 1773. If not, the machine in which the AVM 310 resides is switched to the active real machine mode.

step 1773) When the AVM 310 of the downed machine 300 is in service and gave the down notification, the downed machine control part 253 specifies logic machines in the downed machine 310 which logic machines survived the down. The downed machine control part 253 causes the surviving logic machines to be down.

step 1774) The downed machine control part 253 acquires a right to control the downed machine 310 in order to halt the operation of the CPU thereof, and to effect I/O reset and dumping. The downed machine control part 253 acquires the right by writing the address of the downed machine obtained by analyzing the parameters, in the machine control acquisition field 120 of the shared memory 100. The machine that acquires the right to control the downed machine issues a GSIGP instruction. This right to control the downed machine is given to only one machine in a SCMP system. The other machines have to wait for completion of the control by the machine that holds the right.

step 1775) The machine 200 which acquired the right to control the downed machine halt the operation of the CPU of the downed machine 300 and then determines whether or not the reset of the downed machine 300 is enabled. During initialization, the hardware (service processor) registers information indicating whether or not hardware (SVP) monitoring function is enabled in the shared memory.

step 1776) The downed machine control part 253 refers to the downed machine managing field 130 for the downed machine 300. If it is determined that the reset of the downed machine 300 is enabled, the control is turned over to step 1777. If disabled, the control is turned over to step 1778.

step 1777) If the reset is enabled, the downed machine control part 253 issues a request for a forced reset, which is effective even in a downed machine operated under the AVM, to the hardware (SVP) of the downed machine. Thereupon, the control is turned over to step 1779. Generally, the SVP monitoring function is set to "enabled".

step 1778) If the reset is enabled, forced reset by hardware means is not carried out. Instead, an operator makes an interruption to effect I/O reset so as to complete the downed machine control. Specifically, a request for an interruption is displayed for the operator in a display unit (not shown).

step 1779) The dumping of the downed machine 300 is carried out so that the failure is located.

[ii. Process for detecting a down of a virtual machine]

A description will now be given of how the system down of a downed machine is recognized by another machine according to the second embodiment.

Figure 46:
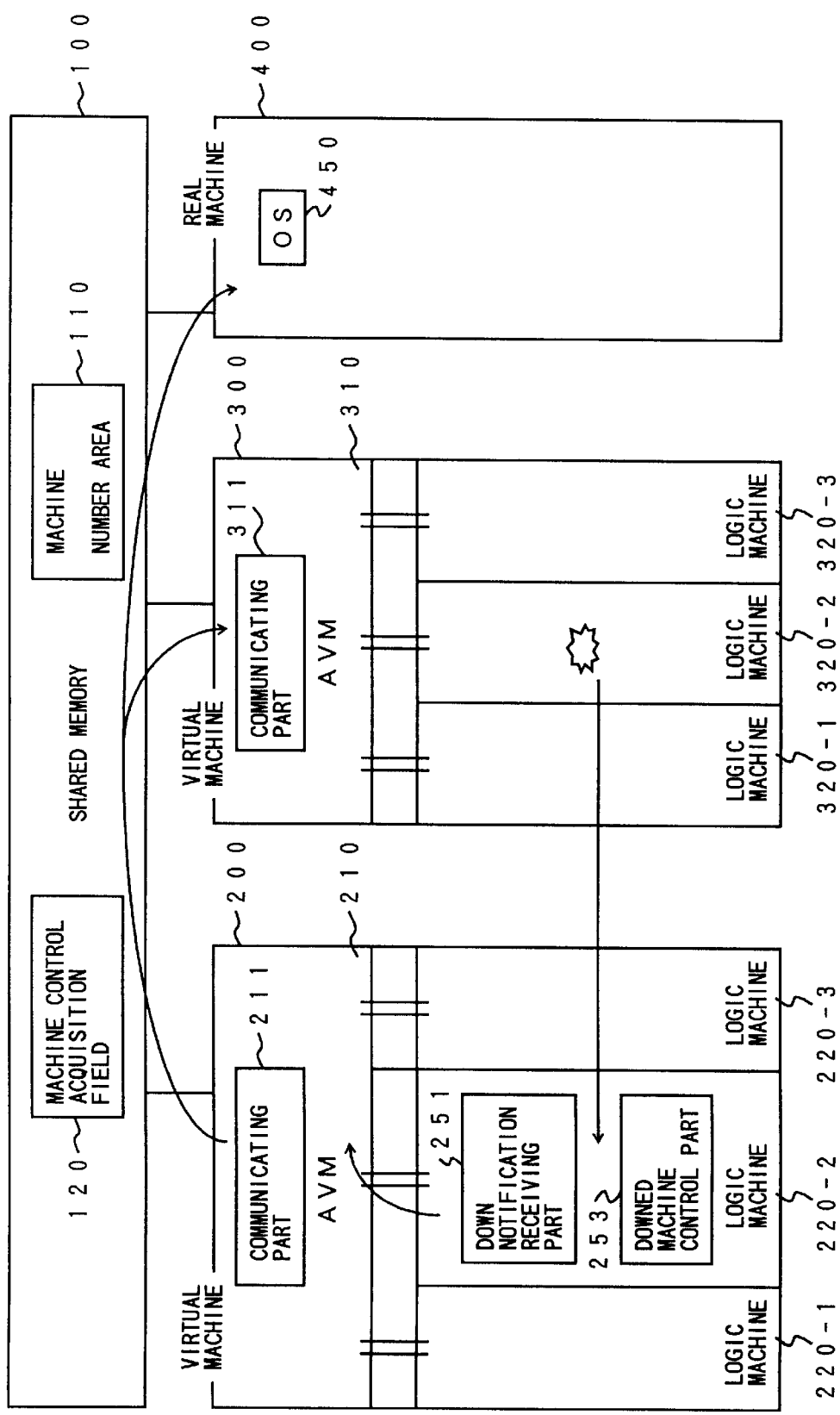
FIG. 46 is a diagram schematically explaining a process for recognizing a downed machine according to the second embodiment.

FIG. 46 is a diagram schematically explaining a process for recognizing a downed machine according to the second embodiment.

Referring to FIG. 46, the logic machine 320-2 in the machine 300 becomes down. The down of the logic machine 320-2 is detected by the logic machines 220-1, 220-2 and 220-3, the logic machines 320-1, 320-3 and the machine 400.

All the machines that recognized the down of the logic machine 320-2 in the machine 300 are able to acquire control thereof by serializing the machine control acquisition field 130 in the shared memory 100. In the example of FIG. 46, it is assumed that the logic machine 220-2 in the machine 200 has acquired a right to control the logic machine 320-2 in the machine 300.

Figure 47:
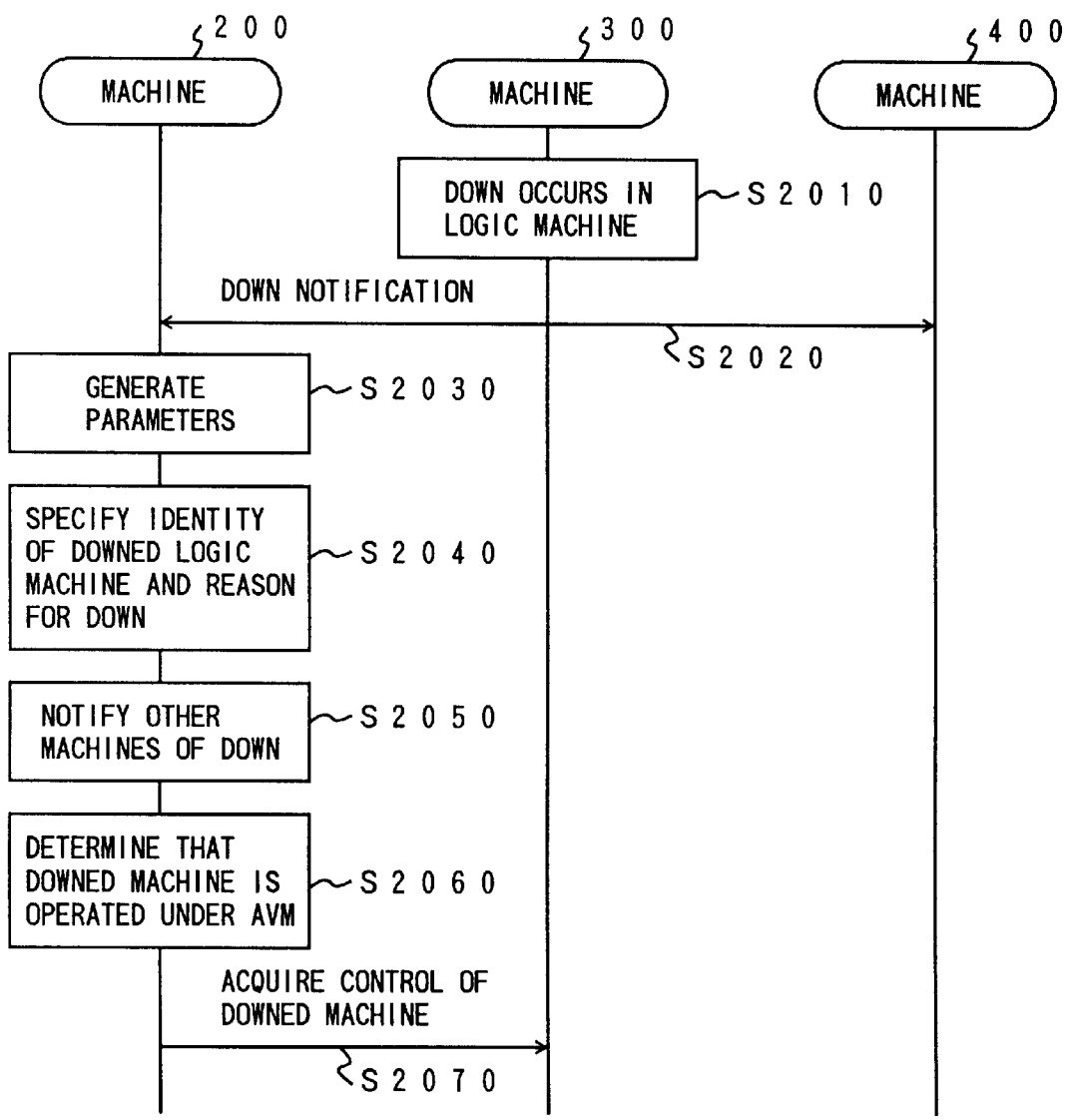
FIG. 47 is a sequence chart showing down notification and recognition operations according to the second embodiment.

FIG. 47 is a sequence chart showing down notification and recognition operations according to the second embodiment. It is assumed that a down occurs in the logic machine 320-2 in the virtual machine 300 and the logic machine 220-2 in the machine 200 acquires a control of the downed logic machine 320-2.

step 2010) A down occurs in the logic machine 320-2 in the machine 300.

step 2020) The logic machine 320-2 issues a down notification to the machines. The down notification is not necessary when the machines monitor each other.

step 2030) The down notification receiving part 251 of the logic machine 220-2 generates parameters.

step 2040) The down notification receiving part 251 of the logic machine 220-2 specifies the identity of the downed machine and the reason for the down.

step 2050) The AVM 210 of the logic machine 220-2 gives the down notification to the AVM 310 of the machine 300, to the OS 450 of the machine 400, and also to the logic machines 220-1 and 220-3.

step 2060) The downed machine control part 253 of the logic machine 220-2 determines whether or not the downed machine 320-2 is operated under the AVM.

step 2070) Upon a determination that the downed machine 320-2 is operated under the AVM, the logic machine 220-2 acquires a right to control the downed machine 320-2.

While the operation shown in FIG. 47 is executed in the logic machine 220-2 in the machine 200, the operation shown in FIG. 47 applies to the other machines.

A description will now be given of the operation of the logic machine 220-2 in the machine 200 when a down notification is received.

Figure 48:
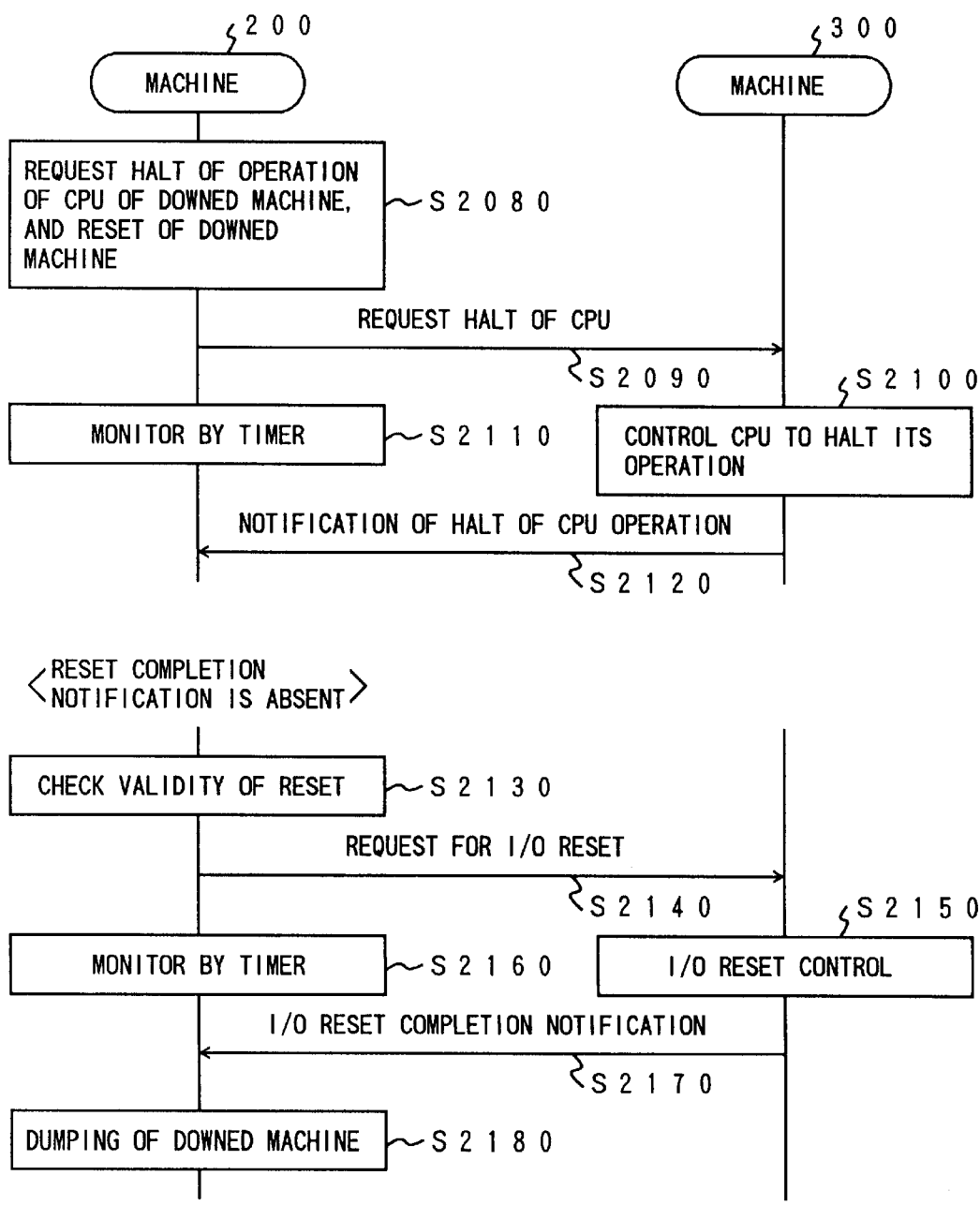
FIG. 48 is a sequence chart showing an operation of controlling a downed machine when a down notification is received, according to the second embodiment.

FIG. 48 is a sequence chart showing an operation of controlling a downed machine when a down notification is received, according to the second embodiment. In the description that follows, it is assumed that the logic machine 320-2 in the machine 300 is down, and an associated notification is received by the logic machine 220-2 in the machine 200.

step 2080) The downed machine control part 253 of the logic machine 220-2 in the machine 200 requests the communicating part 211 of the AVM 210 to halt the CPU of the downed machine and to reset the I/O of the downed machine.

step 2090) The communicating part 211 of the AVM 210 requests the AVM 310 of the machine 300 to reset the I/O and halt the CPU operation for the logic machine 320-2. If a GSIGP instruction for stopping the CPU is issued, the CPU of the hardware of the machine 300 stops. Hence, the request is issued to the AVM 310 of the machine 300.

step 2100) The AVM 310 of the machine 300 halts its CPU operation for the logic machine 320-2.

step 2110) Meanwhile, the machine 200 effects monitoring by a timer. The timer monitoring is necessary because, a normal response may not arrive at the machine 200 if an error occurs in the AVM 310. This may happen even if a time required for the AVM to process halting of a CPU is allowed for. If a predetermined period of time expires while the monitoring by a timer is active, it is determined that the monitored AVM 310 is down. Thereupon, all the logic machines in the machine operated under the AVM 310 are disconnected from the SCMP system. If individual logic machines are to be processed, it takes a great amount of time to complete the control. In this way, the hardware of the machine 300 can be controlled.

step 2120) After the halt of the CPU, the machine 300 notifies the logic machine 220-2 in the machine 200 of the completion of the halting process using machine-to-machine communication function. The machine-to-machine communication function has been described in the first embodiment.

step 2130) If the reset completion notification is absent, the downed machine control part 253 of the machine 200 checks the downed machine managing field 130 in the shared memory 100 to see if forced reset by means of hardware is enabled.

step 2140) If forced reset by means of hardware is enabled, the downed machine control part 253 requests the communicating part 311 of the AVM 310 to reset the I/O. In response to this, the communicating part 311 requests the AVM 310 of the machine 300 to reset the I/O.

step 2150) The AVM 310 of the machine 300 resets the I/O of the downed machine 320-2.

step 2160) Meanwhile, the machine 200 effects monitoring by a timer as in step 2110 above.

step 2170) When the AVM 310 of the machine 300 completes the I/O reset of the downed machine 320-2, the AVM 310 notifies the machine 200 of the completion.

step 2180) The downed machine control part 253 of the machine 200 effects dumping of the downed machine 320-2.

The OS detects a down of an AVM according to the following sequence.

(1) A logic machine is down.

(2) The OS issues a request for halting and resetting a logic machine to the AVM controlling the logic machine.

(3) The OS detects the down of the AVM if a notification indicating completion or failure of the halting and resetting operation has not arrived from the AVM within a predetermined period of time.

In the process (2) above, the AVM is requested to halt the CPU operation and reset the I/O for the downed logic machine. Normally, a notification is issued when the AVM has succeeded in both the halting and resetting processes or has failed in both of them.

[iii. Process for controlling logic machines operated under the AVM]

A description will now be given of a process whereby, when the AVM itself is down or is halted in a normal operation, the logic machines operated under the AVM are caused to be down (like step 1073 described above).

When it is determined that the AVM for a virtual machine is down, the number of surviving logic machines and the address of the downed machine are recognized. Information (stored in the shared memory and the main memory) for managing the logic machines is modified so as to reflect the downed state.

Thereafter, the CPU operation of the downed machine is halted and the I/O of the downed machined is reset.

After the control of the downed machine is completed, resources (shared DASD or resources in the shared memory) held by the logic machines under the control of the downed AVM are released so that the hot-standby mode is attained.

Figure 49:
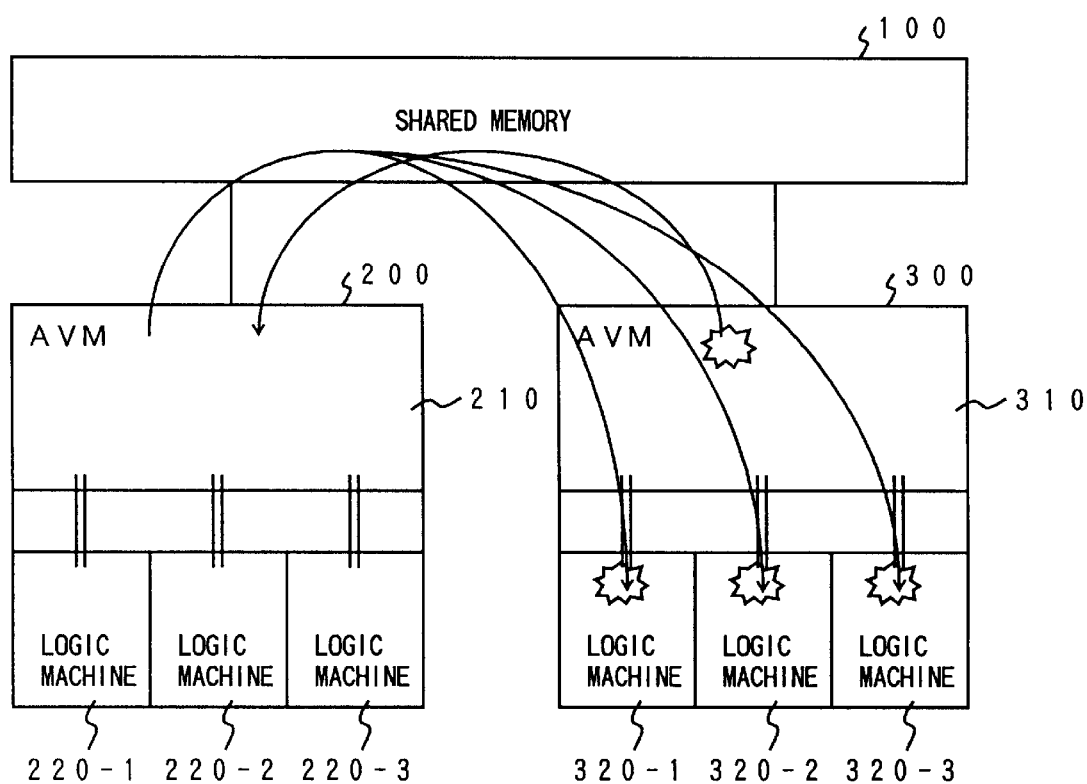
FIG. 49 is a diagram explaining a process executed when the AVM is down, according to the second embodiment.

FIG. 49 is a diagram explaining a process executed when the AVM is down, according to the second embodiment. Referring to FIG. 49, when a down occurs in the AVM 310 in the machine 300, one of the logic machines 220-1–220-3 in the machine 200 recognizes the down of the AVM 310 of the machine 300 according to the process of ii) described above. The surviving logic machines 320-1, 320-2 and 320-3 are forced to be down, because, when the AVM 310 is down, the logic machines under its control cannot operate. In this way, it is not necessary for the machine 200 to control individual logic machines so that the hot-standby mode can be attained at a high speed. It is not necessary to halt the CPU operation and reset the I/O for the individual logic machines. The CPU operation is halted and the I/O is reset on the hardware level.

[iv. I/O resetting process in a virtual machine]

A description will now be given of a process for halting the CPU operation and resetting the I/O in a downed virtual machine.

Conventionally, a GSIGP instruction (I/O reset) issued by the OS is used to halt the CPU operation for a logic machine and reset the I/O therein. Therefore, the I/O reset is not executed by hardware in response to a GSIGP instruction (I/O reset) issued to a virtual machine because the hardware recognizes that the GSIGP instruction (I/O reset) is executed by the AVM.

This aspect of the present invention provides a configuration wherein the OS recognizes the down of a virtual machine, whereupon the CPU operation for the downed machine is halted and the I/O of the downed machine is reset on the hardware level. In this arrangement, a GSIGP instruction for requesting the I/O reset has the additional function of resetting the hardware of the downed virtual machine itself. Instead of the AVM, the hardware is responsible for the resetting, upon receipt of the GSIGP instruction.

Figure 50:
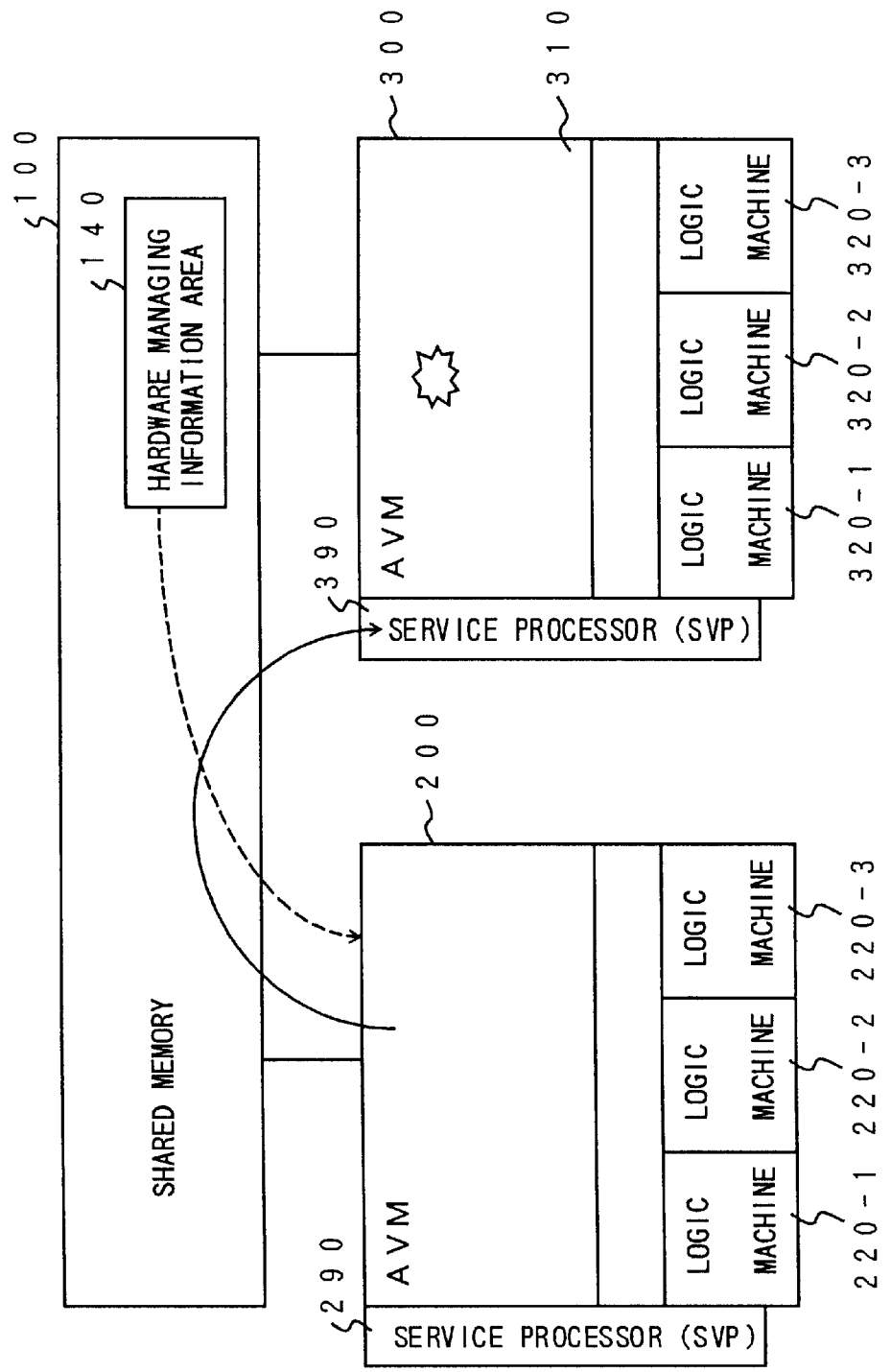
FIG. 50 is a diagram explaining a process for performing I/O reset of the hardware of a machine operated under the AVM, according to the second embodiment.

FIG. 50 is a diagram explaining a process for performing I/O reset of the hardware of a virtual machine operated under the AVM according to the second embodiment. The machines 200 and 300 are provided with service processors 290 and 390, respectively. The service processors 290 and 390 have a capability for maintenance support and are equipped with functions of resetting by hardware means and supporting line errors. The shared memory 100 is provided with a hardware managing information area 140 that registers information indicating states of the hardware for each machine, while an IPL is being run. The information registered in the hardware managing information area 140 includes information indicating whether or not the monitoring by means of the service processors 290 and 390 is enabled. If the information registered in the hardware managing information area 140 indicates that the monitoring is enabled, it is possible for another machine to effect forced reset of the monitored machine. If disabled, the resetting by hardware means is not conducted even if a request to do so is input from another machine.

Referring to FIG. 50, it is assumed that one of the logic machines 220-1–220-3 in the machine 200 recognizes a down of the AVM 310 of the machine 300. The logic machines 220-1–220-3 access the hardware managing information area 140 in the shared memory 100 so as to learn whether or not the monitoring of the machine 300 is enabled. If the monitoring function is enabled, the OS issues a request to halt the CPU operation to the service processor 390. When the CPU halting operation is completed by the service processor 390, the OS gives a instruction of a forced reset. The service processor 390 ensures that there is not any other I/O request issued and then carries out the I/O reset.

The OS registers information indicating enabled/disabled status of the monitoring function in the shared memory 100. In the example of FIG. 50, the machine (for example, the machine 320-1) in the machine 300 that runs an IPL ahead of the other machines is responsible for registering the information indicating whether or not the monitoring function by the service processor is enabled. In other words, only the logic machine in the machine operated under the AVM that IPLs first registers the aforementioned information in the shared memory 100.

[v. Wait process executed by logic machines when their own hardware is to be controlled]

The control process according to this aspect concerns a control method executed when the OS detects a down of the AVM.

When the OS tries to control a logic machine and does not receive a notification of completion or failure of a halt or a reset from the AVM, the OS detects a down of the AVM.

Figure 51:
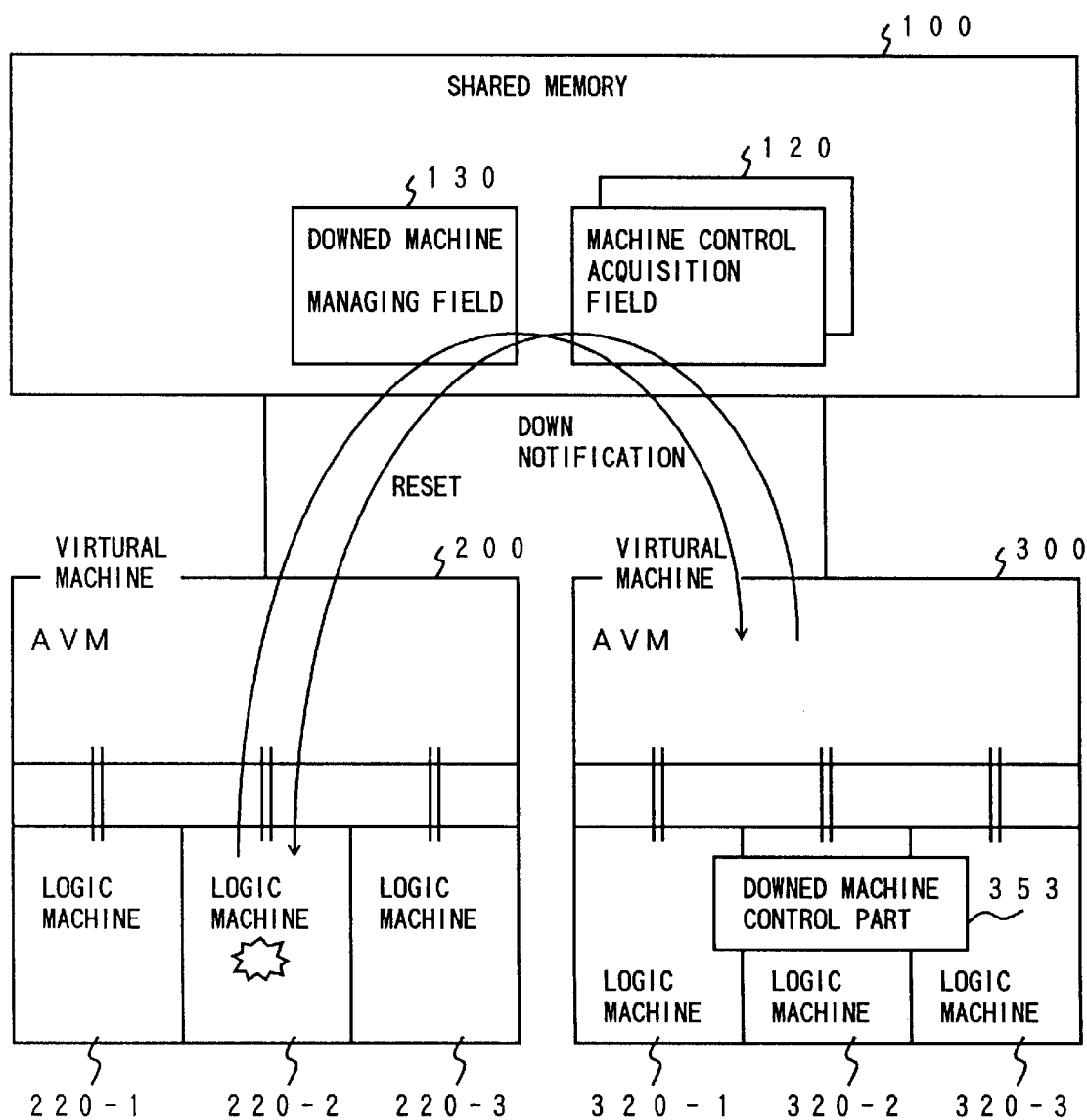
FIG. 51 is a diagram explaining a wait process executed when the hardware of a machine is to be controlled.

FIG. 51 is a diagram explaining a wait process executed by logic machines when their own hardware is to be controlled.

(1) It is assumed that the logic machine 220-2 is down.

(2) If the AVM does not send a notification of completion or failure of a halt or a reset to the logic machine 220-2, the OS (the OS of one of the logic machines 220-1, 220-3, 320-1, 320-2 and 320-3) recognizes that AVM of the machine 200 is down.

(3) Since the downed machine is controlled by only one of the machines in the SCMP system, the OSs of the machine that recognized the down serialize (updates) the downed machine control acquisition field 130 in the shared memory 100.

(4) If the logic machine 220-1 or 220-3 recognizes the down of the AVM of the machine 200, the logic machine 220-1 or 220-3 waits for an acquisition of the right to control the downed machine.

(5) By causing the logic machine 220-1 or 220-3 to wait, it is possible for one of the logic machines in the machine 300 to acquire a right to control the machine 200. Accordingly, the control of the machine 200 is completed.

(6) When the machine 300 is absent, the logic machine 220-1 or 220-3 acquires the right and issues a GSIGP instruction for stopping the CPU operation to the machine 200.

When one of the logic machines operated under the downed AVM recognizes the down, the CPU operation of the downed machine is halted by the downed machine control part of the logic machine that recognized the down. However, since the I/O reset is not completed at this stage, the down control of the downed machine is impossible. The logic machine that recognized the down enters a standby mode.

[vi. Process executed when a session of a logic machine is deactivated]

When a logic machine operated under the AVM is deactivated, the AVM of the deactivated machine issues the other machines that the deactivation has occurred. The notified machines recognize which logic machine is deactivated based on the notification. Since the AVM that controls the logic machine that went deactivated is not down, the AVM halts the CPU operation and resets the an I/O for the deactivated logic machine.

Figure 52:
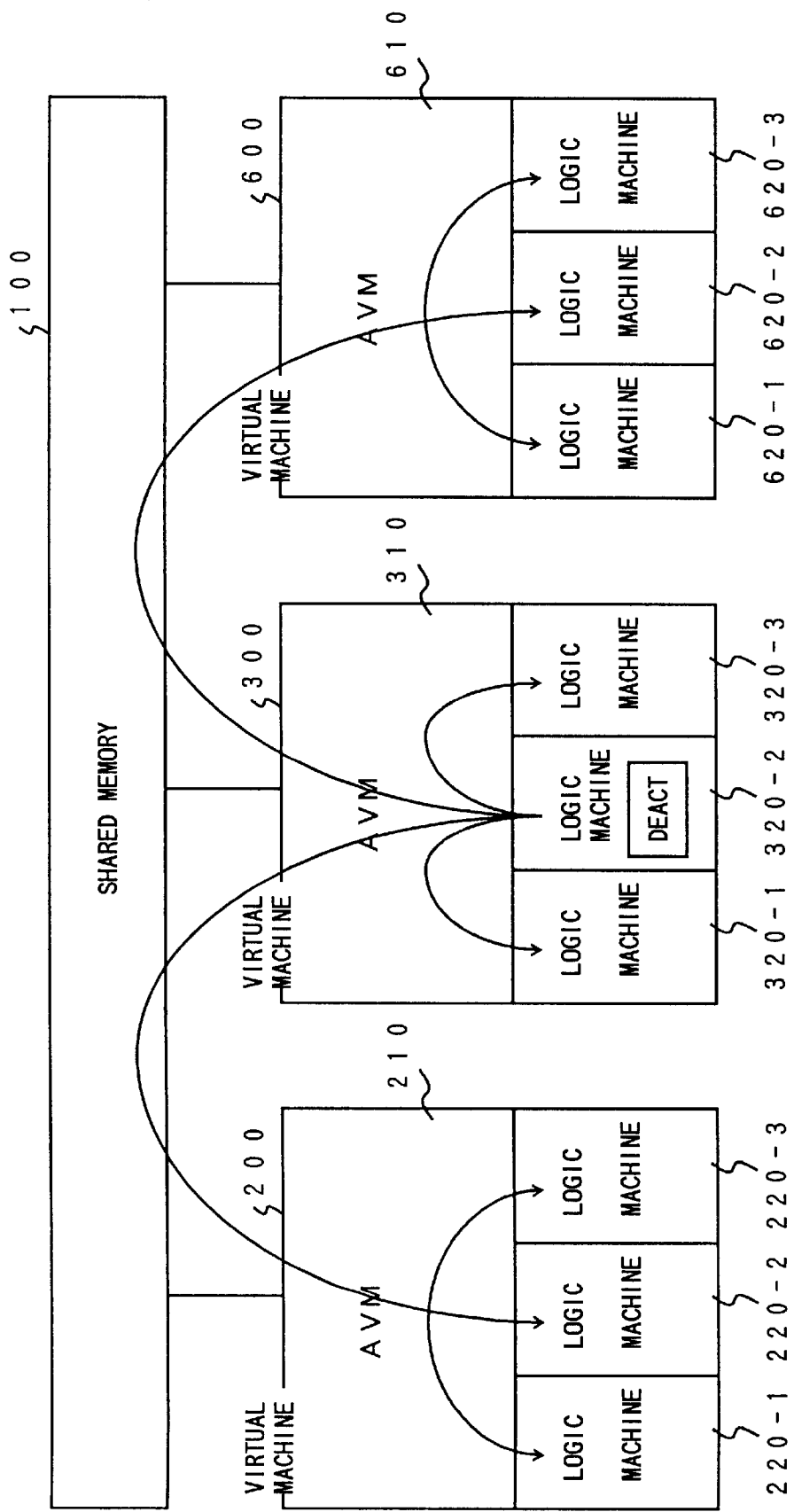
FIG. 52 is a diagram schematically explaining a process executed when a session of a logic machine is deactivated, according to the second embodiment.

FIG. 52 is a diagram schematically explaining a process executed when a session of a logic machine is deactivated according to the second embodiment. Referring to FIG. 52, the logic machine 320-2 in the machine 300 is deactivated. The AVM 310 of the machine 300 recognizes that the logic machine 320-2 is deactivated and halt the CPU operation and resets the I/O for the logic machine 320-2. The AVM 310 notifies the OSs in the machine 200, the OSs in the machine 600, and the OSs of the logic machines 320-1 and 320-3 of the deactivation of the logic machine 320-2. Deactivation sets in when an operator logs off. Since the AVM is responsible for deactivation of the logic machine, the OS of the logic machine is not involved in deactivation.

Figure 53:
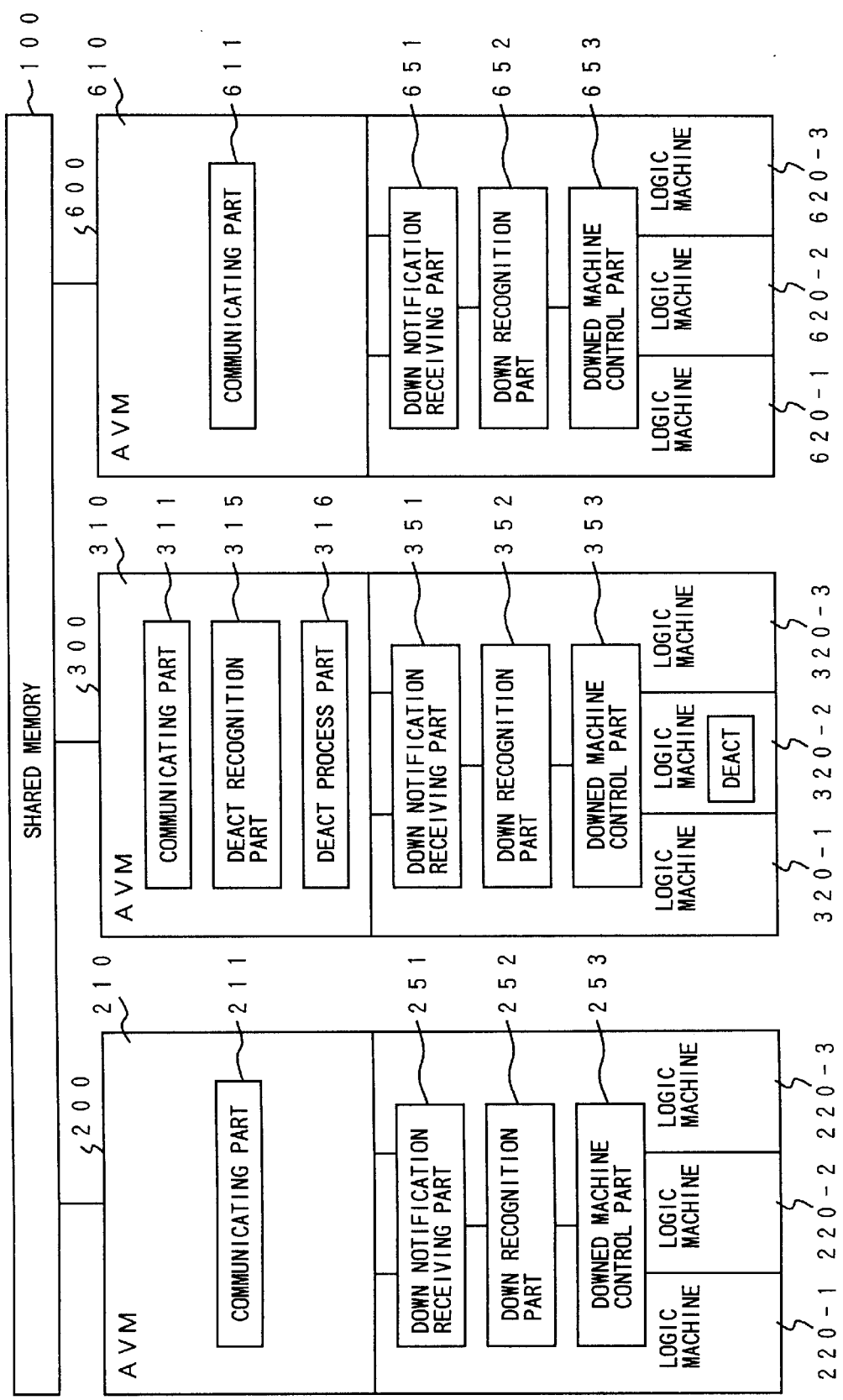
FIG. 53 is a diagram showing the configuration of the machines that concern a process executed when a session of a logic machine is deactivated, according to the second embodiment.

FIG. 53 is a diagram showing the configuration of the machines that concern a process executed when a session of a logic machine is deactivated, according to the second embodiment.

In FIG. 53, those components that are the same as the components of FIG. 52 are designated by the same reference numerals.

Referring to FIG. 53, it is assumed that the logic machine 320-2 in the machine 300 is shown to be deactivated. A DEACT (deactivation) recognition part 315 of the AVM 310 recognizes a "DEACT (deactivation) command".

A DEACT process part 316 of the AVM 310 halt the CPU operation and resets I/O for the logic machine 320-2. The DEACT process part 316 also notifies the OSs in the machine 200, the OSs in the machine 600, and the OSs of the other logic machines in the machine 300 of the deactivation of the logic machine 320-2.

The communicating parts 211 and 411 of the machine 200 and machine 400, respectively, recognize the deactivation of the logic machine 320-2 based on the notification from the machine 300. Since the AVM 310 of the machine 300 under which control the logic machine 320-2 is operated halts the CPU operation and resets the I/O for the deactivated logic machine 320-2, the control of the logic machine 320-2 is completed at this stage. Therefore, no GSIGP instruction is issued.

Referring to FIG. 52, when the OSs in the machine 200, the OSs in the machine 600, and the OSs of the logic machines in the machine 300 other than the logic machine 320-2 are notified by the AVM 310 that the logic machine 320-2 is deactivated, the notified OSs recognize that the logic machine 320-2 is deactivated. The AVM 310 of the machine 300 halts the CPU operation and resets the I/O for the deactivated logic machine 320-2. That is, even if any of the logic machines 220-1–220-3, 320-1, 320-3, or 620-1–620-3 acquires a right to control, the downed machine control part of the acquiring machine does not issue a GSIGP instruction.

[vii. Process for reducing occurrences of operator calls]

A process for reducing occurrences of operator calls is a process for extinguishing a message prompting an operator to execute an alternative control of a machine by manual interruption. The message is displayed when a process for controlling the machine (reset, halt CPU etc.) fails due to a hardware malfunction or the like. The message may be extinguished when:

the machine associated with the message starts an IPL process again;

a process by the operator is completed and a notification is given accordingly;

the logic machine associated with the message is deactivated; or the hardware of the virtual machine including the logic machine associated with the message is down;

In the above-identified cases, a plurality of similar messages for respective logic machines are extinguished.

Figure 54:
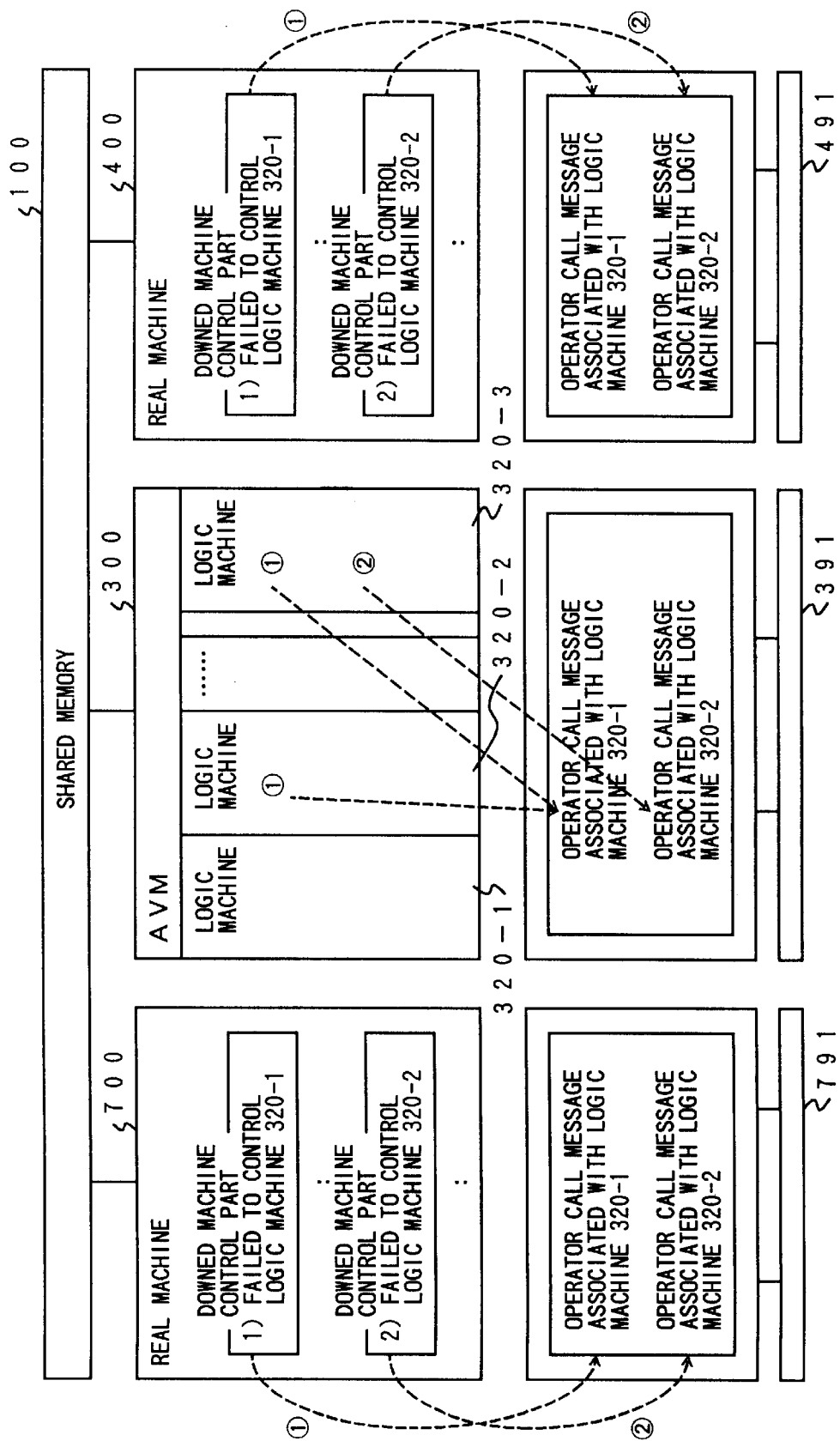
FIG. 54 shows how messages prompting an interruption of an operator are output according to the second embodiment.

FIG. 54 shows how operator call messages are output according to the second embodiment. In FIG. 54, encircled numerals indicate a sequence of control.

Referring to FIG. 54, a machine 700 and the machine 400 are operated as real machines, and the machine 300 is a virtual machine operated under the AVM.

In an SCMP system, only one machine is allowed to control a downed machine. Accordingly, the OS of the other machines have to wait for the end of the control. When the control is completed or failed, the machine that tried to control the downed machine registers relevant information in the shared memory 100. The other machines that do not have a right to control refers to the information. When the control fails, all the machines output an operator call message to the console. If the machines are not adjacent to each other, the first operator who noticed this message responds to the failure.

When the OS of the machine 700 fails to control the logic machine 320-1 in the machine 300, the OS displays an operator call message associated with the logic machine 320-1 in a display unit 791 connected to the machine 700. If the control of the logic machine 320-2 fails, too, an operator call message associated with the logic machine 320-2 is displayed in the display unit 791.

FIG. 55 shows how occurrences of operator calls are reduced according to the second embodiment.

(1) Referring to FIG. 55, it is assumed that the control of the logic machines 320-1 and 320-2 has failed. Therefore, the surviving machines (700, 320-3, 400) output an operator call message associated with the logic machines 320-1 and 320-2.

(2) It is assumed that the AVM of the machine 300 becomes down in the state described in (1).

(3) The machines 700, 400 and the logic machine 320-3 recognize the down of the AVM.

(4) A determination is made by the OSs of the machines 700, 320-3 and 400 as to whether or not the machines 700, 320-3 and 400 have output an operator call message associated with the logic machines in the machine 300, based on the information in the shared memory.

(5) If an affirmative answer is yielded in the determination of (4), the operator call messages are extinguished.

While the above description assumes a case where the operator messages associated with a logic machine are extinguished when the hardware is to be controlled, a similar process may be carried out in case of deactivation.

Referring to FIG. 55, when the logic machine 320-1 in the machine 300 is down and the OSs in the system recognize a failure in the control of the logic machine 320-1, the surviving machines output operator call messages associated with the logic machine 320-1 to respective display units. When the logic machine 320-1 is deactivated, the AVM 310 notifies all the other machines of the deactivation. If there are operator call messages associated with the logic machine 320-1, the notified machines 700, 400, 320-2 and 320-3 extinguish the messages.

As has been described above, by extinguishing operator call messages that serve little purpose, it is not necessary for the operator to check all the output messages associated with individual logic machines.

The present invention is not limited to the above described embodiments, and variations and modifications may be made without departing from the scope of the present invention.

What is claimed is:

1. A computer system comprising a plurality of machines connected to a shared memory, said computer system comprising:

at least one real machine and a plurality of virtual machines, wherein each of said virtual machines comprises an AVM controlling a virtual machine, and said real machine comprises an OS for controlling the real machine and individual logic machines in each of the virtual machines;

said OS of the real machine or an OS of the individual logic machines in the virtual machine are provided with exclusive access acquiring means for acquiring an exclusive access to an area in the shared memory;

operation termination monitoring means for detecting that the OS of the machine that has acquired an exclusive access to the area in the shared memory by the exclusive access acquiring means has terminated its operation, wherein the detecting may be performed by any of the machines, the machines performing detecting comprising another real machine, a virtual machine within the other real machine, and a virtual machine within the machine that has acquired an exclusive access to the area in the shared memory;

virtual/real determination means for determining whether or not the machine in which a termination of an operation is detected by the second operation termination monitoring means is a real machine or a virtual machine; and logic path disconnecting means for disconnecting, upon a determination of a virtual machine by the virtual/real determination means, a logic path between the AVM of the virtual machine and a logic machine operated under the AVM which logic machine accessed the shared memory for initialization.

2. A computer system comprising a plurality of machines connected to a shared memory, said computer system comprising:
- at least one real machine and a plurality of virtual machines, wherein each of said virtual machines comprises an AVM controlling a virtual machine, and said real machine comprises an OS for controlling the real machine and individual logic machines in each of the virtual machines;
- said OS of the real machine or an OS of the individual logic machines in the virtual machine are provided with exclusive access acquiring means for acquiring an exclusive access to an area in the shared memory;
- communication request allocation means for determining, by referring to address information carried by a communication request, whether a communication request sent from another machine has as its destination a machine controlled by said AVM or another machine, and sending said communication request to said other machine if the communication request has as its destination said other machine;
- queuing means for queuing said communication request when said communication request has as its destination the machine controlled by said AVM; and
- acknowledging means for causing said communication request queued by said queuing means to be, acknowledged by a destination logic machine requested in said communication request, when said logic machine is ready for communication, wherein the AVM imports a portion of the communication request from the shared memory, and a remainder of the communication request when the destination logic machine becomes ready for communication, to prevent an originating machine from prematurely and erroneously determining that the destination logic machine has completed processing.

3. A computer system comprising a plurality of machines connected to a shared memory, said computer system comprising:
- at least one real machine and a plurality of virtual machines, wherein each of said virtual machines comprises an AVM controlling a virtual machine, and said real machine comprises an OS for controlling the real machine and individual logic machines in each of the virtual machines;
- said OS of the real machine or an OS of the individual logic machines in the virtual machine are provided with exclusive access acquiring means for acquiring an exclusive access to an area in the shared memory;
- communication request allocation means for determining, by referring to address information carried by a communication request, whether a communication request sent from another machine has as its destination a machine controlled by said AVM or another machine, and sending said communication request to said other machine if the communication request has as its destination said other machine;
- queuing means for queuing said communication request when said communication request has as its destination the machine controlled by said AVM;
- acknowledging means for causing said communication request queued by said queuing means to be acknowledged by a destination logic machine requested in said communication request, when said logic machine is ready for communication, wherein the AVM imports a portion of the communication request from the shared memory, and a remainder of the communication request when the destination logic machine becomes ready for communication, to prevent an originating machine from prematurely and erroneously determining that the destination logic machine has completed processing; and
- said shared memory comprises shared memory queuing means for queuing a interruption requesting communication with one of the logic machines operated under said AVM, and the OS of each of said logic machines comprises means for processing communication requests existing in said queuing means in said AVM first and then communication requests existing in said shred memory queuing means.

4. A computer system comprising a plurality of machines connected to a shared memory, said computer system comprising:
- at least one real machine and a plurality of virtual machines, wherein each of said virtual machines comprises an AVM controlling a virtual machine, and said real machine comprises an OS for controlling the real machine and individual logic machines in each of the virtual machines;
- said OS of the real machine or an OS of the individual logic machines in the virtual machine are provided with exclusive access acquiring means for acquiring an exclusive access to an area in the shared memory;
- communication request allocation means for determining, by referring to address information carried by a communication request, whether a communication request sent from another machine has as its destination a machine controlled by said AVM or another machine, and sending said communication request to said other machine if the communication request has as its destination said other machine;
- queuing means for queuing said communication request when said communication request has as its destination the machine controlled by said AVM;
- acknowledging means for causing said communication request queued by said queuing means to be acknowledged by a destination logic machine requested in said communication request, when said logic machine is ready for communication, wherein the AVM imports a portion of the communication request from the shared memory, and a remainder of the communication request when the destination logic machine becomes ready for communication, to prevent an originating machine from prematurely and erroneously determining that the destination logic machine has completed processing;
- said shared memory comprises shared memory queuing means for queuing a interruption requesting communication with one of the logic machines operated under said AVM, and the OS of each of said logic machines comprises means for processing communication requests existing in said queuing means in said AVM first and then communication requests existing in said shred memory queuing means; and
- said AVM comprises a queue overflow reporting means for reporting an overflow of a queue in said queuing means to a machine originating a communication request.

5. A computer system comprising a plurality of machines connected to a shared memory, said computer system comprising:

at least one real machine and a plurality of virtual machines, wherein each of said virtual machines comprises an AVM controlling a virtual machine, and said real machine comprises an OS for controlling the real machine and individual logic machines in each of the virtual machines;

said OS of the real machine or an OS of the individual logic machines in the virtual machine are provided with exclusive access acquiring means for acquiring an exclusive access to an area in the shared memory;

identifying means for identifying whether a target machine in communication is a real machine or a virtual machine; and virtual machine information acquiring means for acquiring, upon a determination of a virtual machine by said identifying means, address information indicating an identifier of a logic machine in the target virtual machine which logic machine is a destination in the communication, and status information indicating status of the logic machines operating in the target virtual machine, wherein each of the machines comprises:
second down recognizing means for recognizing a down in a logic machine in a virtual machine caused by an unrecoverable error,
down reporting means for reporting that the down is detected by said second down recognizing means, and
down state receiving means for receiving information relating to the down from said down reDorting means, and wherein said second down recognizing means comprises monitoring means for waiting for a completion of a control of a downed local machine by the AVM for a predetermined period of time and, if no notification of the completion is given, recognizes that the AVM is down.

6. A computer system comprising a plurality of machines connected to a shared memory, said computer system comprising:

at least one real machine and a plurality of virtual machines, wherein each of said virtual machines comprises an AVM controlling a virtual machine, and said real machine comprises an OS for controlling the real machine and individual logic machines in each of the virtual machines;

said OS of the real machine or an OS of the individual logic machines in the virtual machine are provided with exclusive access acquiring means for acquiring an exclusive access to an area in the shared memory;

identifying means for identifying whether a target machine in communication is a real machine or a virtual machine; and virtual machine information acquiring means for acquiring, upon a determination of a virtual machine by said identifying means, address information indicating an identifier of a logic machine in the target virtual machine which logic machine is a destination in the communication, and status information indicating status of the logic machines operating in the target virtual machine, wherein each of the machines comprises:
second down recognizing means for recognizing a down in a logic machine in a virtual machine caused by an unrecoverable error,
down reporting means for reporting that the down is detected by said second down recognizing means, and
down state receiving means for receiving information relating to the down from said down reporting means, and wherein said shared memory comprises controlling machine registering means for registering an identifier of a machine that acquires a right to control a downed machine; and each virtual machine comprises local logic machine control means which controls logic machines in the virtual machine when the identifier of a machine that acquired said right to control the downed machine is not registered in said controlling machine registering means for a predetermined period of time.

7. A computer system comprising a plurality of machines connected to a shared memory, said computer system comprising:

at least one real machine and a plurality of virtual machines, wherein each of said virtual machines comprises an AVM controlling a virtual machine, and said real machine comprises an OS for controlling the real machine and individual logic machines in each of the virtual machines;

reporting means for reporting that said AVM becomes down to the other machines connected to said shared memory;

first down recognizing means for acquiring information from said reporting means of the AVM of another virtual machine so as to recognize the down of said AVM;

reset control means which does not perform a resetting operation using a GSIGP instruction provided as part of system control function in said shared memory, when the resetting process of the downed machine is already completed by the AVM of the downed machine, wherein the reset control means resets only the downed machine to continue processing by the downed machine, without resetting any other machines controlled by the AVM.

8. A computer system comprising a plurality of machines connected to a shared memory, said computer system comprising:

at least one real machine and a plurality of virtual machines, wherein each of said virtual machines comprises an AVM controlling a virtual machine, and said real machine comprises an OS for controlling the real machine and individual logic machines in each of the virtual machines;

reporting means for reporting that said AVM becomes down to the other machines connected to said shared memory;

first down recognizing means for acquiring information from said reporting means of the AVM of another virtual machine so as to recognize the down of said AVM;

said shared memory comprises hardware information storing means for storing hardware information for each of the machines connected to said shared memory; and each of the machines comprises downed machine control means which, in case a downed machine is a virtual machine, accesses the hardware information storing means to determine whether or not input/output reset by means of hardware is enabled in the downed machine, and, if an affirmative answer is yielded, resets the input/output of the downed machine, wherein only the downed machine is reset to continue processing by the downed machine, without resetting any other machines controlled by the AVM; and extinguishing means for extinguishing a message prompting an interruption of an operator and displayed at a timing at which a control of a downed machine has failed, when a process resulting from the message is completed.

9. A computer system comprising a plurality of machines connected to a shared memory as recited in claim 8, wherein said second down recognizing means comprises logic machine down control means for forcing the logic machines other than a downed logic machine in a same virtual machine to be down.

10. A computer system comprising a plurality of machines connected to a shared memory as recited in claim 8, wherein the AVM comprises resetting means for controlling a logic machine operated under the AVM when a session of said logic machine becomes deactivated; and session deactivation reporting means for reporting a session deactivation state of said logic machine to the other machines.

11. A computer system comprising a plurality of machines connected to a shared memory as recited in claim 8, wherein said extinguishing means extinguishes a message prompting an interruption of an operator when an operator responds to said message; when the downed machine performs an IPL operation again; when a session in a logic machine in which the interruption is required is deactivated; or when a virtual machine including the logic machine in which the interruption is required is down.

12. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory;

distinguishing whether a destination machine in communication is a real machine or a virtual machine;

requesting, when it is determined that the destination machine is a virtual machine, address information of said virtual machine;

acquiring status information indicating status of the logic machines operating in the destination machine;

determining, by referring to address information carried in a communication request sent from another machine, whether the communication request has as its destination a determining machine or another machine, and sending, if the communication request has as its address another machine, the communication request to the other machine;

queuing said communication request if said communication request has as its destination the determining machine; and causing said queued communication request to be acknowledged by a destination logic machine requested in said communication request, when said logic machine is ready for communication, wherein the AVM imports a portion of the communication request from the shared memory, and a remainder of the communication request when the destination logic machine becomes ready for communication, to prevent an originating machine from prematurely and erroneously determining that the destination logic machine has completed processing.

13. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory;

distinguishing whether a destination machine in communication is a real machine or a virtual machine;

requesting, when it is determined that the destination machine is a virtual machine, address information of said virtual machine;

acquiring status information indicating status of the logic machines operating in the destination machine;

determining, by referring to address information carried in a communication request sent from another machine, whether the communication request has as its destination a determining machine or another machine, and sending, if the communication request has as its address another machine, the communication request to the other machine;

queuing said communication request if said communication request has as its destination the determining machine; and causing said queued communication request to be acknowledged by a destination logic machine requested in said communication request, when said logic machine is ready for communication, wherein the AVM imports a portion of the communication request from the shared memory, and a remainder of the communication request when the destination logic machine becomes ready for communication, to prevent an originating machine from prematurely and erroneously determining that the destination logic machine has completed processing;

queuing a communication request to a virtual machine by said shared memory;

sequentially processing communication requests existing in a queue in said shared memory by said virtual machine; and notifying a machine that originated a communication request of an overflow by a virtual machine when the overflow of a queue in the virtual machine occurs.

14. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory;

distinguishing whether a destination machine in communication is a real machine or a virtual machine;

requesting, when it is determined that the destination machine is a virtual machine, address information of said virtual machine;

acquiring status information indicating status of the logic machines operating in the destination machine;

determining, by referring to address information carried in a communication request sent from another machine, whether the communication request has as its destination a determining machine or another machine, and sending, if the communication request has as its address another machine, the communication request to the other machine;

queuing said communication request if said communication request has as its destination the determining machine; and causing said queued communication request to be acknowledged by a destination logic machine requested in said communication request, when said logic machine is ready for communication, wherein the AVM imports a portion of the communication request from the shared memory, and a remainder of the communication request when the destination logic machine becomes ready for communication, to prevent an originating machine from prematurely and erroneously determining that the destination logic machine has completed processing;

said shared memory queuing a communication request to a virtual machine; and said virtual machine sequentially processing communication requests existing in a queue in said shared memory.

15. A method for controlling a computer system comprising a plurality of machines connected to a shared memory as recited in claim 14, said method further comprising the steps of:

the OS of said real machine, the OS of individual logic machines in said virtual machine or said virtual machine accessing the shared memory;

the OS of said real machine, the OS of individual logic machines in said virtual machine or said virtual machine acquiring a lock in an area in said shared memory.

16. A method for controlling a computer system comprising a plurality of machines connected to a shared memory as recited in claim 15, said method comprising the steps of:

detecting a halt of the OS of the real machine or the OS of the logic machine after said OS has acquired the lock in the area in the shared memory;

disconnecting an access path between the machine in which the halt is detected and said shared memory; and initializing said shared memory in response to an IPL operation initiated by a machine other than the machine in which the halt is detected.

17. A method for controlling a computer system comprising a plurality of machines connected to a shared memory as recited in claim 15, further comprising the steps of:

detecting a halt of the OS that acquired a lock;

determining whether the OS that has halted is provided in a real machine or a virtual machine; and disconnecting, if a determination that the OS that has halted is provided in a virtual machine, a logic path between the AVM that accessed said shared memory for initialization and the OS that has halted.

18. A method for controlling a computer system comprising a plurality of machines connected to a shared memory as recited in claim 14, said method comprising the steps of:

assigning an identifier for identifying the logic machines in the virtual machine; and reporting, upon a request from the OS in the virtual machine operated under said AVM, the identifier assigned by said identifier assigning means to individual logic machines in the virtual machine operated under said AVM and also to another virtual or real machine.

19. A method for controlling a computer system comprising a plurality of machines connected to a shared memory as recited in claim 14, said method comprising the steps of:

a virtual machine receiving a reset request issued by a real machine or a logic machine of another virtual machine;

said virtual machine activating a reset process in a logic machine requested to be reset according to the reset request;

said virtual machine reporting to a machine that originated the reset request that a requested resetting process has been completed; and said virtual machine reporting to the machine that originated the reset request that the requested resetting process has failed to be completed.

20. A method for controlling a computer system comprising a plurality of machines connected to a shared memory as recited in claim 19, wherein a plurality of reset requests issued successively can be received.

21. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory;

notifying all the other machines connected to the shared memory of a down due to an unrecoverable error by the AVM via the shared memory when said down occurs and a recognition of the down is made based on down information acquired from the downed virtual machine, wherein only the downed machine is reset to continue processing by the downed machine, without resetting any other machines controlled by the AVM; and forcing the logic machines other than a downed logic machine in a same virtual machine be down.

22. A method for controlling a computer system comprising a plurality of machines connected to a shared memory as recited in claim 21, wherein the OS of a machine recognizes a down that occurs in a logic machine in a virtual machine due to an unrecoverable error.

23. A method for controlling a computer system comprising a plurality of machines connected to a shared memory as recited in claim 22, wherein a monitoring machine waits for a completion of a control of a downed local machine by the AVM for a predetermined period of time and, if no notification of the completion is given, recognizes that the AVM is down.

24. A method for controlling a computer system comprising a plurality of machines connected to a shared memory as recited in claim 22, said method further comprising the steps of:

registering an identifier of a machine that acquired a right to control a downed virtual machine; and the OS of one of the logic machines operated under the AVM of the downed virtual machine taking control of the downed virtual machine if it is found, within a predetermined period of time, that no identifier is registered in said shared memory, indicating that no machines have acquired the right to control the downed virtual machine.

25. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory;

notifying all the other machines connected to the shared memory of a down due to an unrecoverable error by the AVM via the shared memory when said down occurs and a recognition of the down is made based on down information acquired from the downed virtual machine;

registering hardware information for each machine in said shared memory; and referring, when a downed machine is a logic machine in a virtual machine, to said hardware information and resetting, upon a determination that input/output reset in the downed machine by hardware is enabled, input/output of the downed logic machine from another machine, wherein only the downed machine is reset to continue processing by the downed machine, without resetting any other machines controlled by the AVM.

26. A method for controlling a computer system comprising a plurality of machines connected to a shared memory as recited in claim 25, said method further comprising the steps of:

the AVM controlling a deactivated logic machine operated under said AVM; and said AVM notifying the other machines of the deactivation of said logic machine.

27. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory; and notifying all the other machines connected to the shared memory of a down due to an unrecoverable error by the AVM via the shared memory when said down occurs and a recognition of the down is made based on down information acquired from the downed virtual machine, wherein a machine notified of a session deactivation does not carry out a resetting operation using a GSIGP instruction in order to control a downed machine, wherein only the downed machine is reset to continue processing by the downed machine, without resetting any other machines controlled by the AVM.

28. A method for controlling a computer system comprising a plurality of machines connected to a shared memory, said method comprising the steps of:

connecting at least one real machine and/or at least one virtual machine to said shared memory, said virtual machine being provided with an AVM for controlling a virtual machine, and said real machine being provided with an OS for controlling hardware of the real machine and individual logic machines in the virtual machine;

executing communication process between the real machines, between virtual machines and between a real machine and a virtual machine via said shared memory;

notifying all the other machines connected to the shared memory of a down due to an unrecoverable error by the AVM via the shared memory when said down occurs and a recognition of the down is made based on down information acquired from the downed virtual machine;

registering hardware information for each machine in said shared memory; and referring, when a downed machine is a logic machine in a virtual machine, to said hardware information and resetting, upon a determination that input/output reset in the downed machine by hardware is enabled, input/output of the downed logic machine from another machine, wherein only the downed machine is reset to continue processing by the downed machine, without resetting any other machines controlled by the AVM, and wherein, a message prompting an interruption of an operator and displayed at a timing at which a control of a downed machine has failed is extinguished, when a process resulting from the message is completed.

29. A method for controlling a computer system comprising a plurality of machines connected to a shared memory as recited in claim 28, wherein a message prompting an interruption of an operator is extinguished when an operator responds to said message; when the downed machine performs an IPL operation again; when a session in a logic machine in which the interruption is required is deactivated; or when a virtual machine including the logic machine in which the interruption is required is down.

30. A computer system comprising a plurality of processors connected to a shared memory, comprising:

each of said plurality of processors comprising a plurality of virtual machines, wherein each of said virtual machines comprises an AVM controlling a virtual machine, and each of said plurality of processors comprising an operating system to control each of said plurality of processors and individual logic machines in each of the virtual machines;

exclusive access acquiring means for acquiring an exclusive access to an area in the shared memory contained in said operating system of each of said plurality of processors or an operating system of the individual logic machines in the virtual machines;

identifying means for identifying whether a target machine is in communication with a processor of said plurality of processors or a virtual machine of said virtual machines;

virtual machine information acquiring means for acquiring, upon a identification of a virtual machine by said identifying means, address information indicating an identifier of a logic machine in the target virtual machine which logic machine is a destination in the communication, and status information indicating status of the logic machines operating in the target virtual machine;

first down recognizing means for recognizing the down of the AVM of another virtual machine;

reset control means which does not perform a resetting operation using a GSIGP instruction provided as part of system control function in said shared memory, when the resetting process of the downed machine is already completed by the AVM of the downed machine;

second down recognizing means for recognizing a down in a logic machine in a virtual machine caused by an unrecoverable error;

down reporting means for reporting that the down is detected by said second down recognizing means;

down state receiving means for receiving information relating to the down from said second down reporting means;

said shared memory, comprises:

controlling machine registering means for registering an identifier of a processor that acquires a right to control a downed machine; and each said virtual machine, comprises:

local logic machine control means which controls logic machines in the virtual machine when the identifier of a machine that acquired said right to control the downed machine is not registered in said controlling machine registering means for a predetermined period of time.

* * * * *

UNITED STATES PATENT AND TRADEMARK OFFICE
CERTIFICATE OF CORRECTION

PATENT NO. : 6,728,746 B1
DATED : April 27, 2004
INVENTOR(S) : Hitoshi Murase et al.

It is certified that error appears in the above-identified patent and that said Letters Patent is hereby corrected as shown below:

Column 38,
Line 11, change "a" to -- an --.

Column 39,
Line 31, change "reDorting" to -- reporting --.

Signed and Sealed this

Second Day of November, 2004

JON W. DUDAS
*Director of the United States Patent and Trademark Office*